(12) United States Patent
Sano

(10) Patent No.: US 10,901,200 B2
(45) Date of Patent: Jan. 26, 2021

(54) WAVELENGTH TUNABLE INTERFERENCE FILTER, OPTICAL DEVICE, OPTICAL MODULE, AND ELECTRONIC APPARATUS

(71) Applicant: Seiko Epson Corporation, Tokyo (JP)

(72) Inventor: Akira Sano, Matsumoto (JP)

(73) Assignee: Seiko Epson Corporation

( * ) Notice: Subject to any disclaimer, the term of this patent is extended or adjusted under 35 U.S.C. 154(b) by 101 days.

(21) Appl. No.: 16/196,407

(22) Filed: Nov. 20, 2018

(65) Prior Publication Data

US 2019/0155015 A1 May 23, 2019

(30) Foreign Application Priority Data

Nov. 21, 2017 (JP) ................. 2017-224079

(51) Int. Cl.
| | |
|---|---|
| G02B 26/00 | (2006.01) |
| G01J 3/28 | (2006.01) |
| G01J 3/02 | (2006.01) |
| H04N 1/60 | (2006.01) |
| G01J 3/26 | (2006.01) |
| B41J 2/44 | (2006.01) |

(52) U.S. Cl.
CPC .......... *G02B 26/001* (2013.01); *G01J 3/0229* (2013.01); *G01J 3/26* (2013.01); *G01J 3/2823* (2013.01); *H04N 1/6033* (2013.01); *B41J 2/44* (2013.01)

(58) Field of Classification Search
CPC .............. G02B 26/001; G02B 6/29358; H04N 1/6033; G01J 3/26; G01J 3/2823; G01J 3/0229; B41J 2/44
See application file for complete search history.

(56) References Cited

U.S. PATENT DOCUMENTS

| | | | |
|---|---|---|---|
| 8,687,254 B2 | 4/2014 | Hanamura et al. | |
| 9,195,047 B2 | 11/2015 | Hanamura et al. | |
| 2007/0242920 A1* | 10/2007 | Lin ....... | G02B 26/001 385/27 |
| 2011/0222157 A1* | 9/2011 | Sano ....... | G02B 26/001 359/578 |
| 2013/0044377 A1* | 2/2013 | Nishimura ....... | G01J 3/26 359/578 |
| 2015/0153564 A1* | 6/2015 | Sano ....... | G02B 26/001 359/578 |

FOREIGN PATENT DOCUMENTS

JP 2010-139552 A 6/2010

* cited by examiner

*Primary Examiner* — Kimberly N. Kakalec
(74) *Attorney, Agent, or Firm* — Harness, Dickey & Pierce, P.L.C.

(57) ABSTRACT

A wavelength tunable interference filter includes a movable section having a mirror region that faces a first mirror in a first direction and an electrode so provided in a region outside the mirror region in a plan view viewed in the first direction as to surround the mirror region along the circumferential direction thereof, the electrode configured to displace the movable section in the first direction when voltage is applied to the electrode, and the width of the electrode in the plan view varies in the circumferential direction.

20 Claims, 31 Drawing Sheets

WAVELENGTH TUNABLE INTERFERENCE FILTER, OPTICAL DEVICE, OPTICAL MODULE, AND ELECTRONIC APPARATUS

BACKGROUND

1. Technical Field

The present invention relates to a wavelength tunable interference filter, an optical device, an optical module, and an electronic apparatus.

2. Related Art

There has been a known wavelength tunable interference filter having a pair of reflection films (see JP-A-2010-139552, for example).

The wavelength tunable interference filter described in JP-A-2010-139552 includes a fixed substrate on which one of the reflection films is provided and a movable substrate on which the other reflection film is provided. The movable substrate is provided with a movable section on which the other reflection film is provided and a holding section that surrounds the outer circumference of the movable section and holds the movable section in such a way that the movable section is displaceable toward the fixed substrate. When the movable section is displaced, the size of gap between the pair of the reflection films changes, whereby the wavelength of light that passes through the wavelength tunable interference filter changes.

In a wavelength tunable interference filter of related art, the movable section on which a reflection film is provided typically has a perfectly circular shape that does not bend the reflection film, as described in JP-A-2010-139552.

In the related art, when the movable section has a shape other than the perfectly circular shape, the amount of displacement decreases with distance from the center of the movable section in a plan view of the movable section viewed in the thickness direction thereof. That is, the movable section has a portion that is likely to bend and a portion that is unlikely to bend. The size of gap in the plane of the reflection film is therefore not uniform.

The non-uniformity of the size of gap described above causes in-plane variation in the wavelength of the light that exits out of the wavelength tunable interference filter, resulting in a problem of a decrease in the wavelength precision of the wavelength tunable interference filter. In the related art, the shape of the movable section is therefore restricted.

SUMMARY

An advantage of some aspects of the invention is to provide a wavelength tunable interference filter that allows an increase in the flexibility of the shape of the movable section of the wavelength tunable interference filter and suppression of a decrease in the wavelength precision, an optical device, an optical module, and an electronic apparatus.

A wavelength tunable interference filter according to an application example of the invention includes a first mirror, a movable section on which a second mirror that faces the first mirror is provided, and an electrode so provided in a region outside the second mirror as to surround the second mirror along a circumferential direction thereof in a plan view viewed in a first direction that is a direction perpendicular to a surface of the movable section that is a surface on which the second mirror is provided, the electrode is configured to displace the movable section in the first direction when voltage is applied to the electrode, and a width of the electrode in the plan view varies in the circumferential direction.

In the wavelength tunable interference filter, a mirror region where light undergoes multiple reflection for interference is the region where the first mirror and the second mirror coincide with each other in the plan view in the first direction.

The electrode in the present application example is so disposed as to surround the second mirror, which forms the mirror region described above, along the circumferential direction of the second mirror, and the width of the electrode refers to the line width in a direction that intersects the circumferential direction. For example, in the case of an annular electrode that surrounds the mirror region, the electrode has a frame-like shape having an edge line close to the mirror region (inner edge line) and an edge line away from the mirror region (outer edge line). In this case, the width of the electrode refers to the distance from the inner edge line to the outer edge line in the radial direction away from the mirror region.

In the application example, the width of the electrode, which surrounds the second mirror (mirror region), varies in the circumferential direction. The amount of bending of the movable section when it is displaced can therefore be suppressed, whereby the amount of bending of the second mirror on the movable section can be suppressed.

That is, in a case where the center of the movable section is displaced in the first direction, depending on the shape of the movable section, the outer circumferential edge line of the movable section has a portion where the difference in the amount of displacement between the portion and the center of the movable section is small (portion that is unlikely to bend) and a portion where the difference in the amount of displacement between the portion and the center of the movable section is large (portion that is likely to bend), so that the movable section bends, as described above. In contrast, in the application example, in which the width of the electrode differs between the portion that is likely to bend and the portion that is unlikely to bend, the amount of displacements of the two portions can be roughly equal to each other.

For example, the width of the electrode corresponding to the portion which is likely to bend and where there is a large difference in the amount of displacement between the portion and the center of the movable section is set at a large value, and the width of the electrode corresponding to the portion which is unlikely to bend and where there is a small difference in the amount of displacement between the portion and the center of the movable section is set at a small value. As a result, the difference in the amount of displacement between the center of the movable section and the portion of the movable section close to the outer circumferential edge line thereof is roughly equal to each other, whereby the amount of bending of the movable section can be suppressed. Further, since the amount of bending of the movable section is suppressed, the amount of bending of the second mirror in the mirror region can also be suppressed. In-plane variation in the wavelength of the light outputted from the wavelength tunable interference filter can therefore be suppressed, whereby light having a desired wavelength can be uniformly outputted from the wavelength tunable interference filter (wavelength precision of wavelength tunable interference filter is improved).

In the wavelength tunable interference filter according to the application example, it is preferable that the movable section is so shaped as to have a longitudinal direction in the plan view viewed in the first direction, that Ma<Mb is satisfied, where Ma represents a width of the movable section in a second direction that is perpendicular to the first direction and to the longitudinal direction, and Mb represents a width of the movable section in a third direction that is perpendicular to the first direction and parallel to the longitudinal direction, and that La<Lb is satisfied, where La represents a third electrode width of a portion corresponding to the third direction out of the electrode, and Lb represents a second electrode width of a portion corresponding to the second direction out of the electrode.

The portion corresponding to the second direction out of the electrode is a portion so disposed as to be roughly parallel to the second direction out of the electrode that surrounds the mirror region in the circumferential direction, and the portion corresponding to the third direction out of the electrode is a portion so disposed as to be roughly parallel to the third direction out of the electrode that surrounds the mirror region in the circumferential direction.

For example, in a case where the movable section has an oblong shape, the second direction is the direction parallel to the short edges (short-edge direction), and the third direction is the direction parallel to the long edges (long-edge direction). In a case where the electrode has a rectangular-frame-like shape that surrounds the mirror region, the portion corresponding to the second direction out of the electrode is a pair of electrode portions parallel to the short edges of the movable section (short-edge electrode sections), and the portion corresponding to the third direction out of the electrode is a pair of electrode portions parallel to the long edges of the movable section (long-edge electrode sections). In this case, the second electrode width (Lb) refers to the length of the short-edge electrode sections in the long-edge direction, and the third electrode width (La) refers to the length of the long-edge electrode sections in the short-edge direction.

Further, for example, in a case where the movable section has an elliptical or elongated circular shape, the second direction is the minor axis direction, and the third direction is the major axis direction. In this case and in a case where the electrode has an elliptically-rectangular-frame-like shape or an elongated-circular-frame-like shape that surrounds the mirror region, the portion corresponding to the second direction out of the electrode is electrode portions where the tangential direction is roughly parallel to the minor axis direction, and the portion corresponding to the third direction out of the electrode is electrode portions where the tangential direction is roughly parallel to the major axis direction. In this case, the second electrode width (Lb) refers to the major-axis-direction length of the electrode portions where the tangential direction is roughly parallel to the minor axis direction, and the third electrode width (La) refers to the minor-axis-direction length of the electrode portions where the tangential direction is roughly parallel to the major axis direction.

When the movable section is displaced in the first direction, the movable section is unlikely to bend in the second direction, in which the width of the movable section is small, and the movable section is likely to bend in the third direction, in which the width of the movable section is large.

In contrast, in the application example, out of the electrode that surrounds the mirror region, the second electrode width (Lb) of the portion corresponding to the second direction is greater than the third electrode width (La) of the portion corresponding to the third direction. Therefore, when voltage is applied to the electrode, force applied to the portion corresponding to the second direction is greater than force applied to the portion corresponding to the third direction. That is, when the movable section is displaced, the force can be so applied that the amount of the-third-direction displacement of the opposite ends of the movable section, where the difference in the amount of displacement from the center of the movable section is large, approaches the amount of displacement at the center of the movable section. The situation in which the movable section bends can thus be avoided.

In the wavelength tunable interference filter according to the application example, it is preferable that the electrode has a polygonal outer circumferential shape when viewed in the first direction, and that Wc>Ws/sin α is satisfied, where α represents an angle between a radial straight line from a center of the movable section toward a corner point of the polygonal shape and an edge of the polygonal shape, Wc represents a width of a corner electrode section located at the corner point out of the electrode, the width measured along the radial straight line, and Ws represents a width of the side electrode section along the edge out of the electrode, the width measured in a direction perpendicular to the edge.

The center of the movable section refers to the position of the center of gravity of the movable section.

When a polygonal movable section is displaced in the first direction, the difference in the amount of displacement between the corner point of the movable section and the center of the movable section is greater than the difference in the amount of displacement between edge sections of the movable section and the center of the movable section. In contrast, in the application example, the electrode width Ws of the corner electrode section and the electrode width Wc of the side electrode section satisfy Wc>Ws/sin α. That is, in a case where the two side electrode sections along two edges that sandwich the corner point are extended to the corner point so that the side electrode sections are connected to each other, the electrode width in the radial direction is Ws/sin α, whereas the width Wc of the corner electrode section in the application example is greater than Ws/sin α. Larger force can therefore be applied to the corner point of the movable section, which is likely to bend, whereby the amount of bending of the movable section can be suppressed.

In the wavelength tunable interference filter according to the application example, it is preferable that the movable section has a fourth edge line extending in a fourth direction in the plan view, a fifth edge line extending in a fifth direction that intersects the fourth direction, and a corner point where the fourth edge line and the fifth edge line intersect to each other, that the electrode includes a fourth electrode section having a fourth inner edge extending in the fourth direction and disposed on a side close to a mirror region where the first mirror and the second mirror coincide with each other in the plan view viewed in the first direction and a fourth outer edge disposed on a side opposite the mirror region, a fifth electrode section having a fifth inner edge extending in the fifth direction and disposed on a side of the mirror region and a fifth outer edge disposed on a side opposite the mirror region, and a corner electrode section continuous with one end of the fourth electrode section in the fourth direction and one end of the fifth electrode section in the fifth direction, and that the corner electrode section includes at least one of an outer protruding section that protrudes in a direction away from the mirror region beyond the fourth outer edge or the fifth outer edge and an inner protruding section that protrudes toward the mirror region beyond the fourth inner edge or the fifth inner edge.

In the application example, the movable section includes the corner point formed by the fourth edge line and the fifth edge line, and the electrode has the fourth electrode section parallel to the fourth direction, the fifth electrode section parallel to the fifth direction, and the corner electrode section continuous with the fourth and fifth electrode sections (located at portion where fourth and fifth electrode sections are connected to each other). The corner electrode section includes one of the outer protruding section, which protrudes toward the side opposite the mirror region, and the inner protruding section, which protrudes toward the mirror region.

In a case where the movable section has a polygonal shape and includes a corner point, and when the movable section is displaced in the first direction, the difference in the amount of displacement between the corner point of the movable section and the center of the movable section is greater than the difference in the amount of displacement between the other portion of the movable section and the center of the movable section. In contrast, in the application example, the corner electrode section is provided at the portion corresponding to the corner point described above, and the corner electrode section is provided with one of the outer protruding section and the inner protruding section. That is, the electrode width (area) of the corner electrode section is greater than those of the fourth and fifth electrode sections by the amount corresponding to the dimension of the protrusion of the outer or inner protruding section. As a result, large force can be applied to the corner point of the movable section, which is likely to bend, whereby the amount of bending of the movable section can be suppressed.

In the wavelength tunable interference filter according to the application example, it is preferable that the movable section and the second mirror each have a rectangular shape. The rectangular shape used herein includes an oblong shape and a square shape.

That is, in a case where the movable section and the mirror region each have an oblong shape, the second and third directions described in the above-mentioned application example are the short-edge direction and the long-edge direction, respectively, and the second direction is perpendicular to the third direction. Instead, one of the fourth and fifth directions is the short-edge direction with the other being the long-edge direction, and the fourth direction is perpendicular to the fifth direction. In a case where the movable section and the mirror region each have a square shape, the fourth and fifth directions in the application example described above are perpendicular to each other.

To receive the light having passed through the wavelength tunable interference filter with a light receiving section, such as an image sensor, to capture a spectral image, the shape of the mirror region preferably accords with the shape of a light receiving region of the light receiving section. The light receiving region of the light receiving section is typically a rectangular region in which a plurality of pixels are arranged in the horizontal and vertical directions. In the wavelength tunable interference filter, light having a predetermined wavelength passes through the mirror region. Therefore, to allow the entire light receiving region to receive the light having a predetermined wavelength and having passed through the wavelength tunable interference filter, the mirror region projected on the light receiving only needs to contain the light receiving region.

In a case where the mirror region has a circular or elliptical shape, to minimize the planar size of the wavelength tunable interference filter, the mirror region is so formed that the light receiving region inscribes the mirror region projected on the light receiving section. However, since the mirror region has a circular shape whereas the light receiving region has a rectangular shape, a region of the mirror region that is the region extending off the light receiving target region forms a region where the light receiving section receives no light (unnecessary region).

On the other hand, in the application example, the movable section and the mirror region each have a rectangular shape. In this case, when the mirror region is projected on the light receiving section, the mirror region and the light receiving region are allowed to roughly coincide with each other, whereby the unnecessary region described above can be reduced. That is, the movable section and the mirror region of the wavelength tunable interference filter can be so formed to be minimized in correspondence with the light receiving section.

In the wavelength tunable interference filter according to the application example, it is preferable that the width of the electrode increases with distance from a center of the movable section.

In the case where the movable section is displaced in the first direction, the difference in the amount of displacement between the center of the movable section and a certain position thereon increases with distance from the center of the movable section, as described above.

In contrast, in the application example, the width of the electrode increases with distance from the center of the movable section. As a result, the force that displaces the movable section in the first direction can be greater in a position farther from the center of the movable section (position where the amount of displacement is smaller). That is, the amount of displacement of the movable section can be roughly uniform irrespective of the distance from the center of the movable section, whereby the amount of displacement of the movable section can be suppressed.

In the wavelength tunable interference filter according to the application example, it is preferable that the movable section has a uniform dimension in the first direction, and that the wavelength tunable interference filter further includes a holding section that is so linked to the movable section as to surround an outer circumference of the movable section and holds the movable section in such a way that the movable section is movable in the first direction.

In the application example, the holding section is linked to the outer circumference of the movable section. In the thus configured wavelength tunable interference filter, bending the holding section allows displacement of the movable section in the first direction. On the other hand, in the configuration in which the holding section is so provided as to surround the outer circumference of the movable section, restoring force produced by the holding section bends the movable section when the movable section is displaced in the first direction. In contrast, in the application example, since the width of the electrode varies in the circumferential direction, the amount of bending of the movable section can be reduced, as described above.

In the wavelength tunable interference filter according to the application example, it is preferable that the electrode has a closed annular shape.

In the application example, since the electrode has a closed annular shape, the force that displaces the movable section in the first direction can be applied to the entire annular region that surrounds the mirror region. The movable section can therefore be displaced in the first direction with no inclination of the movable section.

In the wavelength tunable interference filter according to the application example, it is preferable that the electrode includes a plurality of partial electrodes, and that the plurality of partial electrodes are arranged in the circumferential direction with a gap having a predetermined dimension interposed between the plurality of partial electrodes.

In the application example, the electrode includes a plurality of partial electrodes so disposed as to be separate from each other by a gap having a predetermined dimension. In this case, another wiring electrode or any other component that is not electrically continuous with the partial electrodes can be disposed in the gap between the partial electrodes. For example, there is a case where a mirror electrode is provided in the mirror region and mirror wiring electrode connected to the mirror electrode extends to the outer circumference of a substrate. In this case, disposing the mirror wiring electrode in the gap between the partial electrodes allows optimization of the wiring structure in the wavelength tunable interference filter.

An optical device according to an application example of the invention includes the wavelength tunable interference filter described above and an enclosure that accommodates the wavelength tunable interference filter.

In the application example, since the bending of the movable section is suppressed, as described above, the bending of the mirror region provided in the movable section can also be suppressed, whereby the wavelength precision of the wavelength tunable interference filter can be improved. Further, since the interference filter is accommodated in the enclosure, adherence of foreign matter, for example, to a reflection film can be avoided, whereby the interference filter can be protected, for example, from impact.

An optical module according to an application example of the invention includes the wavelength tunable interference filter described above and a light receiving section that receives light having passed through the first mirror and the second mirror.

In the application example, since the bending of the movable section is suppressed, the bending of the mirror region provided in the movable section can also be suppressed, whereby the wavelength precision of the wavelength tunable interference filter can be improved, as in the application example described above. Therefore, the light receiving section of the optical module receives the light having passed through the wavelength tunable interference filter, and light having a desired wavelength can be measured with precision.

Further, the wavelength tunable interference filter, in which the width of the electrode varies in the circumferential direction, allows suppression of the bending of the movable section irrespective of the shape of the movable section, as described above. The mirror region of the wavelength tunable interference filter can therefore be minimized in correspondence with the light receiving region of the light receiving section, whereby the shape of the movable section can be minimized in accordance with the shape of the mirror region. That is, the size of the wavelength tunable interference filter can be reduced with the high wavelength precision of the wavelength tunable interference filter maintained, whereby the size of the optical module can also be reduced.

An electronic apparatus according to an application example of the invention includes the wavelength tunable interference filter described above and a control section that controls drive operation of the wavelength tunable interference filter.

In the application example, since the bending of the movable section is suppressed, the bending of the mirror region provided in the movable section can also be suppressed, whereby the wavelength precision of the wavelength tunable interference filter can be improved, as in the application example described above. Therefore, the electronic apparatus, which carries out a variety of processes using the light having passed through the wavelength tunable interference filter described above, can carry out the processed with high precision.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A wavelength tunable interference filter of a first embodiment according to the invention will be described below.

Configuration of Wavelength Tunable Interference Filter

Figure 1:
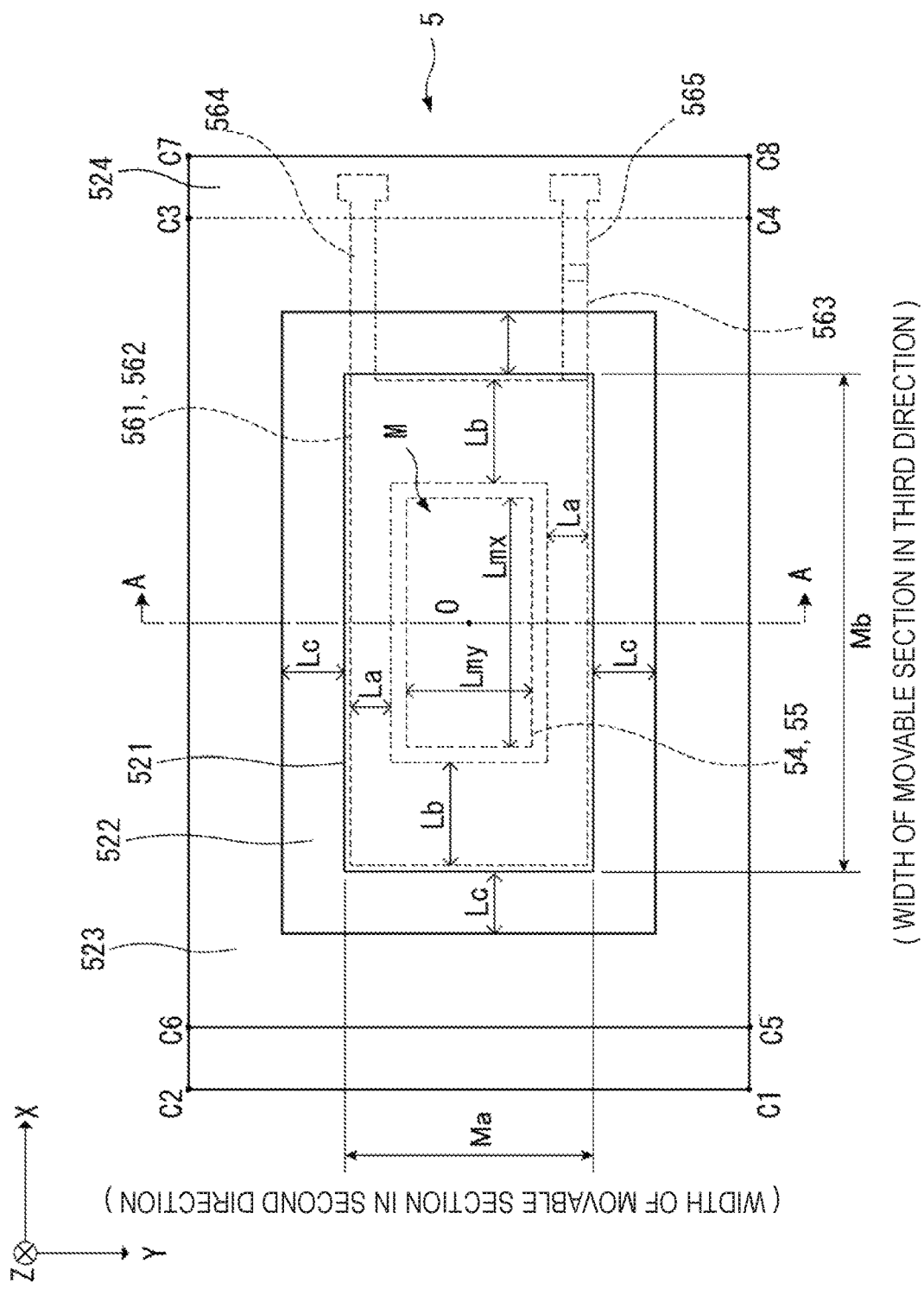
FIG. 1 is a plan view showing a schematic configuration of a wavelength tunable interference filter according to a first embodiment.
Figure 2:
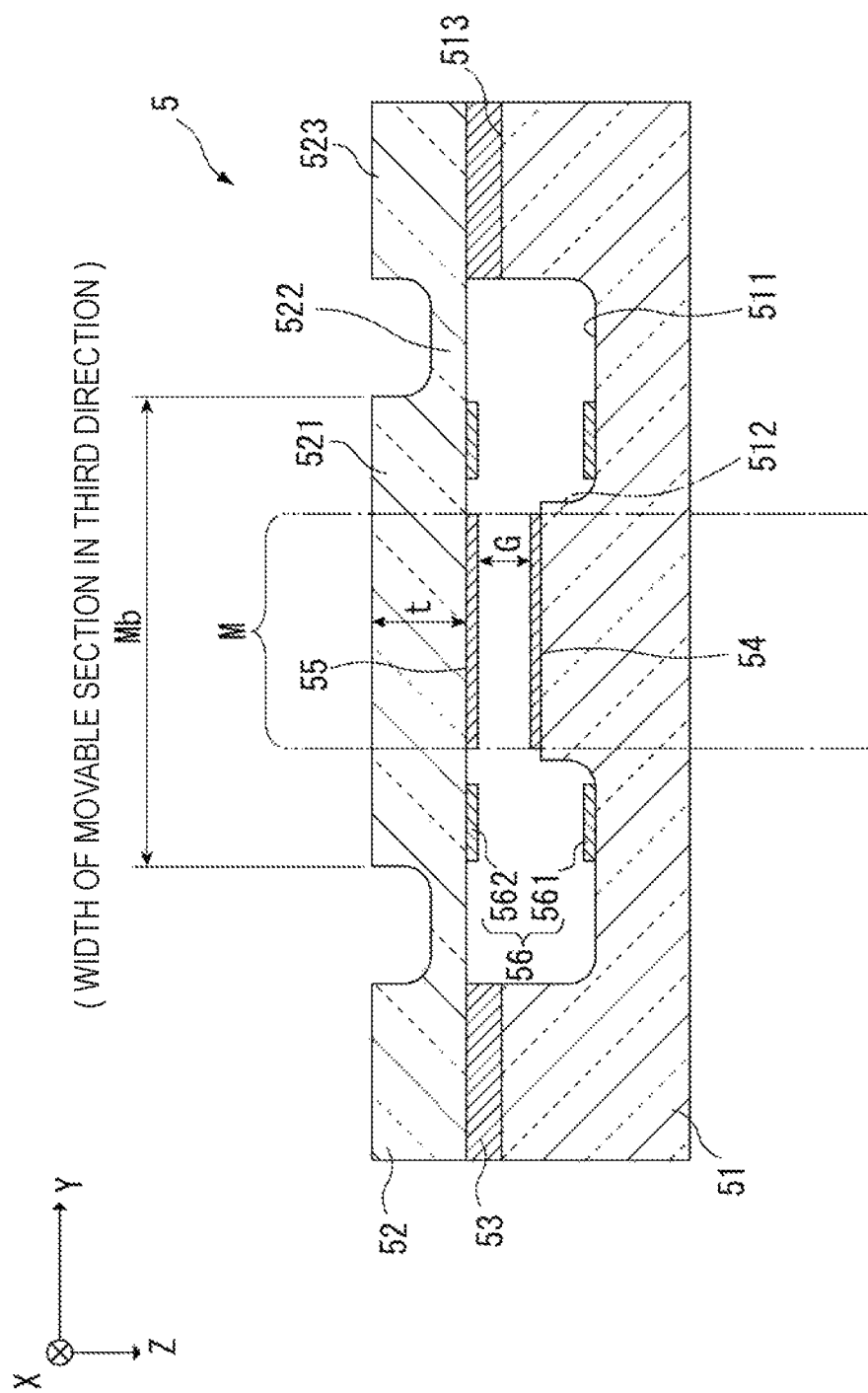
FIG. 2 is a cross-sectional view of the wavelength tunable interference filter taken along the line A-A in FIG. 1.

FIG. 1 is a plan view showing a schematic configuration of a wavelength tunable interference filter 5 according to a first embodiment. FIG. 2 is a cross-sectional view of the wavelength tunable interference filter 5 taken along the line A-A in FIG. 1.

The wavelength tunable interference filter 5 includes a light translucent first substrate 51 and second substrate 52, as shown in FIGS. 1 and 2. The first substrate 51 and the second substrate 52 are bonded to each other via a bonding film 53, which is formed, for example, of a plasma polymerization film primarily made, for example, of siloxane, to form an integrated unit.

The first substrate 51 has a surface that faces the second substrate 52, and a first mirror 54 is provided on the surface. The second substrate 52 has a surface that faces the first substrate 51, and a second mirror 55 is provided on the surface. The first mirror 54 and the second mirror 55 are so disposed as to face each other with a gap G therebetween.

The wavelength tunable interference filter 5 is provided with an electrostatic actuator 56. The electrostatic actuator 56 is formed of a first electrode 561, which is provided on the first substrate 51, and a second electrode 562, which is provided on the second substrate 52. The second electrode 562 in the present embodiment corresponds to the electrode in an aspect of the invention that displaces upon voltage application a movable section 521 (which will be described later) in the first direction.

The substrate thickness direction of the first substrate 51 or the second substrate 52 corresponds to the first direction in an aspect of the invention and is referred to as a direction Z in the following description. A filter plan view in which the wavelength tunable interference filter 5 is viewed in the direction Z is simply referred to as a plan view. Further, a direction perpendicular to the direction Z is referred to as a direction X (the third direction in an aspect of the invention), and the direction perpendicular to the directions Z and X is referred to as a direction Y (the second direction in an aspect of the invention).

In the present embodiment, the center of the first mirror 54 coincides with the center of the second mirror 55 in the plan view, and the axis passing through the centers of the first mirror 54 and the second mirror 55 is referred to as a filter center axis O.

Configuration of First Substrate 51

Figure 3:
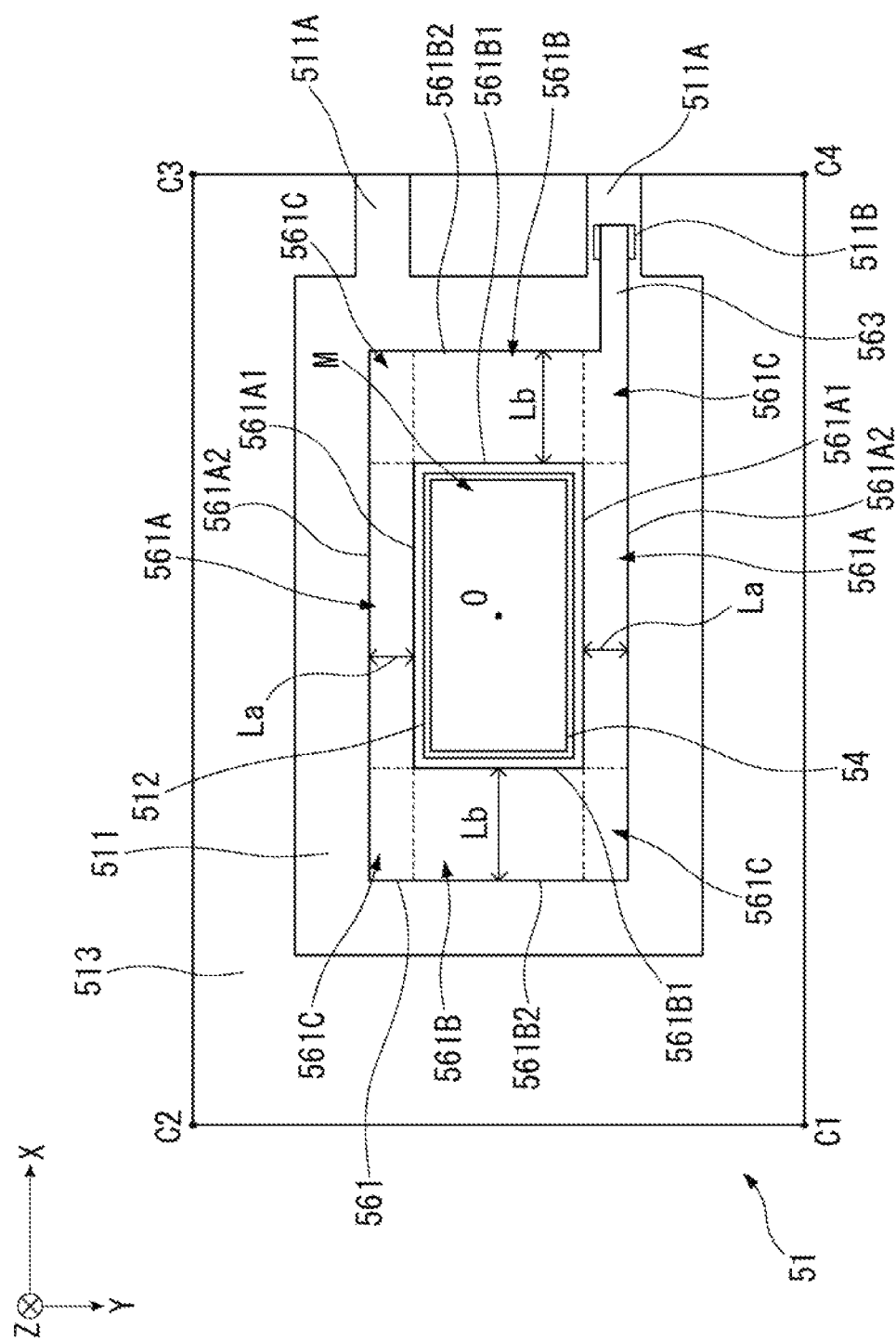
FIG. 3 is a plan view of a first substrate in the first embodiment viewed from the side facing a second substrate.

FIG. 3 is a plan view of the first substrate 51 viewed from the side facing the second substrate 52.

The first substrate 51 has an electrode placement groove 511 and a mirror attachment section 512, which are formed, for example, in an etching process, as shown in FIGS. 2 and 3. The −X-side end (edge C1-C2 in FIG. 1) of the first substrate 51 protrudes outward beyond the −X-side end (edge C5-C6 in FIG. 1) of the second substrate 52.

The electrode placement groove 511 is a groove so provided as to surround the circumference of the mirror attachment section 512 in the plan view. In the present embodiment, the mirror attachment section 512 has an oblong shape having edge lines parallel to the directions X and Y in the plan view with the edge lines parallel to the direction X forming long edges and the edge lines parallel to the direction Y forming short edges. The electrode placement groove 511 is formed in a quadrangular annular shape that surrounds the rectangular mirror attachment section 512.

The first electrode 561, which forms the electrostatic actuator 56, is provided on the groove bottom surface of the electrode placement groove 511. The first substrate 51 is further provided with drawing grooves 511A, which extend from the electrode placement groove 511 toward the edge C3-C4 and have the same depth as that of the electrode placement groove 511.

The first electrode 561 is provided in a region that faces the second electrode 562, which will be described later, and formed, for example, in a rectangular annular shape (closed annular shape). In the present embodiment, the first electrode 561 and the second electrode 562 have the same shape and coincide with each other in the plan view, as shown in FIGS. 1 and 2.

Specifically, the first electrode 561 includes a pair of first long-edge electrode sections 561A, which are parallel to the direction X, a pair of first short-edge electrode sections 561B, which are parallel to the direction Y, and first corner electrode sections 561C, which are continuous with the first long-edge electrode sections 561A and the first short-edge electrode sections 561B.

The first long-edge electrode sections 561A each have a first inner long edge 561A1, which faces the mirror attachment section 512 (mirror region M), and a first outer long edge 561A2, which is opposite the mirror attachment section 512. The width of each of the first long-edge electrode sections 561A, that is, the dimension in the direction Y from the first inner long edge 561A1 to the first outer long edge 561A2 is referred to as a long-edge width La.

The first short-edge electrode sections 561B each have a first inner short edge 561B1, which faces the mirror attachment section 512, and a first outer short edge 561B2, which is opposite the mirror attachment section 512. The width of each of the first short-edge electrode sections 561B, that is, the dimension in the direction X from the first inner short edge 561B1 to the first outer short edge 561B2 is referred to as a short-edge width Lb.

In the present embodiment, the long-edge width La is smaller than the short-edge width Lb, as shown in FIG. 3.

The first corner electrode sections 561C are each continuous with one end of the corresponding first long-edge electrode section 561A and one end of the corresponding first short-edge electrode section 561B and each include the intersection of the first outer long edge 561A2 and the first outer short edge 561B2 and the intersection of the first inner long edge 561A1 and the first inner short edge 561B1.

A first drawn electrode 563 (see FIGS. 1 and 3), which extends along one of the drawing grooves 511A toward the edge C3-C4, is connected to the first electrode 561. The drawing groove 511A is provided with a bump section 511B, which protrudes toward the second substrate 52, and part of the first drawn electrode 563 extends to a surface of the bump section 511B that is the surface facing the second substrate 52. The bump section 511B may be integrated with the first substrate 51 or may be bonded to the first substrate 51, for example, via an elastic member made, for example, of a resin. The first drawn electrode 563, which extends onto the bump section 511B, is in contact with a first connection electrode 565 (see FIG. 1), which is provided on the second substrate 52, and electrically continuous with the first connection electrode 565.

An insulating film for ensuring insulation between the first electrode 561 and the second electrode 562 may be layered on the first electrode 561.

The mirror attachment section 512 is formed in an oblong shape in the plan view, as described above, is provided in a region inside the electrode placement groove 511, and protrudes toward the second substrate 52.

A protruding front end surface of the mirror attachment section 512 is a flat surface, and the first mirror 54, which has an oblong shape in the plan view, is provided on the protruding front end surface. Specifically, the first mirror 54 is formed in an oblong shape having a width Lmx in the direction X and a width Lmy in the direction Y with Lmx>Lmy satisfied.

The first mirror 54 can be formed, for example, of a metal film made, for example, of Ag, an alloy film made, for example, of an Ag alloy, or a dielectric multilayer film formed of a high refraction layer (made, for example, of $TiO_2$) and a low refraction layer (made, for example, of $SiO_2$) layered on each other.

Configuration of Second Substrate 52

The second substrate 52 has a movable section 521, which is formed around the filter center axis O, a holding section 522, which is coaxial with the movable section 521 and holds the movable section 521, and a substrate outer circumferential section 523, which is provided in a region outside the holding section 522. The +X-side end (edge C7-C8) of the second substrate 52 protrudes outward beyond the +X-side end (edge C3-C4) of the first substrate 51 and forms a connection terminal section 524.

Figure 4:
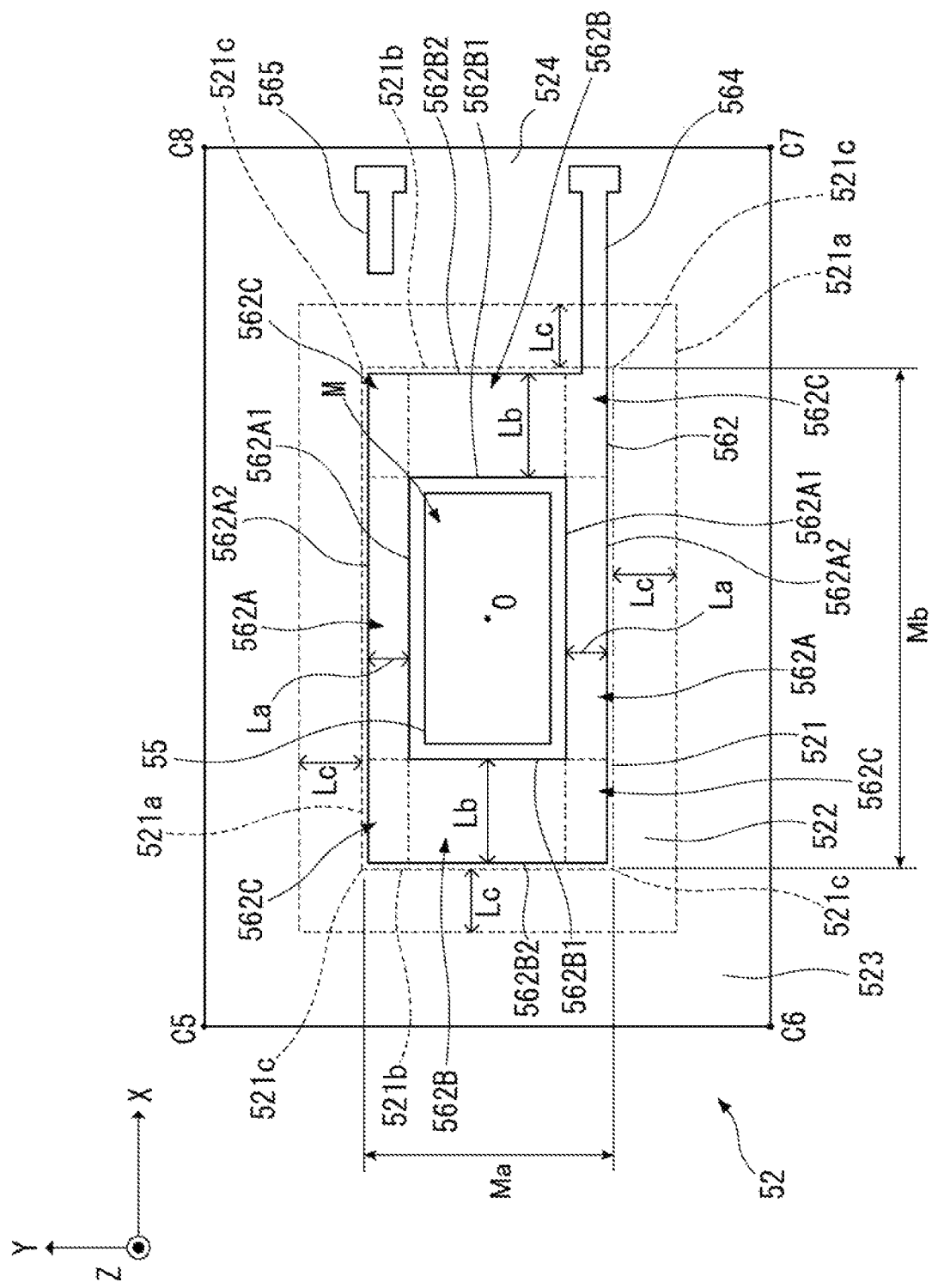
FIG. 4 is a plan view of the second substrate in the first embodiment viewed from the side facing the first substrate.

FIG. 4 is a plan view showing the configuration of the second substrate 52 viewed from the side facing the first substrate 51.

The movable section 521 is formed in an oblong shape around the filter center axis O in the plan view, as shown in FIGS. 1 and 4. More specifically, the movable section 521 is formed in an oblong shape having a width Mb in the direction X (the third direction in an aspect of the invention) greater than a width Ma in the direction Y (the second direction in an aspect of the invention) (Ma<Mb) and has a pair of long edges 521a parallel to the direction X and a pair of short edges 521b parallel to the direction Y. The long edges 521a and the short edges 521b are perpendicular to each other in the plan view (corner points 521c). The movable section 521 in the description refers to a portion having a dimension (thickness) t in the direction Z (portion having uniform thickness t), as shown in FIG. 2.

The outer circumferential edge line of the movable section 521 is linked to the holding section 522 along the circumferential direction (over entire circumference). That is, the edges of the movable section 521 are linked to the holding section 522 in the plan view.

The holding section 522 is a diaphragm that surrounds the circumference of the movable section 521 and is thinner than the movable section 521. The holding section 522 has a uniform thickness, as shown in FIG. 2. The holding section 522 is formed in a rectangular frame-like shape having an inner circumferential edge line linked to the movable section 521, and the outer circumferential edge line of the holding section 522 is provided in a position separate by a dimension $L_C$ from the edge line of the movable section 521.

The substrate outer circumferential section 523 is provided in a region outside the holding section 522 in the plan view. The substrate outer circumferential section 523 is bonded to the first substrate 51 via the bonding film in a region facing a first bonded section 513 of the first substrate 51.

The second mirror 55 and the second electrode 562 are provided on a surface of the second substrate 52 that is the surface facing the first substrate 51 of the movable section 521.

The second mirror 55 is formed in an oblong shape around the filter center axis O with the width in the direction X greater than the width in the direction Y, and the shape of the second mirror 55 is similar to that of the movable section 521 and the same as that of the first mirror 54. The second mirror 55 coincides with the first mirror 54 in the plan view. That is, the second mirror 55 is formed in an oblong shape having the width Lmx in the direction X (third mirror width) and the width Lmy in the direction Y (second mirror width) (Lmx>Lmy).

In the present embodiment, the region where the first mirror 54 and the second mirror 55 coincide with each other in the plan view is a mirror region M in an aspect of the invention. That is, the mirror region M falls within the movable section 521 in the plan view. Light incident on the wavelength tunable interference filter 5 undergoes multiple interference in the mirror region M between the first mirror 54 and the second mirror 55. Light fluxes having a predetermined wavelength according to the gap dimension of the gap G undergo constructive interference, and the resultant light exits out of (passes through) the wavelength tunable interference filter 5.

The second mirror 55 can be formed, for example, of a metal film made, for example, of Ag, an alloy film made, for example, of an Ag alloy, or a dielectric multilayer film formed of a high refraction layer (made, for example, of $TiO_2$) and a low refraction layer (made, for example, of $SiO_2$) layered on each other, as in the case of the first mirror 54.

The second electrode 562 is located in a region outside the second mirror 55 and formed in a rectangular annular shape (closed annular shape) that surrounds the second mirror 55 in the plan view. In the present embodiment, the second electrode 562 has the same shape as that of the first electrode 561, and the first electrode 561 and the second electrode 562 coincide with each other in the plan view, as described above, to form the electrostatic actuator 56.

More specifically, the second electrode 562 includes a pair of second long-edge electrode sections 562A, which are parallel to the direction X, a pair of second short-edge electrode sections 562B, which are parallel to the direction Y, and second corner electrode sections 562C, as shown in FIG. 4.

The second long-edge electrode sections 562A each have a second inner long edge 562A1, which faces the second mirror 55 (mirror region M), and a second outer long edge 562A2, which is opposite the second mirror 55. The width of each of the second long-edge electrode sections 562A, that is, the dimension in the direction Y from the second inner long edge 562A1 to the second outer long edge 562A2 corresponds to the third electrode width in an aspect of the invention and is the long-edge width La, as in the case of the first long-edge electrode sections 561A of the first electrode 561.

The second short-edge electrode sections 562B each have a second inner short edge 562B1, which faces the second mirror 55, and a second outer short edge 562B2, which is opposite the second mirror 55. The width of each of the second short-edge electrode sections 562B, that is, the dimension in the direction X from the second inner short edge 562B1 to the second outer short edge 562B2 corresponds to the second electrode width in an aspect of the invention and is the short-edge width Lb, as in the case of the first short-edge electrode sections 561B.

That is, the second electrode 562 is so configured that the short-edge width Lb of the second short-edge electrode sections 562B is greater than the long-edge width La of the second long-edge electrode sections 562A (La<Lb).

The second corner electrode sections 562C are each continuous with one end of the corresponding second long-edge electrode section 562A and one end of the corresponding second short-edge electrode section 562B and each include the intersection of the second outer long edge 562A2 and the second outer short edge 562B2 and the intersection of the second inner long edge 562A1 and the second inner short edge 562B1.

The second electrode 562 is provided with a second drawn electrode 564, which extends toward the connection terminal section 524, as shown in FIGS. 1 and 4. The second drawn electrode 564 is so disposed as to face one of the drawing grooves 511A provided in the first substrate 51.

The second substrate 52 is further provided with an (independent) first connection electrode 565, which is not connected to the second electrode 562 or the second drawn electrode 564 but extends from the position facing the bump section 511B on the drawing groove 511A to the connection terminal section 524. The first connection electrode 565 is connected in the position facing the drawing groove 511A to the first drawn electrode 563 disposed at the protruding front end of the bump section 511B.

Planar Size of Wavelength Tunable Interference Filter

Figure 5:
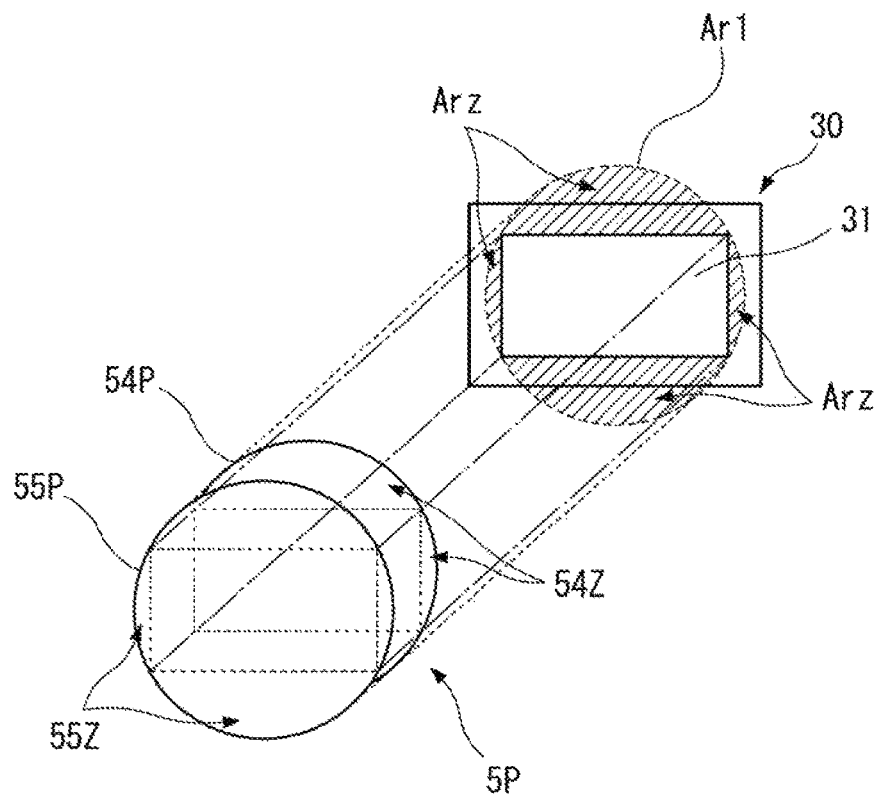
FIG. 5 shows the relationship of a wavelength tunable interference filter of related art including a first mirror and a second mirror each having a circular shape with a light receiving section.
Figure 6:
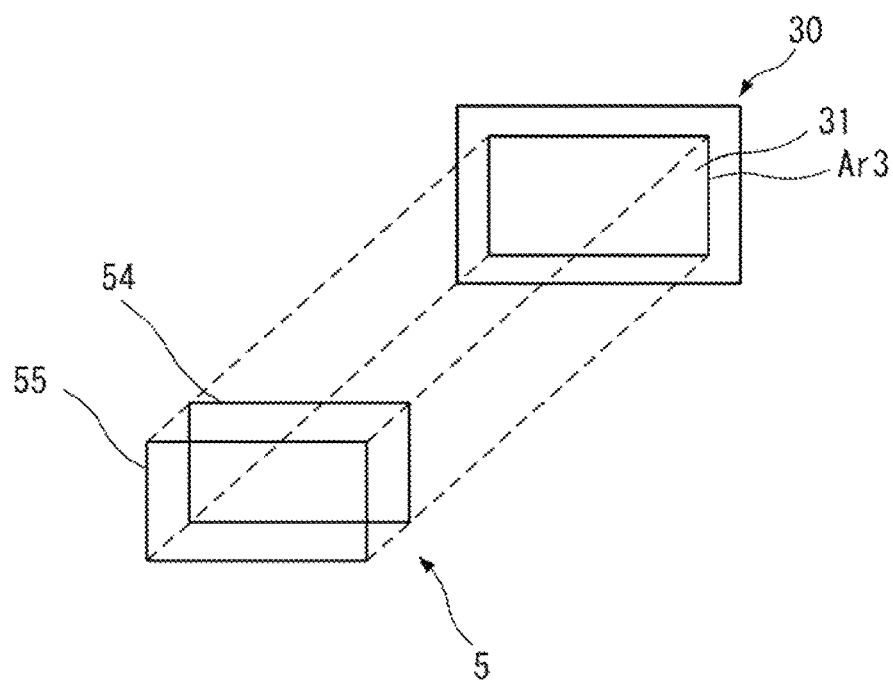
FIG. 6 shows the relationship of a first mirror and a second mirror of the wavelength tunable interference filter according to the first embodiment with the light receiving section.

FIG. 5 shows the relationship between a wavelength tunable interference filter 5P of related art, which includes a first mirror 54P and a second mirror 55P each having a circular shape, and a light receiving section 30. FIG. 6 shows the relationship between the wavelength tunable interference filter 5 according to the present embodiment and the light receiving section 30. FIGS. 5 and 6 show a case where no optical member is disposed between the wavelength tunable interference filters 5, 5P and the light receiving section 30 for ease of description, but a lens or any other optical member may be interposed between the wavelength tunable interference filters 5, 5P and the light receiving section 30.

The wavelength tunable interference filter 5 is an optical filter that transmits light having a predetermined wavelength out of incident light incident on the mirror region M and is used in some cases in combination with the light receiving section 30 shown in FIGS. 5 and 6.

The light receiving section 30, which is formed of a CCD or any other image sensor, receives the light having passed through the wavelength tunable interference filter 5 and acquires a spectral image. The thus functioning light receiving section 30 typically has a rectangular light receiving region 31, as shown in FIGS. 5 and 6, receives the light via photodiodes arranged in a two-dimensional array in the rectangular light receiving region 31, and produces data on a rectangular image extending in the horizontal and vertical directions.

Therefore, to allow the entire light receiving region 31 to receive the light having passed through the wavelength tunable interference filter 5 and having a wavelength according to the mirror gap G, the shape and size (planar size) of the mirror region M (second mirror 55) in the plan view need to be so set that the light receiving region 31 falls within the region via which the light having passed through the wavelength tunable interference filter 5 is outputted.

In the wavelength tunable interference filter 5P of related art shown in FIG. 5, the first mirror 54P and the second mirror 55P each have a circular shape. The light having passed through the wavelength tunable interference filter 5P therefore has a circular cross-section perpendicular to the optical axis, so that a circular region Ar1 on the light receiving section 30 is irradiated with the light. In this case, to allow the entire light receiving region 31 of the light receiving section 30 to receive the light having passed through the wavelength tunable interference filter 5P and having a target wavelength, and to minimize the planar size of the first mirror 54P and the second mirror 55P, the diameter of the first mirror 54P and the second mirror 55P is so set that the light receiving region 31 inscribes the circular region Ar1.

In the case where the light receiving region 31 has a rectangular shape, as shown in FIG. 5, however, regions of the circular region Ar1 that do not overlap with the light receiving region 31 form unnecessary regions Arz, which do not contribute to the light reception performed by the light receiving section 30. That is, the circular first mirror 54P and second mirror 55P of related art include unnecessary sections 54Z and 55Z, which correspond to the unnecessary regions Arz.

In contrast, in the present embodiment, the first mirror 54 and the second mirror 55 each have a rectangular shape, as shown in FIG. 6. The light having passed through the wavelength tunable interference filter 5 therefore also has a rectangular cross-section perpendicular to the optical axis, and a rectangular region Ar3 of the light receiving section 30 is irradiated with the light. In this case, causing the rectangular region Ar3 to coincide with the light receiving region 31 of the light receiving section 30 prevents creation of the unnecessary regions Arz, as shown in FIG. 6. That is, in the wavelength tunable interference filter 5 according to the present embodiment, the first mirror 54 and the second mirror 55 have no portions or very small portions that form the unnecessary sections 54 or 55Z, whereby the first mirror 54 and the second mirror 55 can be minimized with respect to the light receiving region 31. The planar sizes of the movable section 521, on which the second mirror 55 is provided, and the second substrate 52 can therefore be reduced, whereby the size of the wavelength tunable interference filter 5 can be reduced.

Shape of Displaced and Bent Movable Section 521

In the wavelength tunable interference filter 5 described above, voltage can be applied across the space between the first electrode 561 and the second electrode 562 to drive the electrostatic actuator 56, and the movable section 521 is pulled by the resultant electrostatic attraction toward the first substrate 51 and therefore displaced toward the +Z side.

In the wavelength tunable interference filter 5P of related art including the first mirror 54P and the second mirror 55P each having a circular shape shown in FIG. 5, the movable section is also formed in a circular shape in the plan view in accordance with the planar shape of the second mirror 55P. The thus shaped movable section is uniformly pulled by the holding section, and an outer circumferential portion of the movable section is also displaced by a uniform amount, so that the entire movable section uniformly bends. In this case, the second mirror 55P, which is provided on the movable section, is unlikely to bend.

In contrast, in the case where the oblong second mirror 55 is used to reduce the planar size of the wavelength tunable interference filter 5, the movable section 521 is also formed in an oblong shape in accordance with the shape of the second mirror 55. In this case, when the movable section 521 is displaced in the direction Z, the amount of displacement is likely to change depending on the position on the movable section 521, so that the entire movable section has a non-uniform bent shape, and the movable section 521 is therefore likely to bend.

Figure 7:
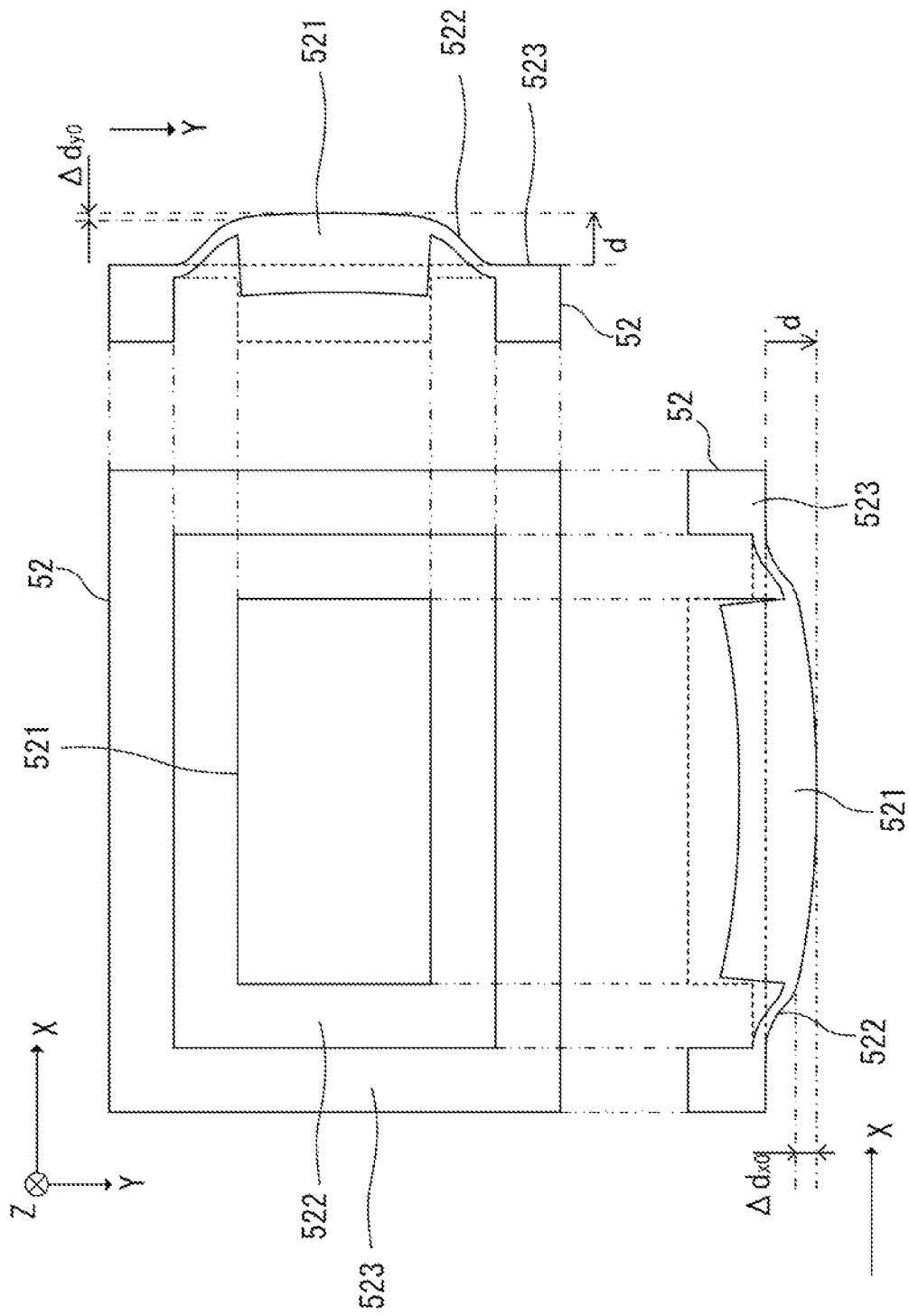
FIG. 7 shows the shape of a movable section in the first embodiment bent in the directions X and Y when the movable section is displaced.

FIG. 7 shows the bent shape of the movable section 521 in the directions X and Y in a case where force is applied along the filter center axis O to displace the movable section 521 by d.

In a specific description, displacement of a central portion of the movable section 521 in the direction Z causes a difference in the amount of displacement in the direction Z between the center of the movable section 521 (intersection of movable section 521 and filter center axis O) and the outer circumferential edge line of the movable section 521, as shown in FIG. 7. That is, in the configuration in which the outer circumferential edge line of the movable section 521 is linked to and held by the holding section 522 along the circumferential direction, displacement of the movable section 521 in the direction Z causes restoring force (spring force produced by holding section 522) that causes the movable section 521 to return to the original position to act on the portion where the movable section 521 is linked to the holding section 522.

In this situation, in a case where the movable section 521 has a shape having a longitudinal direction (oblong shape, for example), there is a difference in the bendability between the long-edge direction (direction X) and the short-edge direction (direction Y), so that the longer the distance from the center of the movable section 521, the greater the difference in the amount of displacement. For example, the difference $\Delta d_{x0}$ in the amount of displacement between the center of the movable section 521 and the ±X opposite ends of the movable section 521 is greater than the difference $\Delta d_{y0}$ in the amount of displacement between the center of the movable section 521 and the ±Y opposite ends of the movable section 521, and the movable section 521 therefore bends along the direction X. The bent movable section 521 undesirably bends the second mirror 55 provided in the mirror region M.

To address the problem described above, in the present embodiment, force is so applied to the movable section 521 that the force applied to the ±X opposite ends of the movable section 521 is greater than the force applied to ±Y opposite ends thereof to suppress the amount of bending at the ±X opposite ends.

Figure 8:
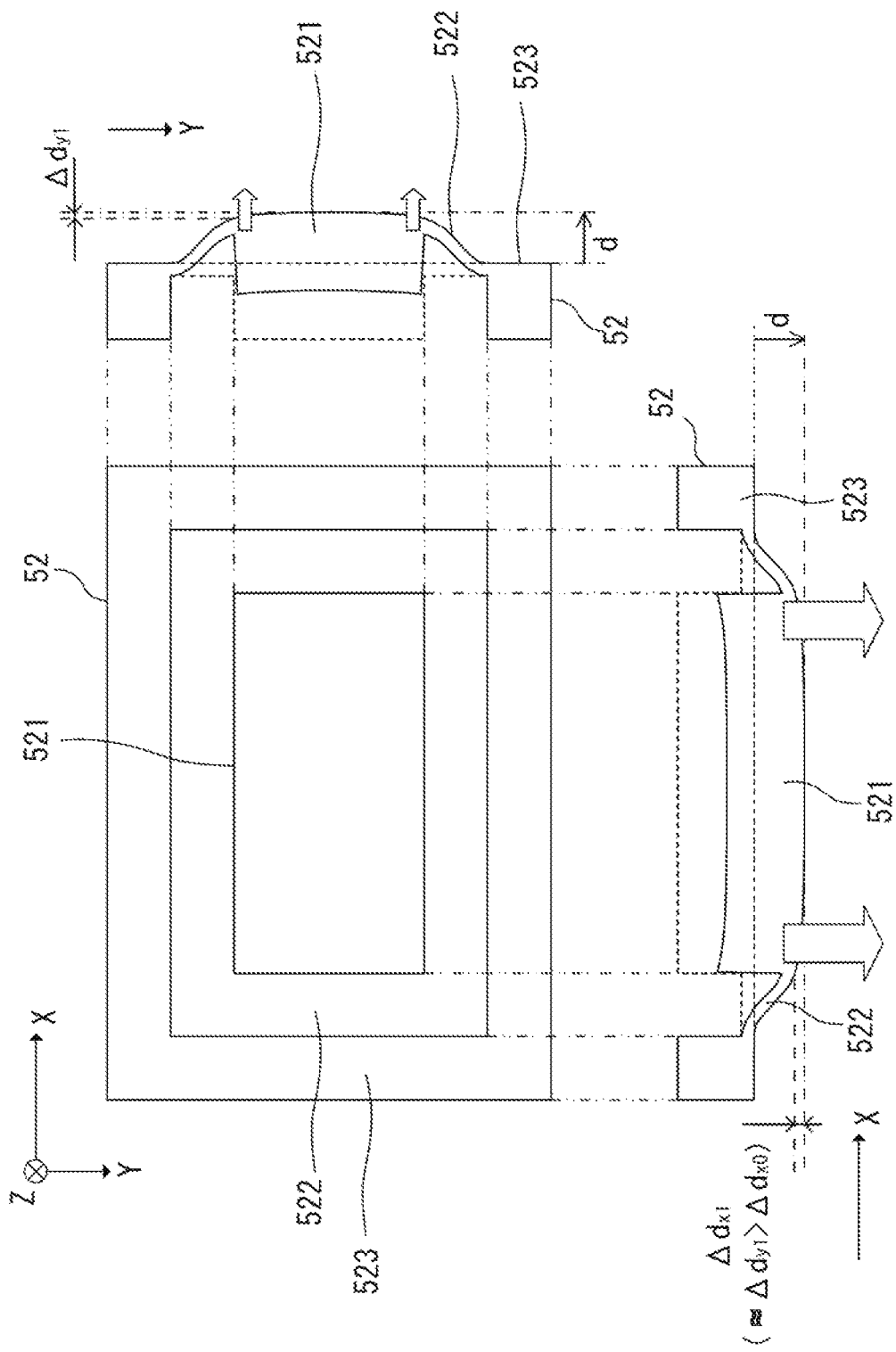
FIG. 8 shows the shape of the movable section bent when voltage is applied to an electrostatic actuator in the first embodiment.

FIG. 8 shows the shape of the movable section 521 bent when voltage is applied to the electrostatic actuator 56 in the present embodiment.

Specifically, in the present embodiment, the width of the first short-edge electrode sections 561B and the second short-edge electrode sections 562B (short-edge width Lb) is greater than the width of the first long-edge electrode sections 561A and the second long-edge electrode sections 562A (long-edge width La). Therefore, when voltage is applied to the electrostatic actuator 56, electrostatic attraction acts on the movable section 521 in such a way that the electrostatic attraction acting on the ±X opposite ends of the movable section 521 is greater than the electrostatic attraction acting on the ±Y opposite ends thereof.

The amount of displacement $\Delta d_{x1}$ at the ±X opposite ends of the movable section 521 is therefore roughly equal to the amount of displacement $\Delta d_{y1}$ at the ±Y opposite ends of the movable section 521, as shown in FIG. 8, so that the amount of bending of the movable section 521 in the long-edge direction (direction X) is suppressed, whereby the amount of bending of the second mirror 55 provided on the movable section 521 is also suppressed.

Advantageous Effects of First Embodiment

In the present embodiment, the mirror region M (second mirror 55) has an oblong shape, and the width Lmy of the mirror region M in the direction Y, which is the second mirror width, is smaller than the width Lmx of the mirror region M in the direction X, which is the third mirror width.

In general, the light receiving section 30, such as an image sensor, has the rectangular light receiving region 31. Therefore, in the case where the light receiving section 30 receives the light having passed through the wavelength tunable interference filter 5 to capture a spectral image, shaping the mirror region M in accordance with the shape of the light receiving region 31 allows reduction in the planar size of the mirror region M (second mirror 55).

Further, in the present embodiment, the movable section 521, on which the second mirror 55 is provided, has an oblong shape having a width in the direction X greater than the width in the direction Y. The size of the movable section 521 can therefore be reduced in accordance with the shape of the second mirror 55, whereby the planar size of the wavelength tunable interference filter 5 can be reduced.

The wavelength tunable interference filter 5 according to the present embodiment includes the movable section 521, on which the second mirror 55 is provided and which is displaceable in the direction Z, and the holding section 522, which surrounds the outer circumference of the movable section 521 and is so linked to the movable section 521 as to hold the movable section 521 displaceable in the direction Z. The movable section 521 is provided with the second electrode 562, which surrounds the circumference of the second mirror 55 in the plan view, and the width of the second electrode 562 varies in the circumferential direction.

In the configuration described above, when the movable section 521 is displaced in the direction Z, the holding section 522 produces restoring force that causes the movable section 521 to return to the original position. Therefore, the easily bent portion of the movable section 521 greatly bends when the movable section 521 is displaced because the holding section 522 pulls the movable section 521 (the amount of displacement at the center of the movable section 521 greatly differs from the amount of displacement of the easily bent portion). In contrast, in the present embodiment, the electrode width is increased in the easily bent portion of the movable section 521, and the electrode width is decreased in the hardly bent portion of the movable section 521, whereby the amount of bending of the movable section 521 can be suppressed when the movable section 521 is displaced. The amount of bending of the second mirror 55 provided on the movable section 521 is therefore also suppressed. The in-plane variation in the wavelength of the light outputted from (passing through) the wavelength tunable interference filter 5 is thus suppressed, whereby the wavelength tunable interference filter can uniformly output light having a desired wavelength, and the wavelength precision of the wavelength tunable interference filter can therefore be improved.

In the present embodiment, the movable section 521 is so shaped that the width thereof in the direction Y is smaller than the width thereof in the direction X, which is perpendicular to the direction Y, in the plan view. Further, the second electrode 562 is so shaped that the width of the second short-edge electrode sections 562B (short-edge width Lb) corresponding to the direction Y is greater than the width of the second long-edge electrode sections 562A (long-edge width La) corresponding to the direction X.

The rectangular movable section 521, which has the long-edge direction that is the direction X and the short-edge direction that is the direction Y, is likely to bend along the direction X, which is the long-edge direction, and is unlikely to bend along the direction Y, which is the short-edge direction, when the movable section 521 is displaced in the direction Z. That is, when the center of the movable section 521 is displaced by the amount of displacement d, the opposite ends of the movable section 521 in the direction X are pulled by the holding section 522 and therefore greatly bend, so that the difference in the amount of displacement between the center and the opposite ends in the direction X increases (displacement in direction Z decreases).

In contrast, in the present embodiment, the short-edge width Lb of the second short-edge electrode sections 562B, which are disposed in opposite end portions in the direction X, is greater than the long-edge width La of the second long-edge electrode sections 562A, which are disposed in opposite end portions in the direction Y. Therefore, when drive voltage is applied to the electrostatic actuator 56, larger electrostatic attraction acts on the opposite end portions in the direction X, so that the amount of bending of the movable section 521 along the direction X is suppressed. The amount of bending of the second mirror 55 provided on the movable section 521 is therefore also suppressed, whereby the wavelength precision of the wavelength tunable interference filter 5 is improved.

In the present embodiment, the second electrode 562 is formed in a closed annular shape that surrounds the second mirror 55.

The electrostatic attraction can therefore be applied to the entire annular region that surrounds the second mirror 55, whereby the situation in which the second mirror 55 inclines can be avoided.

Second Embodiment

A wavelength tunable interference filter 5 according to a second embodiment will next be described.

In the case of the movable section 521 having a polygonal (rectangular) outer circumferential shape, such as that described in the first embodiment, the corner points 521*c*, which form the rectangular shape, that is the intersections of the long edges 521*a* and the short edges 521*b*, which form the outer circumferential edge line of the movable section 521, are more likely to bend than the other portion of the movable section 521. That is, when the movable section 521 is displaced by a predetermined dimension in the direction Z, the amount of displacement of the corners points 521*c* of the movable section 521 greatly differs from the amount of displacement at the center of the movable section 521 as compared with the amount of displacement of a central portion of each of the long edges 521*a* and the short edges 521*b*. In contrast, the second embodiment differs from the first embodiment described above in that the corner points 521*c* are more greatly displaced toward the first substrate 51 to further reduce the amount of bending of the movable section 521.

Figure 9:
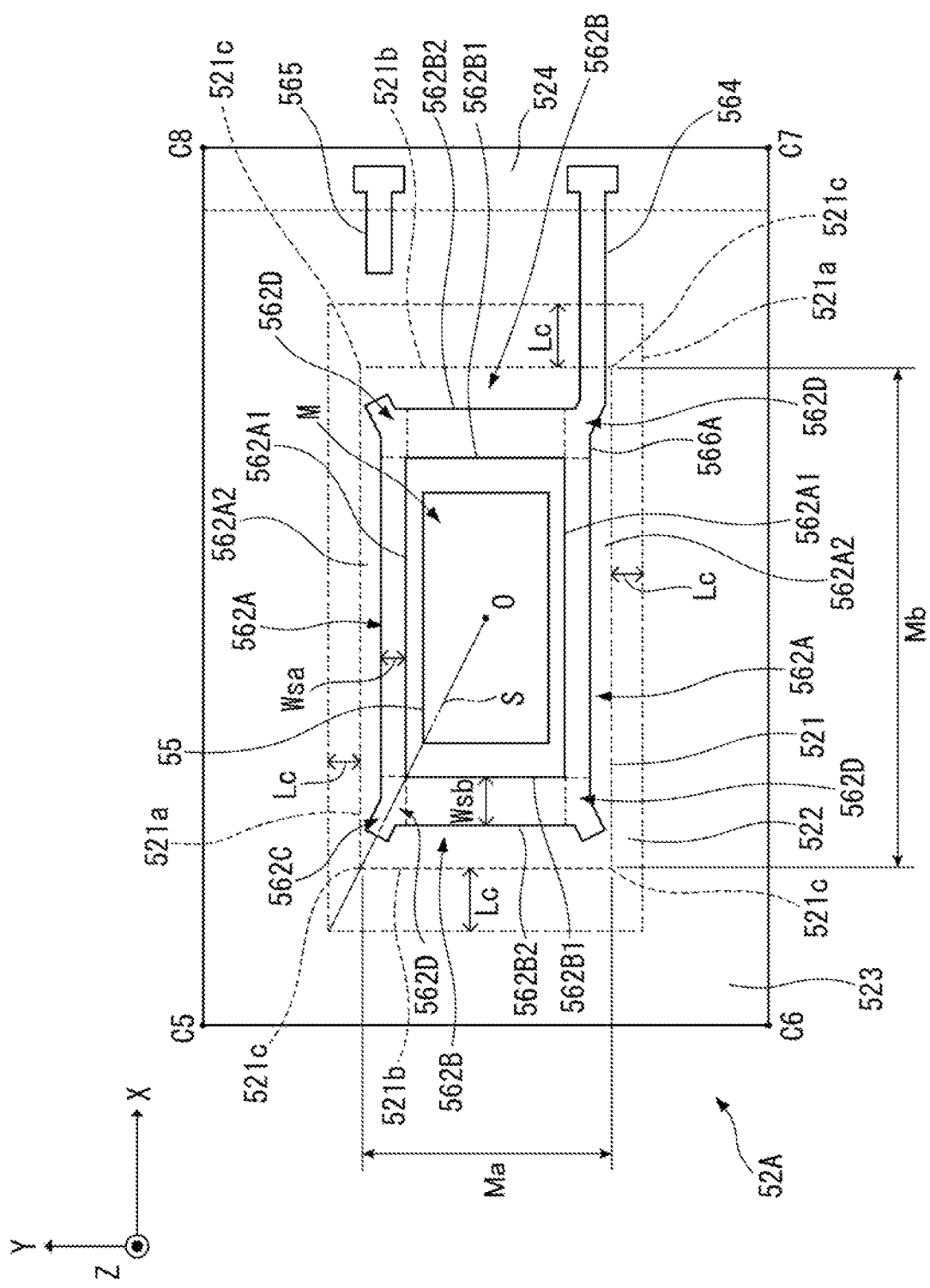
FIG. 9 is a plan view of a movable section of a second substrate in a wavelength tunable interference filter according to a second embodiment viewed from the side facing a first substrate.
Figure 10:
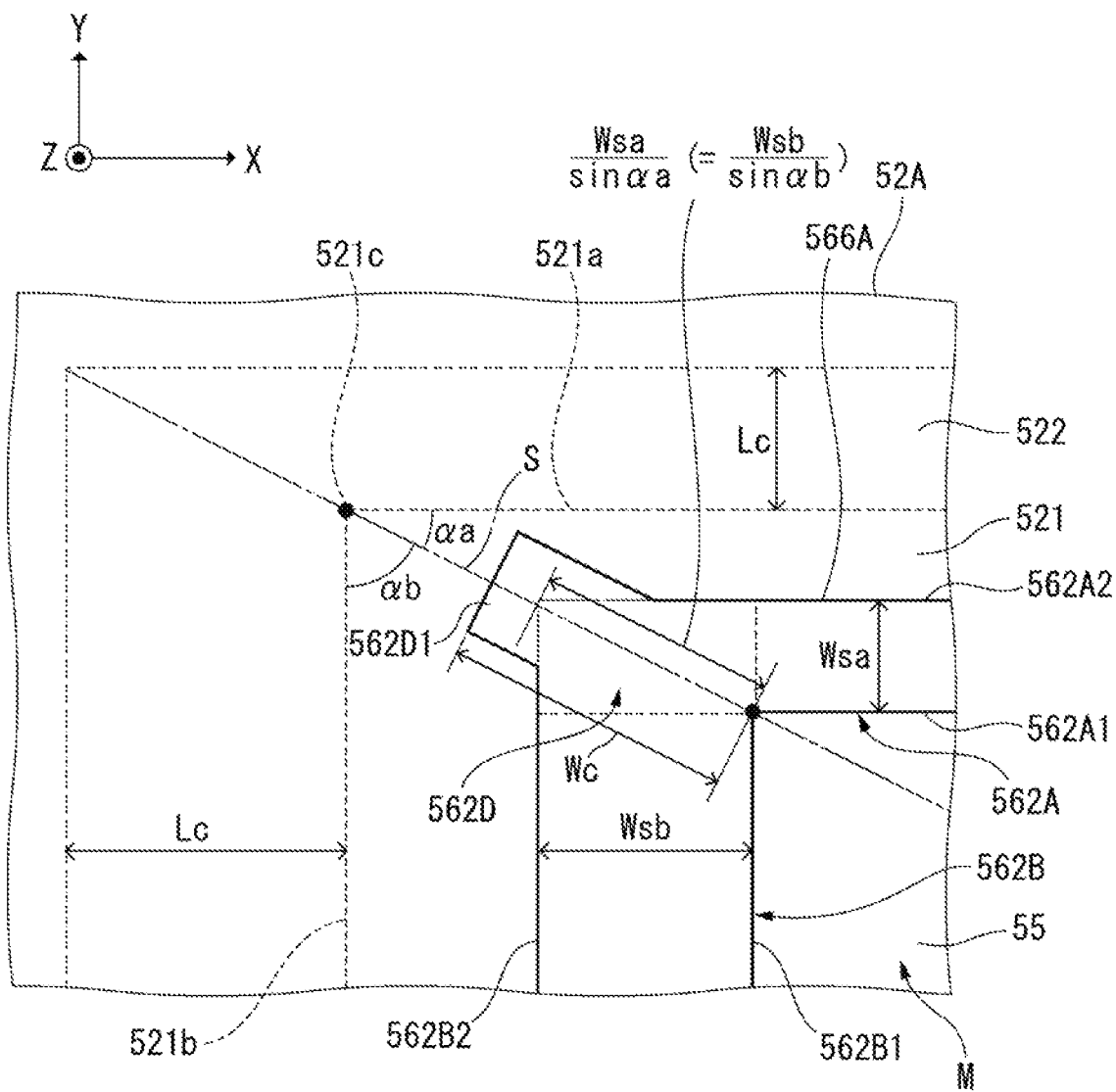
FIG. 10 is an enlarged plan view of one of corner points of the movable section and therearound in FIG. 9.

FIG. 9 is a plan view of the movable section 521 of a second substrate 52A in the wavelength tunable interference filter 5 according to the second embodiment viewed from the side facing the first substrate 51. FIG. 10 is an enlarged plan view of one of the corner points 521*c* and therearound in FIG. 9.

In the following description, the components having already been described have the same reference characters, and descriptions thereof will be omitted or simplified.

In the second embodiment, a second electrode 566A is so formed that the electrode width is further increased with respect to the corner points 521*c* of the movable section 521, as shown in FIGS. 9 and 10.

Specifically, the second electrode 566A includes a pair of second long-edge electrode sections 562A, which are parallel to the direction X, a pair of second short-edge electrode sections 562B, which are parallel to the direction Y, and second corner electrode sections 562D, which are continuous with the second long-edge electrode sections 562A and the second short-edge electrode sections 562B.

The second long-edge electrode sections 562A and the second short-edge electrode sections 562B are the same as those in the first embodiment and will not be described.

In the present embodiment, the short edges 521*b* of the movable section 521 form the fourth edge line in an aspect of the invention, the long edges 521*a* of the movable section 521 form the fifth edge line in an aspect of the invention, and the short edges 521*b* and the long edges 521*a* correspond to the edge sections of the polygonal movable section 521. Out of the portions that form the second electrode 562, the second long-edge electrode sections 562A correspond to the fourth electrode section and the side electrode section in an aspect of the invention, the second inner long edges 562A1 correspond to the fourth inner edge in an aspect of the invention, the second outer long edges 562A2 correspond to the fourth outer edge in an aspect of the invention, and the direction X corresponds to the fourth direction (in the present embodiment, the fourth direction coincides with the third direction). Further, out of the portions that form the second electrode 562, the second short-edge electrode sections 562B correspond to the fifth electrode section and the side electrode section in an aspect of the invention, the second inner short edges 562B1 correspond to the fifth inner edge in an aspect of the invention, the second outer short edges 562B2 correspond to the fifth outer edge in an aspect of the invention, and the direction Y corresponds to the fifth direction (in the present embodiment, the fifth direction coincides with the second direction).

In the present embodiment, the second corner electrode sections 562D each include an outer protruding section 562D1, which has an outer circumferential edge line that protrudes outward (away from second mirror 55) beyond the second outer long edge 562A2 and the second outer short edge 562B2, as shown in FIGS. 9 and 10.

In the example shown in FIGS. 9 and 10, the outer protruding sections 562D1 are provided inside the movable section 521 in the plan view. Instead, for example, the outer protruding sections 562D1 may be so provided as to extend from the movable section 521 to the holding section 522 in the plan view. In this case, the second outer long edges 562A2 of the second long-edge electrode sections 562A can be so disposed as to be shifted toward the long edges 521a of the movable section 512, and the second outer short edges 562B2 of the second short-edge electrode sections 562B can be so disposed as to be shifted toward the short edges 521b of the movable section 512.

The width of the second long-edge electrode sections 562A in the direction Y perpendicular to the long edges 521a is the width Wsa of a first side electrode section, and the width of the second short-edge electrode sections 562B in the direction X perpendicular to the short edges 521b is the width Wsb of a second side electrode section (Wsb>Wsa in the present embodiment), as shown in FIG. 10. Further, let a radial straight line S be the straight line extending from the filter center axis O, which is the center (center of gravity) of the movable section 521, toward one of the corner points 521c of the movable section 521, and let Wc be the electrode width of the second corner electrode section 562D along the radial straight line S. Further, let $\alpha a$ be the angle between the radial straight line S and the long edge 521a, and let $\alpha b$ be the angle between the radial straight line S and the short edge 521b.

In the present embodiment, the second corner electrode sections 562D are each provided with the outer protruding section 562D1, which protrudes outward (toward corner point 521c) beyond the second outer long edge 562A2 and the second outer short edge 562B2. The width Wc of the second corner electrode section 562D therefore satisfies Wc>Wsa/sin $\alpha a$ and Wc>Wsb/sin $\alpha b$.

Although not shown, the first electrode 561 is formed in the same shape as that of the second electrode 566A and in the position where the first electrode 561 coincides with the second electrode 566A in the plan view, as in the first embodiment. That is, the first corner electrode sections 561C of the first electrode 561 are also each provided with an outer protruding section having an outer circumferential edge line that protrudes outward (away from first mirror 54) beyond the first outer long edge 561A2 and the first outer short edge 561B2, as are the second corner electrode sections 562D.

Advantageous Effects of Second Embodiment

In the present embodiment, the movable section 521 has a rectangular shape formed of the long edges 521a and the short edges 521b connected to each other via the corner points 521c. Further, the second electrode 566A includes the second long-edge electrode sections 562A, which extend along the long edges 521a, the second short-edge electrode sections 562B, which extend along the short edges 521b, and the second corner electrode sections 562D, which are connected to the second long-edge electrode sections 562A and the second short-edge electrode sections 562B and provided in the positions corresponding to the corner points 521c. The second corner electrode sections 562D each include the outer protruding section 562D1, which protrudes in the direction away from the mirror region M (second mirror 55). That is, the electrode width Wc of the second corner electrode sections 562D and the electrode width Wsa of the second long-edge electrode sections 562A, which are each the side electrode section, satisfy Wc>Wsa/sin $\alpha a$, and the electrode width Wc of the second corner electrode sections 562D and the electrode width Wsb of the second short-edge electrode sections 562B satisfy Wc>Wsb/sin $\alpha b$.

Since the corner points 521c of the movable section 521 are likely to be bend as compared with the other portion of the movable section 521, there is a large difference in the amount of displacement between the corner points 521c and the center of the movable section 521 when the movable section 521 is displaced in the direction Z. In contrast, in the present embodiment, since the outer protruding sections 562D1 are provided, and the width Wc of the second corner electrode sections 562D satisfies the conditions described above, larger electrostatic attraction can be applied to the corner points 521c, whereby the amount of bending of the movable section 521 can be suppressed. The amount of bending of the second mirror 55 provided in the mirror region M of the movable section 521 can thus be suppressed.

Third Embodiment

A wavelength tunable interference filter 5 according to a third embodiment will next be described.

In the second embodiment, the configuration in which the second corner electrode sections 562D each include the outer protruding section 562D1 has been presented. In contrast, the third embodiment differs from the second embodiment in that the second corner electrode sections each include a portion that protrudes toward the second mirror.

Figure 11:
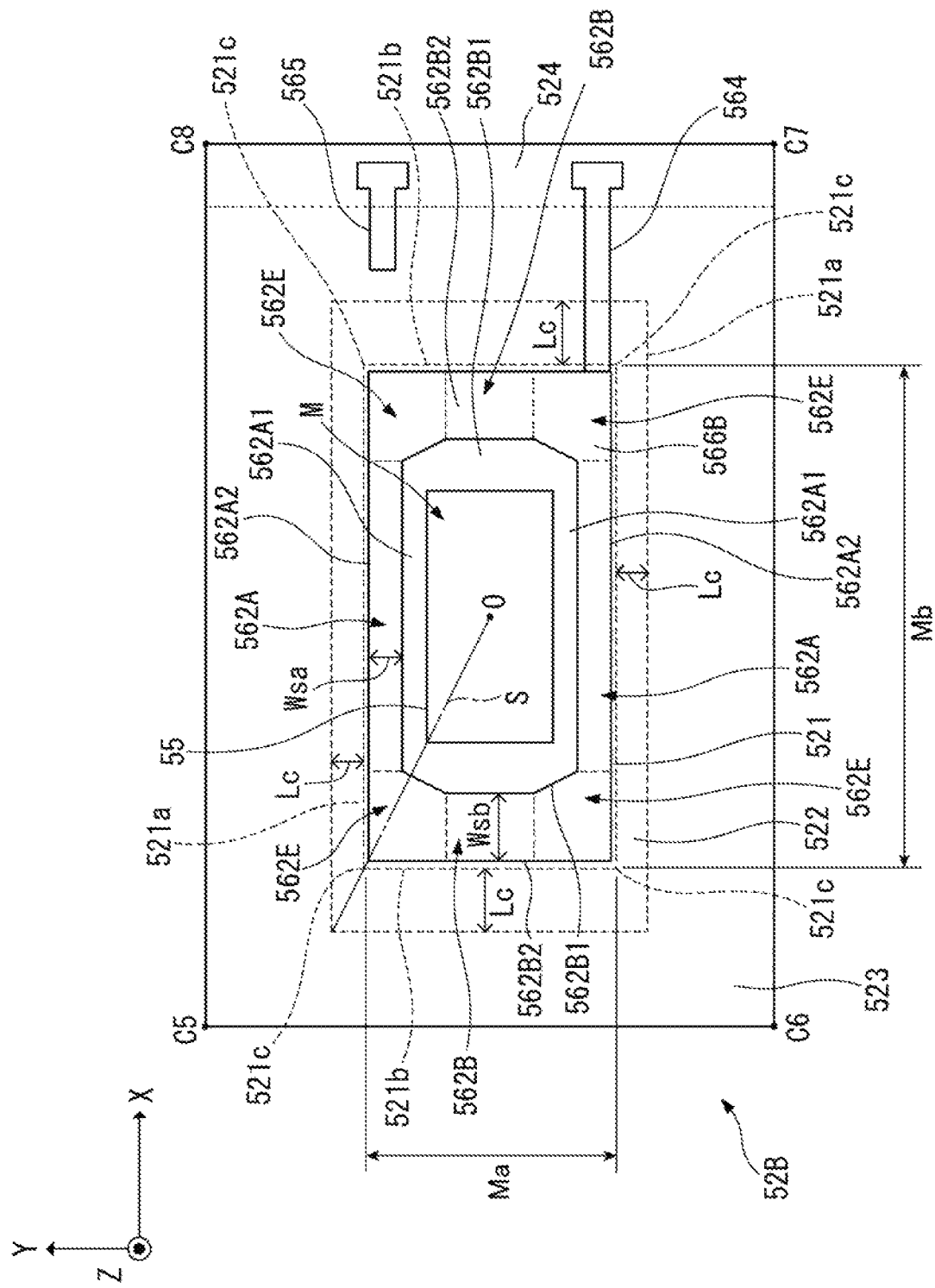
FIG. 11 is a plan view of a movable section of a second substrate in a wavelength tunable interference filter according to a third embodiment viewed from the side facing a first substrate.
Figure 12:
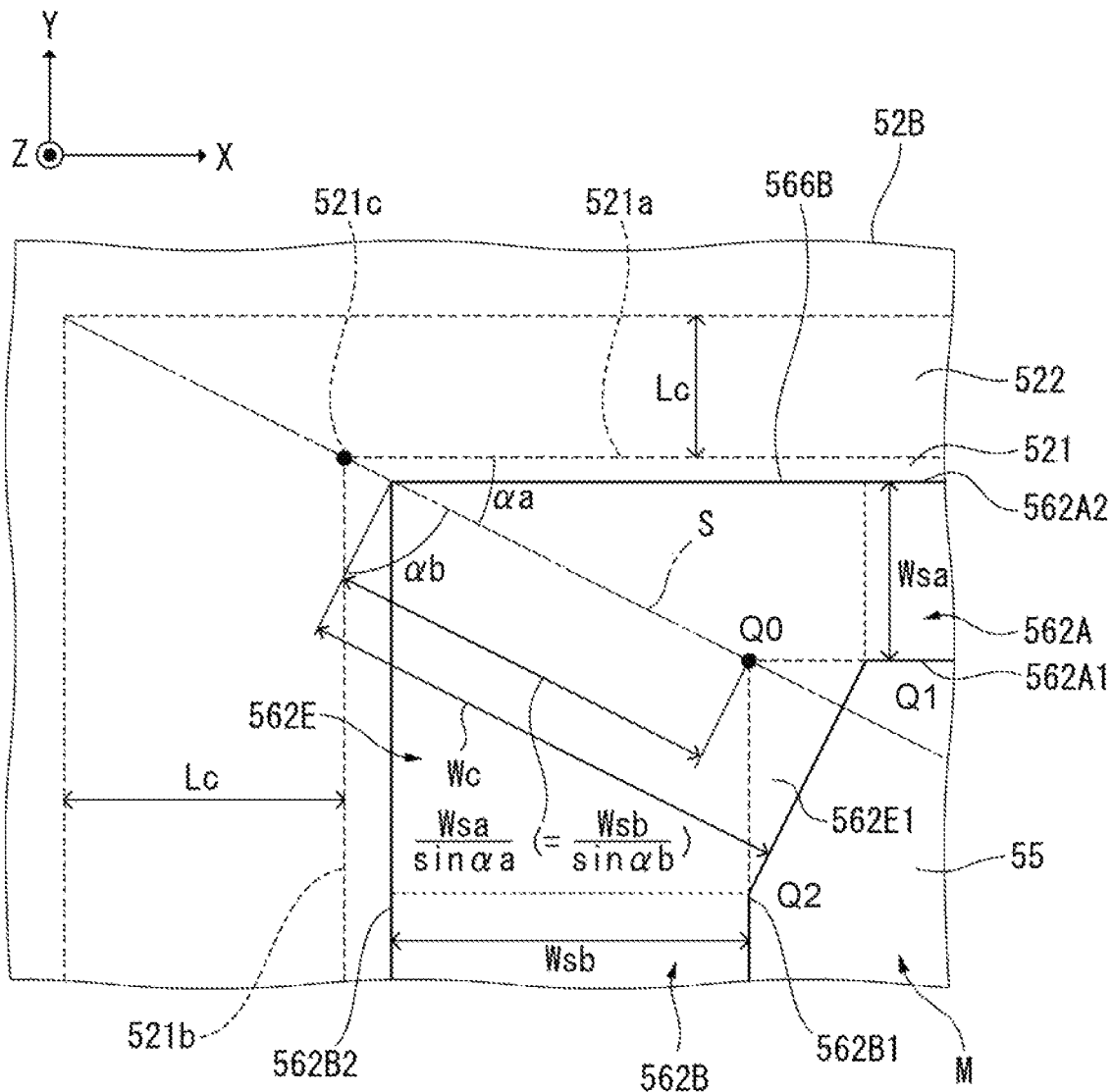
FIG. 12 is an enlarged plan view of one of corner points of the movable section and therearound in FIG. 11.

FIG. 11 is a plan view of the movable section 521 of a second substrate 52B in the wavelength tunable interference filter 5 according to the third embodiment viewed from the side facing the first substrate 51. FIG. 12 is an enlarged plan view of one of the corner points 521c of the movable section 521 and therearound in FIG. 11.

In the case of a second electrode 566B in the third embodiment, second corner electrode sections 562E each include an inner protruding section 562E1, which has an outer circumferential edge line that protrudes inward (toward second mirror 55) beyond the second inner long edge 562A1 and the second inner short edge 562B1, as shown in FIGS. 11 and 12.

Specifically, the inner protruding sections 562E1 are each so shaped as to spread from the intersection of an extension of the second inner long edge 562A1 and an extension of the second inner short edge 562B1 (inner intersection $Q_0$) toward the second mirror 55 and are each continuous with the second long-edge electrode section 562A and the second short-edge electrode section 562B. That is, the inner protruding section 562E1 has a triangular shape surrounded by a first point $Q_1$, which is located on the second inner long edge 562A1 and separate from the inner intersection $Q_0$ by a predetermined distance, a second point $Q_2$, which is located on the second inner short edge 562B1 and separate from the inner intersection $Q_0$ by a predetermined distance, and the inner intersection $Q_0$.

In other words, let $\alpha a$ be the angle between the radial straight line S and the long edge 521a, $\alpha b$ be the angle between the radial straight line S and the short edge 521$b$, Wsa be the width of the second long-edge electrode section 562A (side electrode section) in the direction Y, and Wsb be the width of the second short-edge electrode section 562B (side electrode section) in the direction X, and the electrode width Wc of the second corner electrode section 562E in the direction along the radial straight line S satisfies Wc>Wsa/sin $\alpha$a and Wc>Wsb/sin $\alpha$b, as shown in FIG. 12.

As the shape of the inner protruding sections 562E1, the shape that spreads from the inner intersection $Q_0$ toward the mirror region M has been presented by way of example, but not necessarily. For example, a shape that spreads from the first point $Q_1$ and the second point $Q_2$ toward the mirror region M may be employed. In this case, the width of the shape may decrease with distance toward the mirror region M, or the shape may protrude toward the mirror region M with the width between the first point $Q_1$ and the second point $Q_2$ maintained.

Further, in the third embodiment, the configuration in which only the inner protruding sections 562E1 are provided has been presented by way of example, but not necessarily. The outer protruding sections 562D1 described in the second embodiment may further be provided.

Although not shown, the first electrode 561 is formed in the same shape as that of the second electrode 566B and in the position where the first electrode 561 coincides with the second electrode 566B in the plan view, as in the first embodiment. That is, the first corner electrode sections 561C of the first electrode 561 are also each provided with an outer protruding section having an outer circumferential edge line that protrudes inward (toward first mirror 54) beyond the first inner long edge 561A1 and the first inner short edge 561B1, as are the second corner electrode sections 562E.

Advantageous Effects of Third Embodiment

In the present embodiment, the movable section 521 has a rectangular shape formed of the long edges 521$a$ and the short edges 521$b$ connected to each other via the corner points 521$c$, as in the second embodiment, and the second corner electrode sections 562E are provided in correspondence with the corner points 521$c$. The second corner electrode sections 562E each include the inner protruding section 562E1, which protrudes toward the mirror region M (second mirror 55).

The configuration described above can also provide the same advantageous effects as those provided by the second embodiment. That is, larger electrostatic attraction can be applied to the corner points 521$c$ of the movable section 521, whereby the amount of bending of the movable section 521 can be suppressed.

Fourth Embodiment

A fourth embodiment will next be described.

In the second and third embodiments, the corner points 521$c$ of the movable section 521, which are displaced by the smallest amount and therefore unlikely to bend when the movable section 521 is displaced in the direction Z, are each provided with the second corner electrode section 562D (562E). On the other hand, when the movable section 521 is displaced in the direction Z, the bendability of the movable section 521 changes in accordance with the distance from the center of the movable section 521.

The fourth embodiment differs from the embodiments described above in that the electrode width changes in accordance with the distance from the center of the movable section 521.

Figure 13:
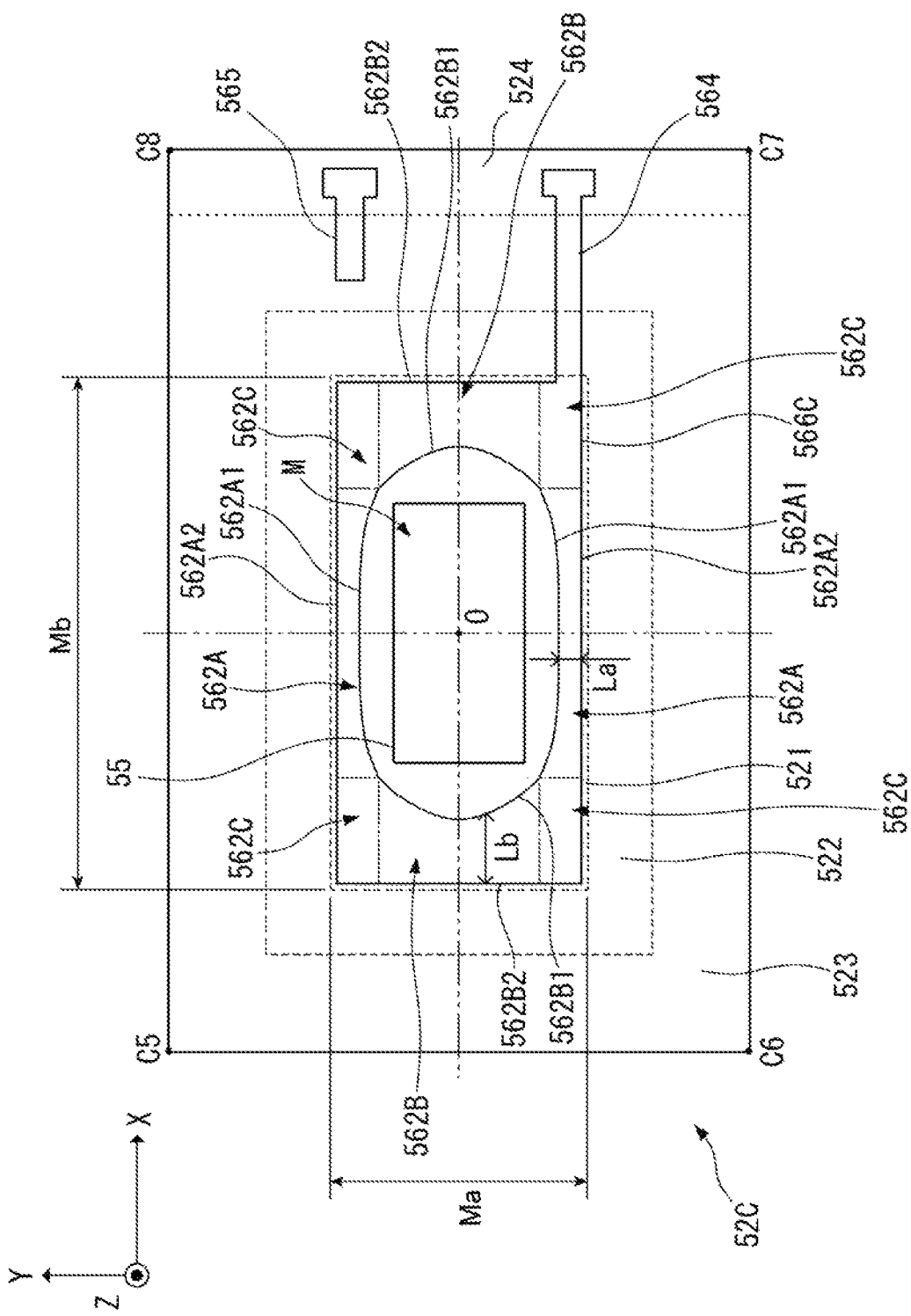
FIG. 13 is a plan view of a second substrate in a wavelength tunable interference filter according to a fourth embodiment viewed from the side facing a first substrate.

FIG. 13 is a plan view of a second substrate 52C in a wavelength tunable interference filter 5 according to the fourth embodiment viewed from the side facing the first substrate 51.

A second electrode 566C in the present embodiment is so configured that the second outer long edges 562A2 of the second long-edge electrode sections 562A are each a straight line parallel to the direction X, as shown in FIG. 13. On the other hand, the second inner long edges 562A1 of the second long-edge electrode sections 562A each incline (curve) in the direction away from the second mirror 55 with distance from the second corner electrode sections 562C at the ±X-side ends of the second inner long edge 562A1 toward the center in the direction X. The long-edge width La of the second long-edge electrode sections 562A therefore decreases with distance from the second corner electrode sections 562C toward the center in the direction X.

Similarly, the second outer short edges 562B2 of the second short-edge electrode sections 562B are each a straight line parallel to the direction Y. On the other hand, the second inner short edges 562B1 of the second short-edge electrode sections 562B each incline (curve) in the direction away from the second mirror 55 with distance from the second corner electrode sections 562C at the ±Y-side ends of the second inner short edge 562B1 toward the center in the direction Y. The short-edge width Lb of the second short-edge electrode sections 562B therefore decreases with distance from the second corner electrode sections 562C toward the center in the direction Y.

Although not shown, the first electrode 561 is formed in the same shape as that of the second electrode 566C and in the position where the first electrode 561 coincides with the second electrode 566C in the plan view, as in the first embodiment. That is, also in the case of the first electrode 561, the long-edge width La of the first long-edge electrode sections 561A gradually decreases from the ±X-side ends thereof toward the center in the direction X, and the short-edge width Lb of the first short-edge electrode sections 561B gradually decreases from the ±Y-side ends thereof toward the center in the direction Y.

Advantageous Effects of Fourth Embodiment

In the wavelength tunable interference filter 5 according to the present embodiment, the second electrode 566C is enlarged in accordance with the distance from the center of the movable section 521.

Therefore, stronger electrostatic attraction can be applied to a more easily bendable portion of the movable section 521 (portion where the amount of displacement thereof greatly differs from the amount of displacement at the center of the movable section 521 when the movable section 521 is displaced), whereby the amount of bending of the movable section 521 can be suppressed.

Fifth Embodiment

A fifth embodiment will next be described.

In each of the first to fourth embodiments described above, the configuration in which the second electrode 562 (566A, 566B, and 566C) has a closed annular shape has been presented by way of example. In contrast, the fifth embodiment differs from the first to fourth embodiments in that the second electrode is formed of a plurality of partial electrodes.

Figure 14:
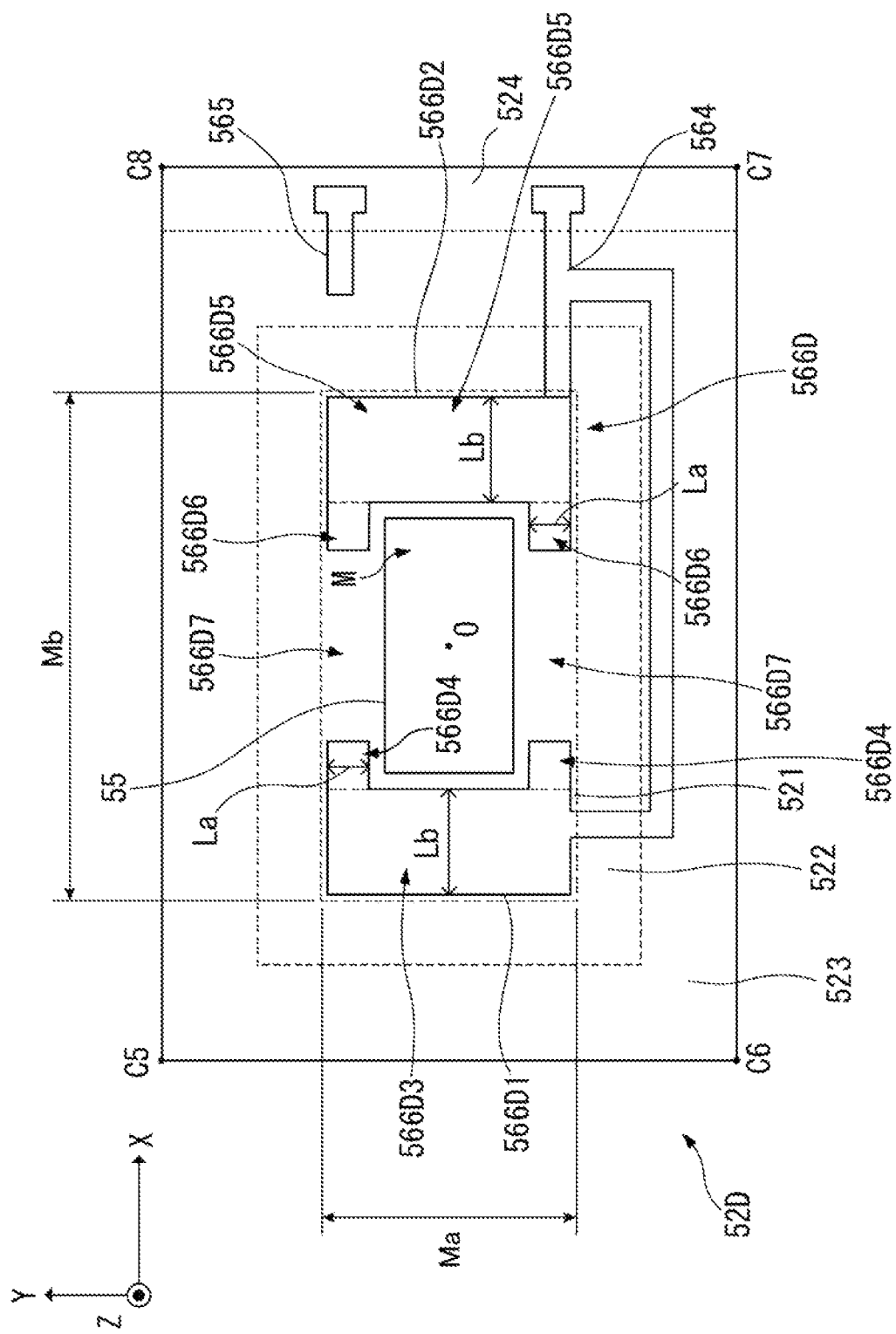
FIG. 14 is a plan view of a second substrate in a wavelength tunable interference filter according to a fifth embodiment viewed from the side facing a first substrate.

FIG. 14 is a plan view of a second substrate 52D in a wavelength tunable interference filter 5 according to the fifth embodiment viewed from the side facing the first substrate 51.

In the case of the second substrate 52D in the present embodiment, a second electrode 566D includes a first partial electrode 566D1 and a second partial electrode 566D2, as shown in FIG. 14.

The first partial electrode 566D1 includes a first short-edge electrode section 566D3, which is provided on the −X side of the movable section 521 and extends from the −Y side to the +Y side, and first long-edge protruding sections 566D4, which protrude from the ±Y-side end portions of the first short-edge electrode section 566D3 toward the +X side. Similarly, the second partial electrode 566D2 includes a second short-edge electrode section 566D5, which is provided on the +X side of the movable section 521 and extends from the −Y side to the +Y side, and second long-edge protruding sections 566D6, which protrude from the ±Y-side end portions of the second short-edge electrode section 566D5 toward the −X side. A predetermined electrode gap 566D7 is provided between the first long-edge protruding sections 566D4 and the second long-edge protruding sections 566D6.

The width Lb of the first short-edge electrode section 566D3 and the second short-edge electrode section 566D5 is greater than the width La of the first long-edge protruding sections 566D4 and the second long-edge protruding sections 566D6, as in the first embodiment.

Further, in the present embodiment, the second drawn electrode 564 is connected to the first partial electrode 566D1 and the second partial electrode 566D2, and the second drawn electrode 564 is connected to the connection terminal section 524. Therefore, when voltage is applied to the electrostatic actuator 56, the first partial electrode 566D1 and the second partial electrode 566D2 have the same potential.

The first partial electrode 566D1 and the second partial electrode 566D2 may be independent of each other. That is, a second drawn electrode 564 connected to the first partial electrode 566D1 and another second drawn electrode 564 connected to the second partial electrode 566D2 may be provided and may extend to the connection terminal section 524.

Although not shown, the first electrode 561 is formed in the same shape as that of the second electrode 566D and in the position where the first electrode 561 coincides with the second electrode 566D in the plan view, as in the embodiments described above. That is, the first electrode 561 also includes a partial electrode disposed on the −X side and a partial electrode disposed on the +X side.

Advantageous Effects of Fifth Embodiment

In the present embodiment, the second electrode 566D includes the first partial electrode 566D1 and the second partial electrode 566D2, which are so disposed as to be separate from each other by the electrode gap 566D7 having a predetermined dimension.

The shape described above, in which the electrode gap 566D7 is provided in a portion that is unlikely to bend, allows electrostatic attraction to act primarily on the portion that is likely to bend, whereby the amount of bending of the movable section 521 can be suppressed.

Although not shown in FIG. 14, between the first partial electrode 566D1 and the second partial electrode 566D2 may be provided another electrode. For example, a mirror electrode can be provided on the first mirror 54 or the second mirror 55 (region that coincides with mirror region M in plan view), and a wiring electrode connected to the mirror electrode can be so provided as to extend to the connection terminal section 524 through the electrode gap 566D7 between the first partial electrode 566D1 and the second partial electrode 566D2.

Sixth Embodiment

An optical device including the wavelength tunable interference filter 5 shown in any of the first to fifth embodiments described above will next be described as a sixth embodiment.

Figure 15:
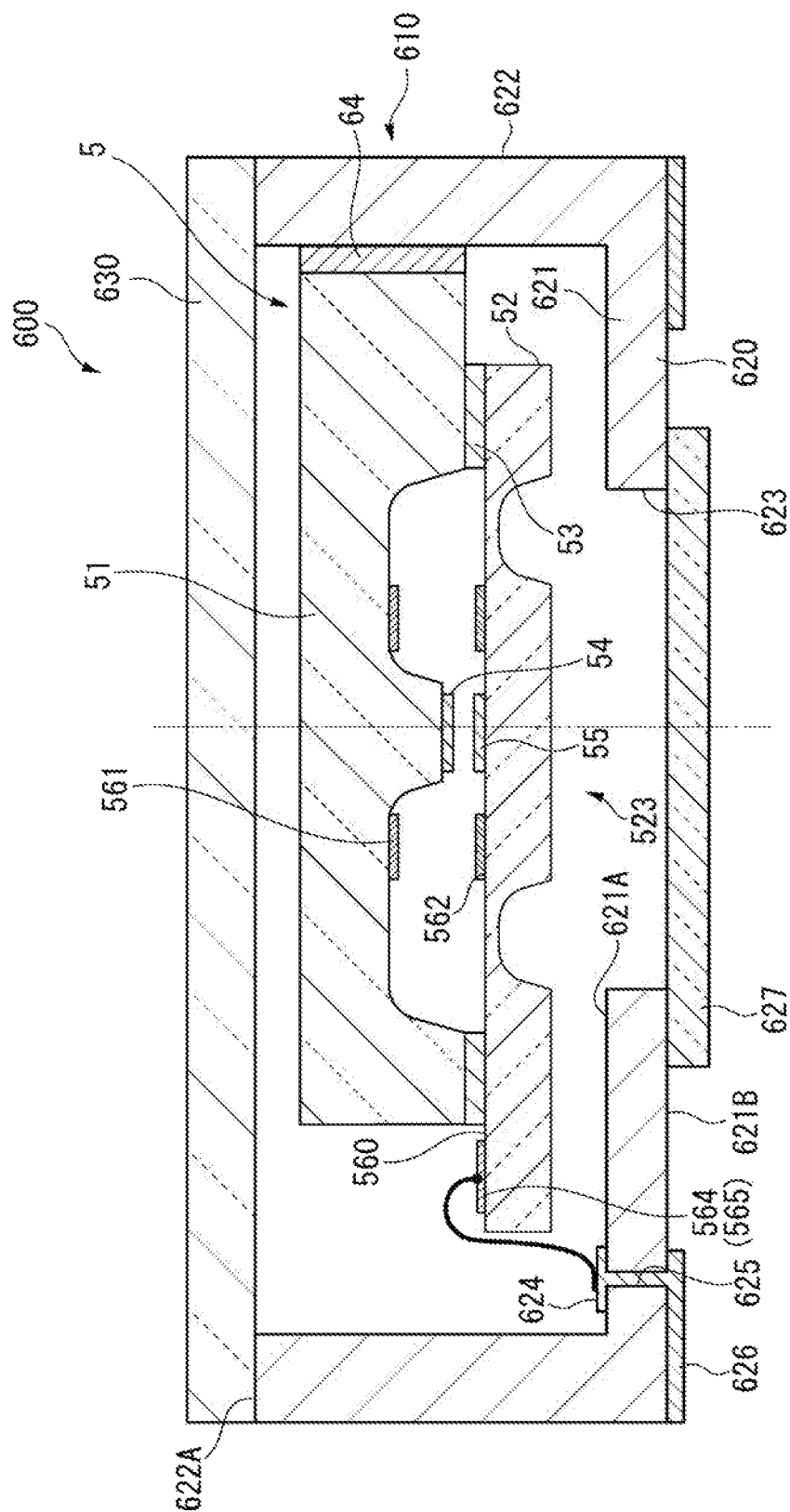
FIG. 15 is a cross-sectional view showing a schematic configuration of an optical device according to a sixth embodiment.

FIG. 15 is a cross-sectional view showing a schematic configuration of an optical device 600 according to the sixth embodiment.

The optical device 600 includes an enclosure 610 and the wavelength tunable interference filter 5 accommodated in the enclosure 610, as shown in FIG. 15.

The enclosure 610 includes a base 620 and a lid 630, as shown in FIG. 15. The base 620 and the lid 620 are bonded to each other to form an internal accommodation space, and the wavelength tunable interference filter 5 is accommodated in the accommodation space.

Configuration of Base

The base 620 is made, for example, of a ceramic material. The base 620 includes a mount section 621 and a sidewall section 622.

The mount section 621 is formed, for example, in a flat-plate-like shape having a rectangular outer shape in the filter plan view, and the tubular sidewall section 622 rises from an outer circumferential portion of the mount section 621 toward the lid 630.

The mount section 621 has an opening 623, which passes through the mount section 621 in the thickness direction thereof. With the wavelength tunable interference filter 5 placed on the mount section 621, the opening 623 is so provided as to include a region that overlaps with the first mirror 54 and the second mirror 55 in a plan view of the mount section 621 viewed in the thickness direction.

A glass member 627, which covers the opening 623, is bonded to a surface of the mount section 621 that is the surface opposite the lid 630 (base outer surface 621B). The mount section 621 can be bonded to the glass member 627 based, for example, on low-melting-point glass bonding using glass frit (low-melting-point glass), which is glass pieces produced by melting a glass raw material at high temperature and rapidly cooled, or adhesion using an epoxy resin or any other material. In the present embodiment, the accommodation space is hermetically maintained with the pressure in the accommodation space reduced and the reduced pressure maintained. The mount section 621 and the glass member 627 are therefore preferably bonded to each other by using the low-melting-point glass bonding.

A surface of the mount section 621 that is the surface facing the lid 630 (base inner surface 621A) is provided with an inner terminal section 624, which is connected to the first connection electrode 565 and the second drawn electrode 564 of the wavelength tunable interference filter 5. The inner terminal section 624 is connected to the first connection electrode 565 and the second drawn electrode 564 based, for example, on wire bonding using a wire made, for example, of Au. In the present embodiment, the bonding is performed by wire bonding by way of example, but a flexible printed circuit (FPC) may instead, for example, be used.

The mount section 621 has a through hole 625 formed in the position where the inner terminal section 624 is provided. The inner terminal section 624 is connected to an outer terminal section 626, which is provided on the base outer surface 621B of the mount section 621, via the through hole 625.

The sidewall section 622, which rises from a peripheral portion of the mount section 621 and is so provided as to surround the circumference of the base inner surface 621A, has a surface facing the lid 630 (end surface 622A), and the surface is, for example, a flat surface parallel to the base inner surface 621A.

The wavelength tunable interference filter 5 is fixed to the base 620 by using a fixing material 64, for example, an adhesive. In this process, the wavelength tunable interference filter 5 may be fixed to the mount section 621 or the sidewall section 622. The fixing material 64 may be provided at a plurality of locations. However, to prevent stress induced in the fixing material from being transmitted to the wavelength tunable interference filter 5, the wavelength tunable interference filter 5 is preferably fixed at one location.

Configuration of Lid

The lid 630 is a transparent member having a rectangular outer shape in the plan view and is made, for example, of glass.

The lid 630 is bonded to the sidewall section 622 of the base 620, as shown in FIG. 15. The lid 630 can be boded to the sidewall section 622 based, for example, on the low-melting-point glass bonding.

Advantageous Effects of Sixth Embodiment

In the optical device 600 according to the present embodiment described above, since the enclosure 610 protects the wavelength tunable interference filter 5, breakage of the wavelength tunable interference filter 5 due to an external factor can be avoided.

Further, in the wavelength tunable interference filter 5, the amount of bending of the movable section 521 that occurs when voltage is applied to the electrostatic actuator 56 is suppressed, as described above. Light having a desired wavelength can pass through the wavelength tunable interference filter 5 with precision.

Seventh Embodiment

A spectral camera will next be described as a seventh embodiment and as an example of an electronic apparatus including the wavelength tunable interference filter 5 according to any of the first to fifth embodiments described above or the optical device 600 according to the sixth embodiment described above.

Figure 16:
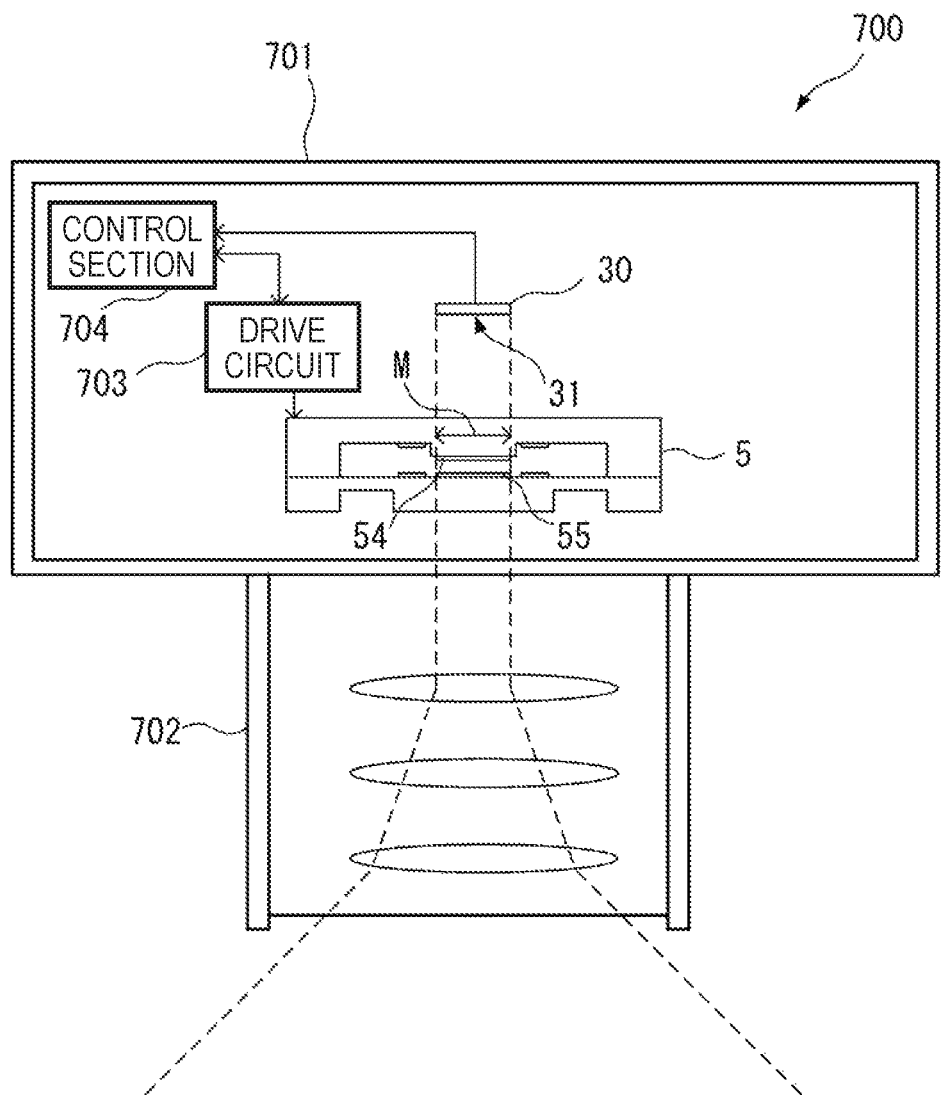
FIG. 16 shows a schematic configuration of a spectral camera according to a seventh embodiment.

FIG. 16 shows a schematic configuration of a spectral camera 700 according to the seventh embodiment.

The spectral camera 700 includes a camera main body 701 and a lens barrel 702, and the camera main body 701 accommodates the wavelength tunable interference filter 5, the light receiving section 30, a drive circuit 703, a control section 704, and other components, as shown in FIG. 16.

The wavelength tunable interference filter 5 and the light receiving section 30 form the optical module according to an aspect of the invention. The wavelength tunable interference filter 5 may be replaced with the optical device 600 described in the sixth embodiment.

The lens barrel 702 accommodates a light incidence optical system formed of a plurality of lenses and guides light having a predetermined viewing angle to the light receiving section 30 via the wavelength tunable interference filter 5.

The light receiving section 30 has the rectangular light receiving region 31, as shown in FIG. 6, and a plurality of photodiodes are arranged in the light receiving region 31 in the horizontal and vertical directions. The light receiving section 30 therefore produces data of a rectangular image based on the light received via the rectangular light receiving region 31.

The drive circuit 703 is a circuit for driving the wavelength tunable interference filter 5. Specifically, the drive circuit 703 applies drive voltage to the electrostatic actuator 56 in the wavelength tunable interference filter 5 to displace the movable section 521 in the direction Z under the control of the control section 704.

The control section 704 controls the action of the spectral camera 700. When an operation signal for acquisition of a spectral image at a predetermined target wavelength is inputted based, for example, on a user's operation, the control section 704 outputs an instruction signal according to the target wavelength to the drive circuit 703. The drive circuit 703 then applies drive voltage according to the target wavelength to the electrostatic actuator 56 in the wavelength tunable interference filter 5.

The control section 704 further controls the light receiving section 30 to cause it to perform light reception and produces a spectral image based on a light reception signal outputted from each of the photodiodes in the light receiving section 30.

In a case where an operation signal for acquisition of spectral images in a predetermined wavelength region at predetermined wavelength intervals is inputted, the control section 704 may output an instruction signal for successive change in the drive voltage to the drive circuit 703. The drive circuit 703 then, for example, increases stepwise the drive voltage applied to the electrostatic actuator 56 to gradually narrow the gap G.

In this case, the control section 704 controls the light receiving section 30 to cause it to produce a spectral image at each wavelength based on the light reception signal associated with the wavelength.

In the wavelength tunable interference filter 5, the movable section 521 and the mirror region M (first mirror 54 and second mirror 55) each have an oblong shape, as in the first embodiment. In the present embodiment, a region of the light receiving section 30 that is the region irradiated with the light having passed through the first mirror 54 and the second mirror 55, that is, an output region where the mirror region M is projected on the light receiving section 30 (rectangular region Ar3 shown in FIG. 6) coincides with the light receiving region 31, as shown in FIG. 6. That is, the mirror region M of the wavelength tunable interference filter 5 is so formed as to have a minimum size with respect to the light receiving section 30. No unnecessary sections 54Z or 55Z are therefore formed, unlike those shown in FIG. 5. The planar size of the movable section 521 can therefore be minimized, whereby the size of the wavelength tunable interference filter 5 is reduced.

Advantageous Effects of Seventh Embodiment

In the present embodiment, the first mirror 54 and the second mirror 55 of the wavelength tunable interference filter 5 are each formed in a rectangular shape that corresponds to the light receiving region 31. That is, the size of the first mirror 54 and the second mirror 55 in the plan view can be minimized in correspondence with the light receiving region 31 of the light receiving section 30. The sizes of the movable section 521 and the wavelength tunable interference filter 5 can therefore be reduced. Further, reduction in the size of the spectral camera 700 can be facilitated by the amount corresponding to the reduction in the space where the wavelength tunable interference filter 5 is disposed.

Further, the second electrode 562 is so formed as to have a width according to the bendability of the movable section 521, as in the first embodiment, and the electrode width of the portion that is likely to bend is greater than the electrode width of the portion that is unlikely to bend. Therefore, also in the wavelength tunable interference filter 5 including the second mirror 55 and the movable section 521 each having a rectangular shape, the amount of bending of the movable section 521 is suppressed when the movable section 521 is displaced. As a result, light having a target wavelength is allowed to pass through the wavelength tunable interference filter 5 with precision. Light having the same wavelength can therefore be received in any position in the light receiving region 31 of the light receiving section 30, whereby the spectral camera 700 can capture a high-precision spectral image.

Eighth Embodiment

A printing apparatus (printer) will next be described as an eighth embodiment and as an example of the electronic apparatus including the wavelength tunable interference filter 5 according to any of the first to fifth embodiments described above or the optical device 600 according to the sixth embodiment described above.

Schematic Configuration of Printer

Figure 17:
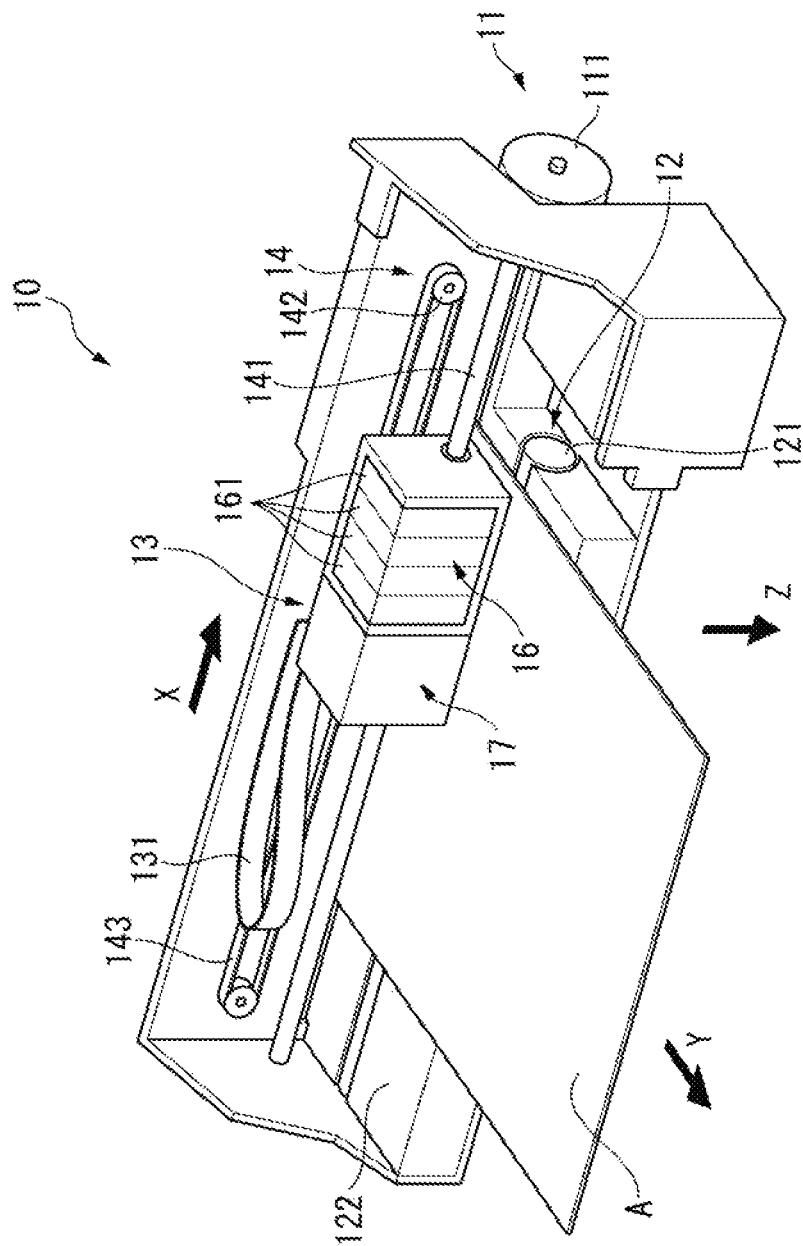
FIG. 17 shows an example of the exterior configuration of a printer according to an eighth embodiment.
Figure 18:
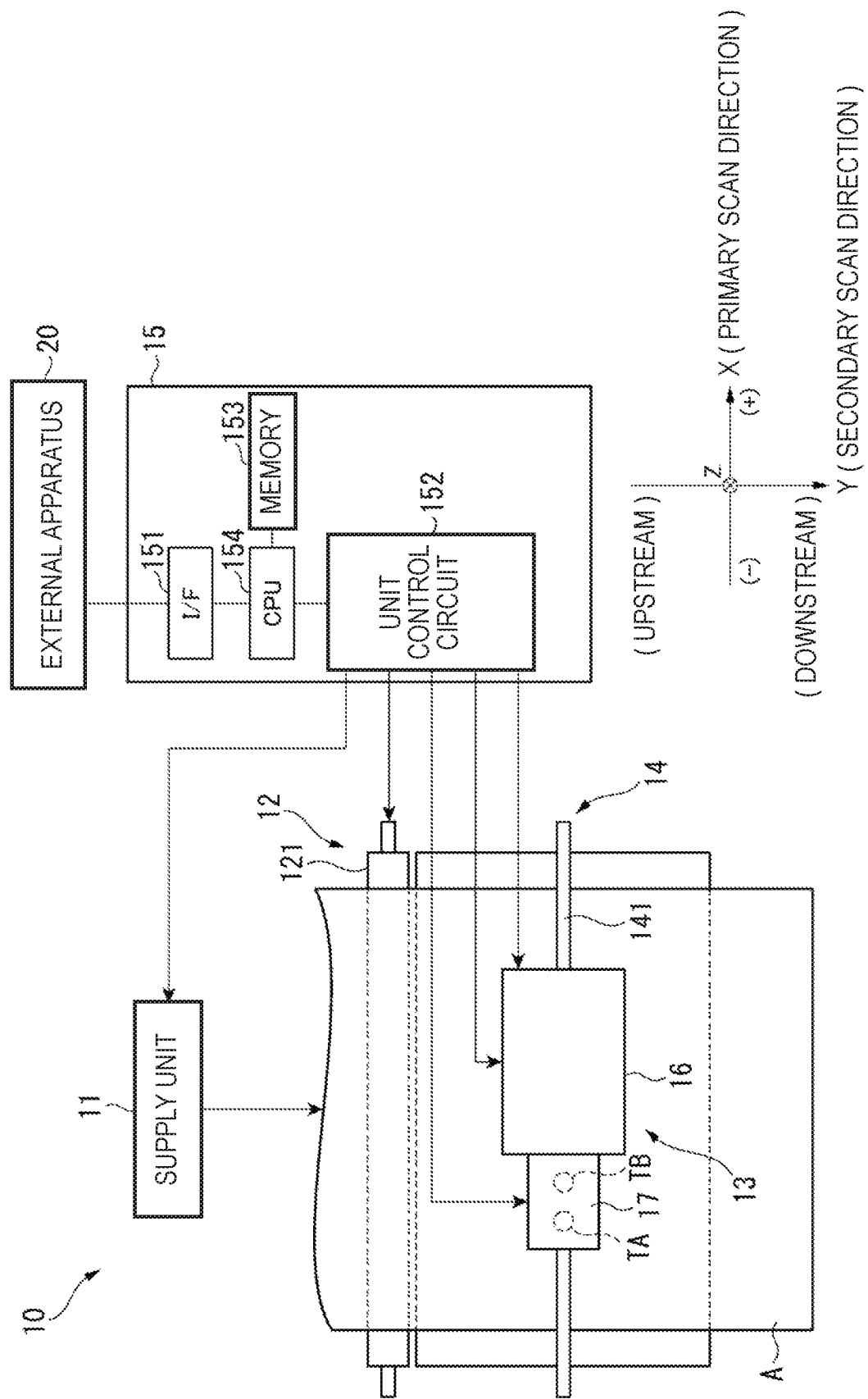
FIG. 18 is a block diagram showing a schematic configuration of the printer according to the eighth embodiment.

FIG. 17 shows an example of the exterior configuration of a printer 10 according to the eighth embodiment. FIG. 18 is a block diagram showing a schematic configuration of the printer 10 according to the present embodiment.

The printer 10 includes a supply unit 11, a transport unit 12, a carriage 13, a carriage moving unit 14, and a control unit 15 (see FIG. 18), as shown in FIG. 17. The printer 10 controls the units 11, 12, and 14 and the carriage 13 based on print data inputted from an external apparatus 20, for example, a personal computer, to print an image on a medium. A. The printer 10 according to the present embodiment forms a colorimetry test pattern in a predetermined position on the medium A based on calibration print data set in advance and performs spectral measurement on the test pattern. The printer 10 then compares measured values of the test pattern with the calibration print data to evaluate whether or not the printed colors have color unevenness, and in a case where color unevenness is present, the printer 10 performs color correction based on the measured values.

The components of the printer 10 will be specifically described below.

The supply unit 11 is a unit that supplies the medium A, which is a target on which an image is formed, to an image formation position. The supply unit 11 includes, for example, a roll element 111 (see FIG. 17), around which the medium A is wound, a roll drive motor (not shown), and a roll drive wheel train (not shown). The roll drive motor is driven and rotated based on an instruction from the control unit 15, and the rotational force produced by the roll drive motor is transmitted to the roll element 111 via the roll drive wheel train. As a result, the roll element 111 rotates, and the sheet wound around the roll element 111 is unwound and supplied toward the downstream side (+Y side) in a secondary scan direction (direction Y).

In the present embodiment, the case where the sheet wound around the roll element 111 is unwound and supplied has been presented by way of example, but not necessarily. For example, the medium A formed, for example, of sheets placed on a tray or any other object may be supplied one by one with the aid of a roller or any other component, that is, the medium A may be supplied in any supply method.

The transport unit 12 transports the medium A supplied from the supply unit 11 in the direction Y. The transport unit 12 includes a transport roller 121, a driven roller (not shown) that is so disposed that the transport roller 121 and the driven roller sandwich the medium A and is driven by the transport roller 121, and a platen 122.

When the drive force from a transport motor that is not shown is transmitted to the transport roller 121, and the transport motor is drive under the control of the control unit 15, the transport roller 121 is driven and rotated by the rotational force from the transport motor and transports the medium A sandwiched between the transport roller 121 and the driven roller in the direction Y. The platen 122, which faces the carriage 13, is provided on the +Y side of the transport roller 121.

The carriage 13 includes a printing section 16, which prints an image on the medium A, and a spectrometer 17, which performs spectral measurement in predetermined measurement positions TA and TB (see FIG. 18) on the medium A.

The carriage 13 is so provided as to be movable by the carriage moving unit 14 in a primary scan direction (direction X) that intersects the direction Y.

The carriage 13 is connected to the control unit via a flexible circuit 131 and causes the printing section 16 to perform printing and the spectrometer 17 to perform spectral measurement based on instructions from the control unit 15.

The configuration of the carriage 13 will be described later in detail.

The carriage moving unit 14 forms the movement mechanism in an aspect of the invention and causes the carriage 13 to make reciprocating movement in the direction X based on an instruction from the control unit 15.

The carriage moving unit 14 includes, for example, a carriage guide shaft 141, a carriage motor 142, and a timing belt 143.

The carriage guide shaft 141 is disposed along the direction X, and opposite end portions of the carriage guide shaft 141 are fixed, for example, to an enclosure of the printer 10. The carriage motor 142 drives the timing belt 143. The timing belt 143 is so supported as to be roughly parallel to the carriage guide shaft 141, and part of the carriage 13 is fixed to the timing belt 143. When the carriage motor 142 is driven based on an instruction from the control unit 15, the timing belt 143 travels in the forward and reverse directions, and the carriage 13 fixed to the timing belt 143 makes reciprocating movement with the carriage 13 guided by the carriage guide shaft 141.

The configurations of the printing section 16 and the spectrometer 17 provided in the carriage 13 will next be described with reference to the drawings.

Configuration of Printing Section 16

The printing section 16, which is disposed in a portion that faces the medium A, discharges a plurality of types of ink separately on the medium A to form an image on the medium A.

Ink cartridges 161, which correspond to a plurality of ink colors, are detachably attached to the printing section 16, and ink is supplied from each of the ink cartridges 161 to an ink tank (not shown) via a tube (not shown). Nozzles (not shown) via which ink droplets are discharged are provided at the lower surface of the printing section 16 (in positions facing medium A) in correspondence with the plurality of colors. A piezoelectric device or any other device is disposed in each of the nozzles, and driving the piezoelectric devices allows the ink droplets supplied from the ink tanks to exit and impinge on the medium A, whereby dots are formed.

Configuration of Spectrometer 17

Figure 19:
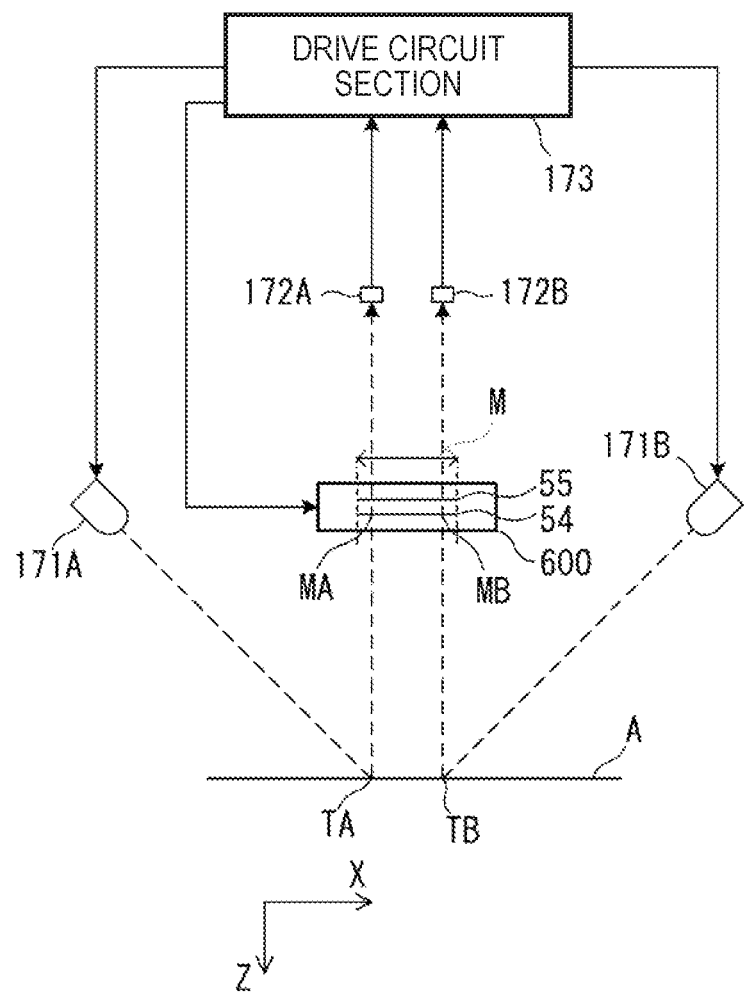
FIG. 19 shows a schematic configuration of a spectrometer according to the eighth embodiment.

FIG. 19 shows a schematic configuration of the spectrometer 17.

The spectrometer 17 is the optical module in an aspect of the invention and includes a first light source 171A, a second light source 171B, the optical device 600, a first detector 172A, a second detector 172B, and a drive circuit section 173, as shown in FIG. 19.

The first light source 171A radiates light to the first measurement position TA on the medium A, for example, at an angle of 45° with respect to the medium A. The second light source 171B radiates light to the second measurement position TB, which is shifted from the first measurement position TA toward the +X side, for example, at the angle of 45° with respect to the medium A.

The first detector 172A and the second detector 172B correspond to the light receiving section in an aspect of the invention.

The first detector 172A receives light having been reflected off the medium A in the first measurement position TA and having passed through a −X-side predetermined position (first passage position MA) in the mirror region M of the wavelength tunable interference filter 5 (not shown in FIG. 19) accommodated in the optical device 600.

The second detector 172B receives light having been reflected off the medium A in the second measurement position TB and having passed through a +X-side predetermined position (second passage position MB shifted from first passage position MA toward +X side) in the mirror region M.

The drive circuit section 173 includes a circuit that is electrically connected to the control unit 15 and drives the wavelength tunable interference filter 5 based on an instruction from the control unit 15.

That is, the drive circuit section 173 applies drive voltage to the electrostatic actuator 56 in the wavelength tunable interference filter 5 based on an instruction from the control unit 15 to displace the movable section 521 in the direction Z, as does the drive circuit 703 in the seventh embodiment.

The drive circuit section 173 is connected to the first detector 172A and the second detector 172B and outputs detection signals outputted from the first detector 172A and the second detector 172B to the control unit 15.

Further, the drive circuit section 173 is connected to the first light source 171A and the second light source 171B and switches a turned-on state of the first light source 171A and the second light source 171B to a turned-off state thereof and vice versa.

In addition to the circuit and functions described above, the following circuits may be provided as part of the drive circuit section 173: a capacity detection circuit that detects the capacity of the gap G; a feedback circuit that performs feedback control on the drive voltage applied to the electrostatic actuator 56; and other circuits.

In the thus configured spectrometer 17, the first light source 171A radiates the illumination light to the first measurement position TA on the medium A, and the second light source 171B radiates the illumination light to the second measurement position TB on the medium A.

The light reflected off the medium A in the first measurement position TA is incident on the first passage position MA in the mirror region M of the optical device 600, and the light having a predetermined wavelength according to the gap G out of the incident light passes through the optical device 600 and is received with the first detector 172A. The light reflected off the medium A in the second measurement position TB is incident on the second passage position MB in the mirror region M of the optical device 600, and the light having the predetermined wavelength according to the gap G out of the incident light passes through the optical device 600 and is received with the second detector 172B.

Having received the light, the first detector 172A and the second detector 172B each output a light reception signal according to the amount of received light to the drive circuit section 173. The drive circuit section 173 has a reception circuit, for example, an amplification circuit and an AD conversion circuit, and the light reception signals having undergone signal processing in the reception circuit are outputted to the control unit 15.

Configuration of Control Unit

The control unit 15 is the control section in an aspect of the invention and includes an I/F 151, a unit control circuit 152, a memory 153, and a central processing unit (CPU) 154, as shown in FIG. 18.

The I/F 151 inputs the print data inputted from the external apparatus 20 to the CPU 154.

The unit control circuit 152 includes a control circuit that controls the supply unit 11, the transport unit 12, the printing section 16, the spectrometer 17, and the carriage moving unit 14 and controls the action of each of the units based on an instruction signal from the CPU 154. Instead, control circuits that control the units may be provided separately from the control unit 15 and connected to the control unit 15.

The memory 153 stores a variety of programs and a variety of data used to control the action of the printer 10.

Examples of the variety of data may include V-X data showing the wavelength of the light passing through the wavelength tunable interference filter 5 versus the voltage applied to the electrostatic actuator 56 in the control of the wavelength tunable interference filter 5, print profile data that stores the amounts of discharged plurality of types of ink versus color data contained in the print data, and other data. The memory 153 may further store the light emission characteristics of the first light source 171A and the second light source 171B versus the wavelength (light emission spectra), the light reception characteristics of the first detector 172A and the second detector 172B versus the wavelength (light reception sensitivity characteristics), and other pieces of information.

The CPU 154 reads and executes the variety of programs stored in the memory 153 to perform drive control on the units 11, 12, and 14, print control on the printing section 16, measurement control on the spectrometer 17 (such as drive control on electrostatic actuator 56 of wavelength tunable interference filter 5), color measurement based on the result of the spectral measurement performed by the spectrometer 17, correction (update) of the print profile data, and other types of control.

Measurement

A description will next be made of the action of the printer 10 described above, in particular, the measurement of the test pattern printed by the printing section 16.

Figure 20:
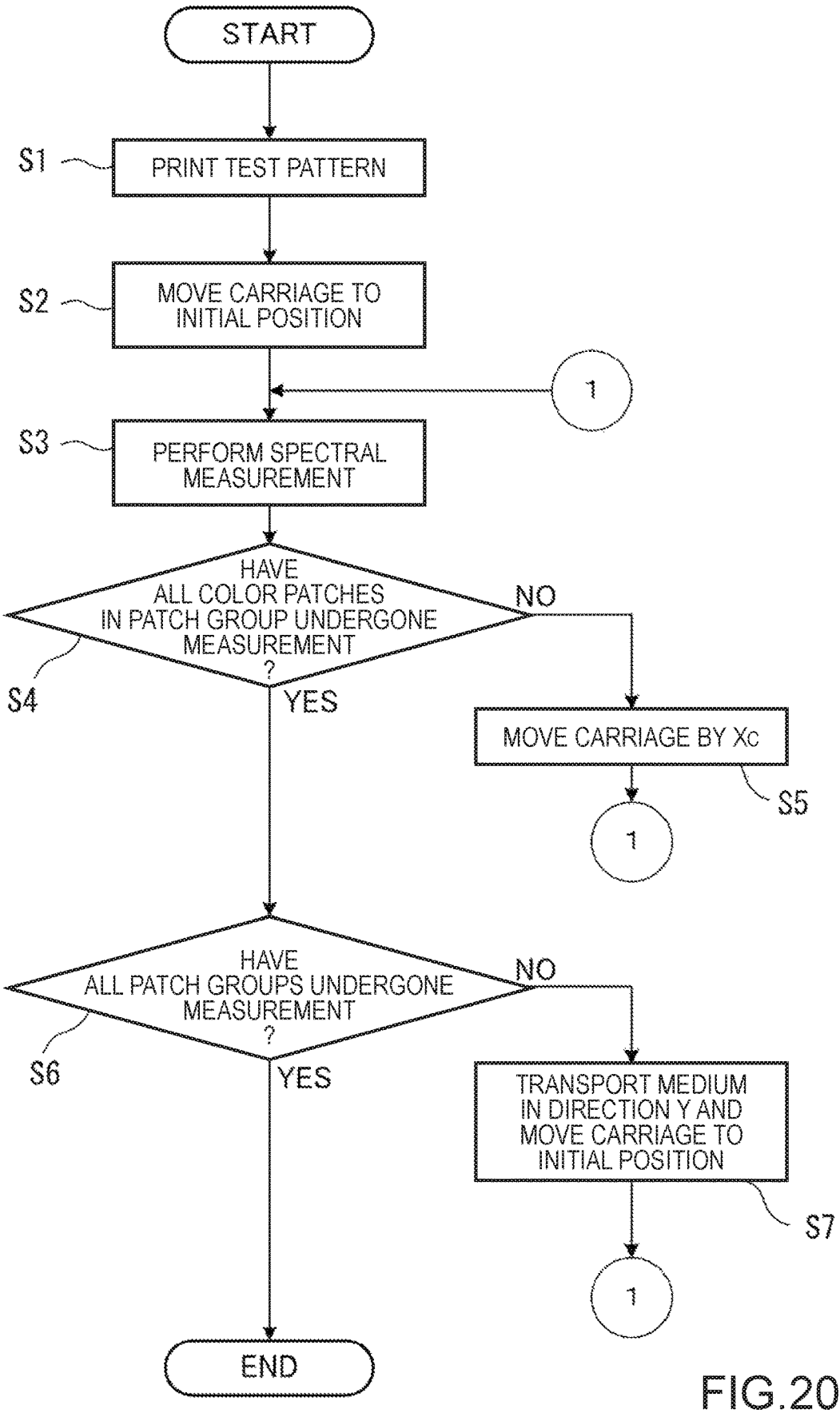
FIG. 20 is a flowchart showing a measurement method used with the printer according to the eighth embodiment.

FIG. 20 is a flowchart showing a measurement method in the present embodiment.

In the measurement in the present embodiment, when the printer 10 accepts an instruction of update of the print profile data, for example, via a user's operation or input from the external apparatus 20, the control unit 15 controls the printing section 16 to cause it to print the test pattern on the medium A (step S1).

Figure 21:
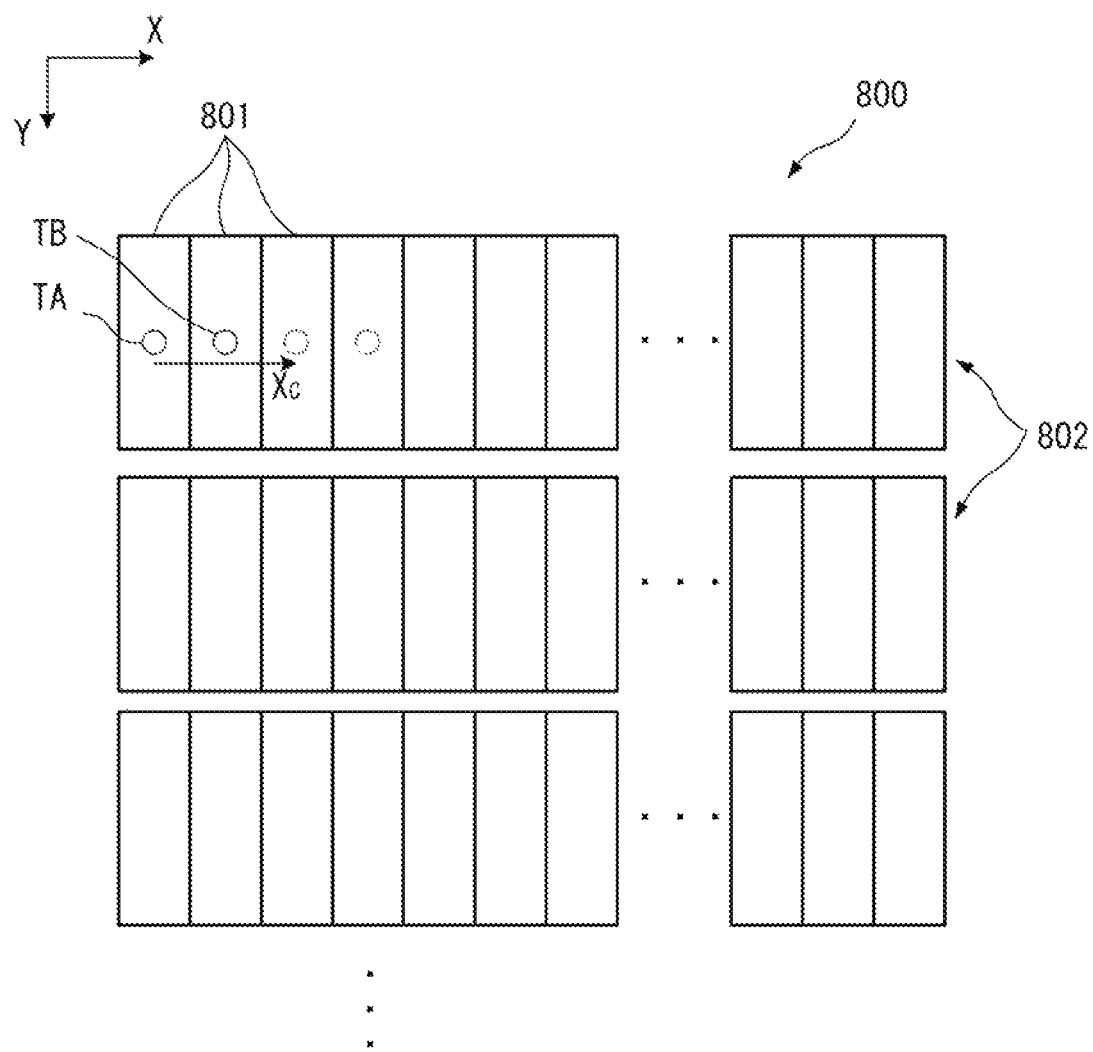
FIG. 21 shows the relationship between a test pattern and measurement positions in the eighth embodiment.

FIG. 21 shows the relationship between the test pattern printed on the medium A and measurement positions.

In step S1, a test pattern 800 shown in FIG. 21 is printed on the medium A. The test pattern 800 has a plurality of color patches 801 drawn with different colors. The color patches 801 are arranged in the direction X to form a single patch group 802, and a plurality of patch groups 802 are arranged in the direction Y.

The control unit 15 then moves the carriage 13 to an initial position in such a way that the first measurement position TA and the second measurement position TB, where the spectrometer 17 performs the measurement, fall within color patches 801 that are initial measurement targets (step S2). Specifically, the carriage 13 is so moved that the first measurement position TA falls within the uppermost, leftmost (−X-side-end and −Y-side-end) color patch 801 out of the plurality of color patches 801 arranged in the directions X and Y and the second measurement position TB falls within the color patch 801 on the right of (+X-side color patch 801 adjacent to) the color patch 801 corresponding to the first measurement position TA.

The control unit 15 then turns on the light sources of the spectrometer 17 and causes the spectrometer 17 to perform the spectral measurement (step S3). That is, the control unit 15 sequentially changes the drive voltage applied to the electrostatic actuator 56 of the wavelength tunable interference filter 5 to cause light fluxes having a plurality of wavelengths starting from an initial wavelength and separate from each other, for example, at 20-nm intervals to sequentially pass through the wavelength tunable interference filter 5. The first detector 172A and the second detector 172B then detect the light having each of the wavelengths.

As a result, the result of the spectral measurement performed on the color path 801 in which the first measurement position TA is located and the result of the spectral measurement performed on the +X-side color patch 801 in which the second measurement position TB is located can be simultaneously obtained.

The control unit 15 then evaluates whether or not the spectral measurement has been performed on all the color patches 801 in one of the patch groups 802 (step S4). For example, in a case where the patch groups 802 each contain (or 15) color patches 801, the result of the evaluation shows Yes when the spectral measurement has been performed 8 times.

In a case where the result of the evaluation shows No, that is, in a case where the patch group 802 contains a color patch 801 that has not undergone the measurement, the carriage 13 is moved toward the +X side by a distance $X_C$ (see FIG. 21) (step S5). That is, the first measurement position TA and the second measurement position TB are moved toward the +X side by the distance $X_C$, which corresponds to two color patches 801.

The control section 15 then returns to the process in step S3 and performs the spectral measurement.

In a case where the result of the evaluation shows Yes in step S4, the control unit 15 evaluates whether or not the spectral measurement has been performed on all the color patches 801 (all patch groups 802) in the test pattern 800 (step S6).

In a case where the result of the evaluation shows No in step S6, the control unit 15 transports the medium A in the direction Y in such a way that the first measurement position TA and the second measurement position TB, where the spectrometer 17 performs the measurement, are located in the −X-side end portion in the next patch group 802 and moves the carriage 13 to the initial position (step S7). The control section 15 then returns to step S3 and performs the spectral measurement.

In case where the result of the evaluation shows Yes in step S6, the control unit 15 terminates the spectral measurement performed on the color patches 801 in the test pattern 800. In this case, for example, the control unit 15 causes, for example, the printing section 16 to perform a variety of types of correction (correction of amount of discharged ink, for example) based on the obtained results of the spectral measurement.

Advantageous Effects of Eighth Embodiment

The printer 10 according to the present embodiment includes the spectrometer 17, which is the optical module, and the spectrometer 17 includes the optical device 600 (wavelength tunable interference filter 5), the first detector 172A, and the second detector 172B.

The configuration described above allows light having a uniform wavelength in a plane to pass through the wavelength tunable interference filter 5 and the first detector 172A and the second detector 172B to detect the light having the same wavelength with precision.

Further, in the present embodiment, the first light source 171A, which irradiates the first measurement position TA with light, and the second light source 171B, which irradiates a position separate from the first measurement position TA toward the +X side with light, are provided. The light reflected at the first measurement position TA passes through the first passage position MA in the mirror region M of the wavelength tunable interference filter 5 and is received with the first detector 172A, and the light reflected at the second measurement position TB passes through the second passage position MB in the mirror region M and is received with the second detector 172B.

Placing different measurement targets in the first measurement position TA and the second measurement position TB therefore allows simultaneous spectral measurement performed on the two measurement targets. For example, a first color patch 801 is placed in the first measurement position TA, and a second color patch 801 adjacent to the first color patch 801 is placed in the second measurement position TB, as in the present embodiment. The spectral measurement on the first and second color patches 801 can thus be simultaneously performed. In this case, the spectral measurement can be quickly performed as compared with a case where the spectral measurement is performed on the plurality of color patches 801 one by one, which are placed in each of the patch groups 802.

To simultaneously perform the spectral measurement on the first measurement position TA and the second measurement position TB separate from each other in the direction X as described above, the light fluxes reflected at the measurement positions need to pass through the mirror region M of the wavelength tunable interference filter 5.

In a case where the shape of the mirror region M of the wavelength tunable interference filter 5, that is, the shape of the first mirror 54 and the second mirror 55 is a circular shape as in the related art, the shape of the first mirror 54 and the second mirror 55 spreads in the direction Y, along which no measurement is performed. That is, since the first mirror 54 and the second mirror 55 each have a large planar size, resulting in an increase in the planar size of the wavelength tunable interference filter 5.

In contrast, in the present embodiment, the first mirror 54, the second mirror 55, and the movable section 521, on which the second mirror 55 is provided, each have a rectangular shape having a long-edge direction that coincides with the direction X and a short-edge direction that coincides with the direction Y. That is, the mirror region M can be so set as to have a shape elongated in the direction X in correspondence with the first measurement position TA and the second measurement position TB and a size necessary for the range necessary for the measurement, whereby the size of the wavelength tunable interference filter 5 can be reduced as compared with the size in the related art. Further, the reduction in the size of the wavelength tunable interference filter 5 can also facilitate reduction in the size of the spectrometer 17, which accommodates the wavelength tunable interference filter 5, and the size of the printer 10.

Variations

The invention is not limited to the embodiments described above, and variations, improvements, and other modifications to the extent that the advantage of the invention is achieved fall within the scope of the invention.

Variation 1

The above-mentioned first embodiment has been described with reference to the case where the mirror region M (first mirror 54 and second mirror 55) has a rectangular shape and the movable section 521 is formed in a rectangular shape accordingly, but not necessarily.

Figure 22:
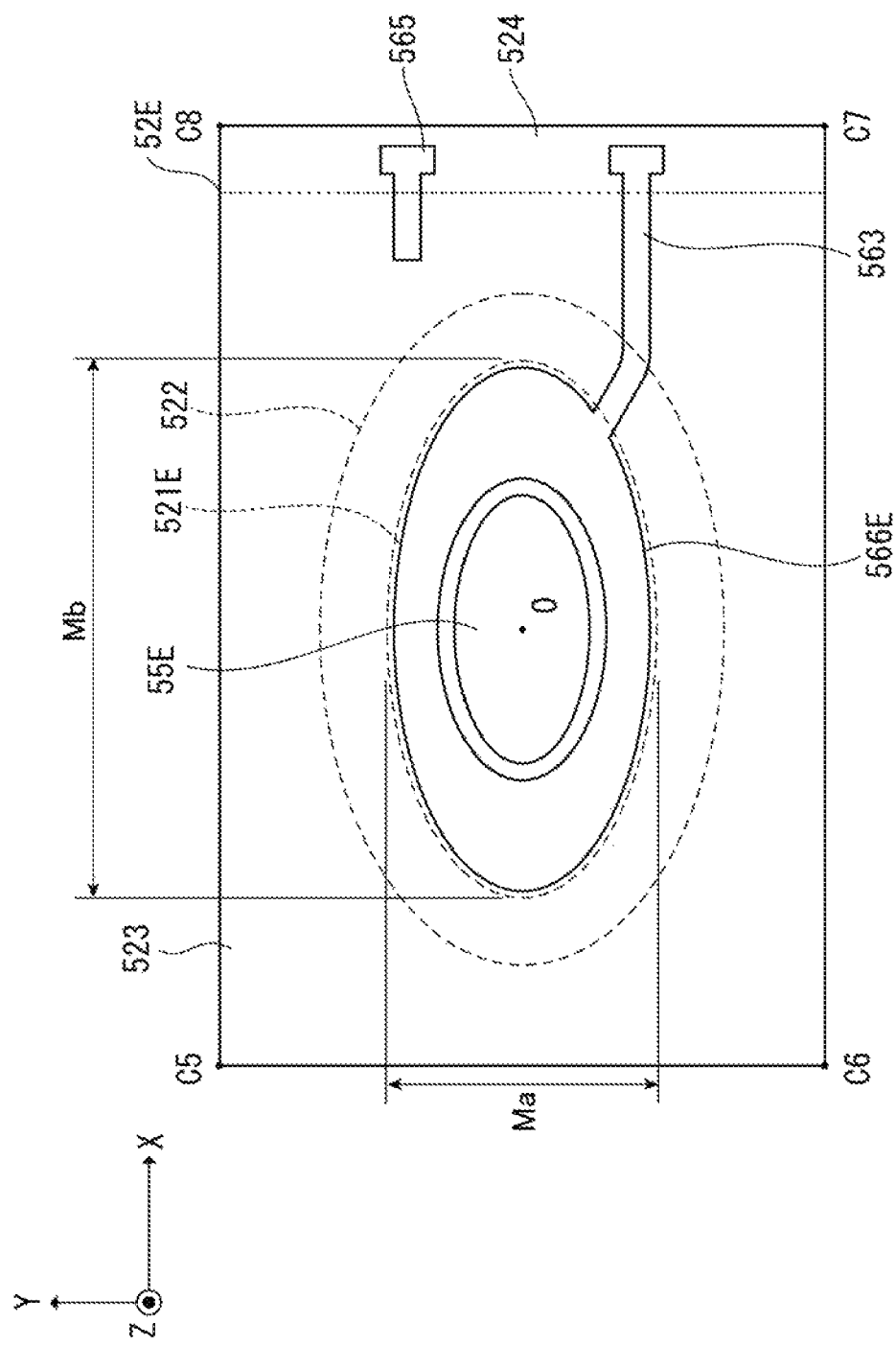
FIG. 22 is a plan view of a movable section according to Variation 1 viewed from the side facing a first substrate.

FIG. 22 is a plan view of a second substrate according to Variation 1 viewed from the side facing the first substrate.

In the example shown in FIG. 22, a second substrate 52E includes an elliptical movable section 521E and second mirror 55E (mirror region M) each having a major axis that coincides with the direction X (third direction) and a minor axis that coincides with the direction Y (second direction). That is, the movable section 521E and the second mirror 55E each have a shape having a width in the direction X greater than the width in the direction Y.

A second electrode 566E has a roughly elliptical shape that surrounds the second mirror 55E and has an electrode width that varies in the circumferential direction, as shown in FIG. 22.

Specifically, the second electrode 566E is so shaped that a portion where the tangential direction is more parallel to the direction Y is wider and a portion where the tangential direction is more parallel to the direction X is narrower. In other words, the second electrode 566E is so shaped that the electrode width of the portion corresponding to the minor axis direction (direction Y or second direction) is greater than the electrode width of the portion corresponding to the major axis direction (direction X or third direction). Still in other words, the second electrode 566E is so shaped that the electrode width increases with distance from the center of the movable section 521E.

The shape shown in FIG. 22 therefore also allows the amount of bending of the movable section 521E to be suppressed when the movable section 521E is displaced in the direction Z, whereby the wavelength precision of the wavelength tunable interference filter 5 can be improved, as in the first and fourth embodiments.

Further, although not shown, the first electrode 561 may be formed in the same shape as that of the second electrode 566E and in the position where the first electrode 561 coincides with the second electrode 566E in the plan view, as in the embodiments described above.

The case shown in FIG. 22 is the case where the movable section 521E and the second mirror 55E each have an elliptical shape, but not necessarily. That is, for example, the movable section and the mirror region (second mirror) may each have a polygonal shape or an oval shape as long as they are so shaped that the width in the direction X (third direction) is greater than the width in the direction Y (second direction). Any of the shapes allows the amount of bending of the movable section to be suppressed by employing the configuration in which the second electrode surrounds the mirror region and the width of the electrode sections along the minor axis is greater than the width of the electrode sections along the major axis or the configuration in which the electrode width increases with distance from the center of the movable section.

Variation 2

The second and third embodiments have been described with reference to the case where the movable section 521 and the mirror region M (second mirror 55) each have an oblong shape, but not necessarily.

Figure 23:
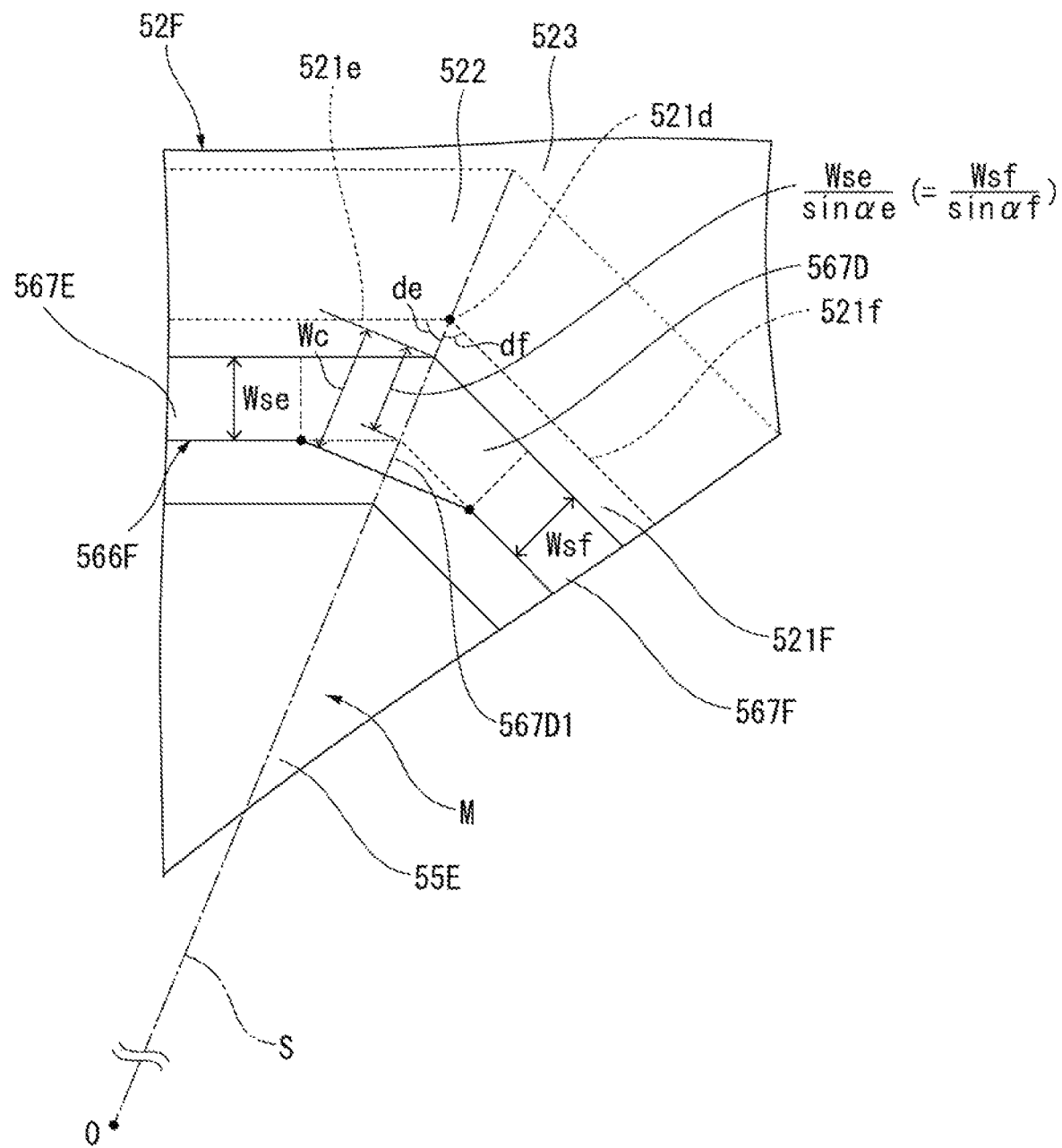
FIG. 23 is an enlarged plan view of part of a corner point of a movable section of a second substrate according to Variation 2 and the vicinity of the corner point.

FIG. 23 is an enlarged plan view of part of a second substrate 52F including a hexagonal movable section 521F, specifically, a corner point 521d of the movable section 521F and therearound.

In the example shown in FIG. 23, two edges that sandwich the corner point 521d of the movable section 521F (first edge 521e and second edge 521f) form the fourth edge line and the fifth edge line in an aspect of the invention, the direction parallel to the first edge 521e is the fourth direction in an aspect of the invention, and the direction parallel to the second edge 521f is the fifth direction in an aspect of the invention.

A second electrode 566F is so provided as to surround the second mirror 55 provided in the mirror region M and includes edge electrode sections (side electrode section) corresponding to the edges of the second electrode 566F and corner electrode sections connected to two edge electrode sections adjacent to each other. For example, at one corner point 521d of the movable section 521F shown in FIG. 23, the second electrode 566F includes a first edge electrode section 567E, which is parallel to the first edge 521e, a second edge electrode section 567F, which is parallel to the second edge 521f, and a corner electrode section 567D, which is provided in correspondence with the corner point 521d and connected to the first edge electrode section 567E and the second edge electrode section 567F.

The corner electrode section 567D includes an inner protruding section 567D1, which protrudes toward the mirror region M, as in the third embodiment. In other words, let a radial straight line S be the straight line extending from the filter center axis O toward the corner point 521d, $\alpha e$ be the angle between the radial straight line S and the first edge 521e, $\alpha f$ be the angle between the radial straight line S and the second edge 521f, Wse be the width of the first edge electrode section 567E along a straight line perpendicular to the first edge 521e, and Wsf be the width of the second edge electrode section 567F along a straight line perpendicular to the second edge 521f, and the electrode width Wc of the corner electrode section 567D along the radial straight line S satisfies Wc>Wse/sin $\alpha e$ and Wc>Wsf/sin $\alpha f$. That is, the electrode width of the corner electrode section 567D is so formed as to be wider than the electrode width of the other edge electrode sections (such as first edge electrode section 567E and second edge electrode section 567F).

FIG. 23 shows the electrode configuration in the vicinity of one corner point 521d of the hexagonal movable section 521F, and the same holds true for the other corner points.

That is, the other edge electrode sections are also each provided with the inner protruding section 567D1, which protrudes inward beyond the edge electrode section. In the example shown in FIG. 23, the case where the inner protruding sections are provided in correspondence with the corner points. Instead, the outer protruding sections may be provided as in the second embodiment, or both the inner and outer protruding sections may be provided.

Although not shown, the first electrode 561 may be formed in the same shape as that of the second electrode 566F and in the position where the first electrode 561 coincides with the second electrode 566F in the plan view, as in the embodiments described above.

In the case of a polygonal movable section, such as the hexagonal movable section 521F shown in FIG. 23, each corner point is more likely to bend than the other portion, as described in the second and third embodiments. To avoid the situation described above, part of the second electrode, specifically, the corner electrode sections provided in correspondence with the corner points can each be provided with the inner or outer protruding section so that the electrode width of the corner electrode sections is greater than the width of the edge electrode sections corresponding to the edges of the movable section, whereby the amount of bending of the movable section can be suppressed.

In the case where the movable section has a polygonal shape and has the major and minor axis directions, it is further preferable that the electrode sections disposed along the major axis direction each have a small width and the electrode sections disposed along the minor axis direction each have a large width. Further, in a case where the movable section has a regular polygonal shape, for example, a square shape, the width of the corner electrode section corresponding to each corner point of the movable section only needs to be increased, and the edge electrode sections along the edges of the movable section may each have a uniform width.

The case where the movable section has a polygonal shape has been described above. The configuration described above is also applicable as long as the movable section is so shaped that part thereof is provided with a corner point in the plan view. For example, the movable section may have an outer edge line shape having a semicircular arcuate shape on the −X side and straight line portions that approach each other with distance from the two ends of the arc with distance toward the +X side (droplet shape). In the configuration described above, the intersection of the two straight line portions forms a corner point that is likely to bend. In this case, a corner electrode section may be provided at the intersection of the straight line portions, and the inner or outer protruding section may be formed.

Variation 3

The above-mentioned embodiments have been described with reference to the case where the mirror region M provided in the movable section 521 is similar to the movable section 521, but not necessarily.

Figure 24:
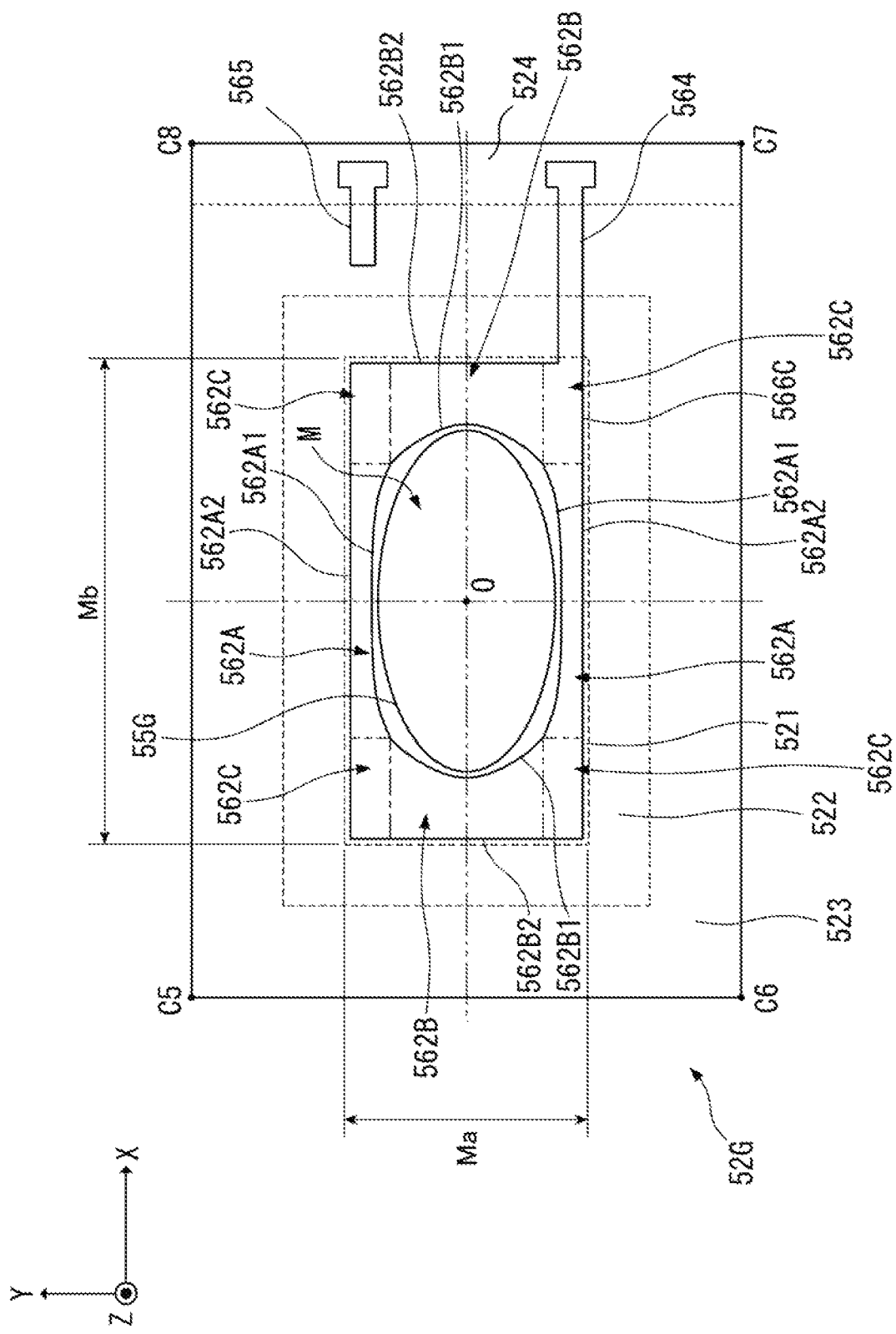
FIG. 24 is a plan view of a second substrate according to Variation 3 viewed from the side facing the first substrate.

FIG. 24 is a plan view of a second substrate 52G according to Variation 3 viewed from the side facing the first substrate 51.

In the fourth embodiment described above, the second electrode 566C is so configured that the separation of the second inner long edges 562A1 from the mirror region M increases with distance from the second corner electrode sections 562C toward the center of the movable section 521 in the direction X, and the separation of the second inner short edges 562B1 from the mirror region M increases with distance from the second corner electrode sections 562C toward the center of the movable section 521 in the direction Y.

Therefore, in the fourth embodiment, the region inside the second electrode 566C in the plan view is greater than the region in the first to third embodiments. In view of the fact described above, for example, an elliptical mirror region M may be provided in a region inside the second electrode 566C, and a second mirror 55G, which coincides with the mirror region M in the plan view, may be provided, as shown in FIG. 24.

In this case, in a case where the light receiving section 30 having the rectangular light receiving region 31 receives the light having passed through the wavelength tunable interference filter 5, the unnecessary regions Arz shown in FIG. 5 are created, but the area of the unnecessary regions Arz is smaller than that in the case where a circular mirror of related art is used. Further, the planar sizes of the movable section 521 and the wavelength tunable interference filter 5 are the same as those of the wavelength tunable interference filters 5 shown in the first to third embodiments.

When the movable section 521 is displaced in the direction Z, the amount of bending of the movable section 521 is suppressed, whereby the unnecessary regions Arz are also irradiated with the light having a target wavelength according to the gap G. Therefore, for example, even when the adjustment of the alignment between the wavelength tunable interference filter 5 and the light receiving section 30 is imperfect, the light receiving region 31 can preferably receive the light having a target wavelength as long as the amount of imperfection falls within the unnecessary regions Arz.

Variation 4

In the fourth embodiment, the second outer long edges 562A2 are parallel to the direction X, the second outer short edges 562B2 are parallel to the direction Y, and the second inner long edges 562A1 and the second inner short edges 562B1 incline (curve).

In contrast, the second inner long edges 562A1 may be parallel to the direction X, the second inner short edges 562B1 may be parallel to the direction Y, and the second outer long edges 562A2 and the second outer short edges 562B2 may incline (curve). In this case, the second electrode 566C is so formed that the second outer long edges 562A2 approach the mirror region M with distance from the second corner electrode sections 562C toward the center of the movable section 521 in the direction X and the second outer short edges 562B2 approach the mirror region M with distance from the second corner electrode sections 562C toward the center of the movable section 521 in the direction Y.

Further, the second inner long edges 562A1 may incline (curve) in such a way that they separate away from the mirror region M with distance from the second corner electrode sections 562C toward the center of the movable section 521 in the direction X, and the second outer long edges 562A2 may incline (curve) in such a way that they approach the mirror region M with distance from the second corner electrode sections 562C toward the center of the movable section 521 in the direction X. Similarly, the second inner short edges 562B1 may incline (curve) in such a way that they separate away from the mirror region M with distance from the second corner electrode sections 562C toward the center of the movable section 521 in the direction Y, and the second outer short edges 562B2 may incline (curve) in such a way that they approach the mirror region M with distance from the second corner electrode sections 562C toward the center of the movable section 521 in the direction Y.

Figure 25:
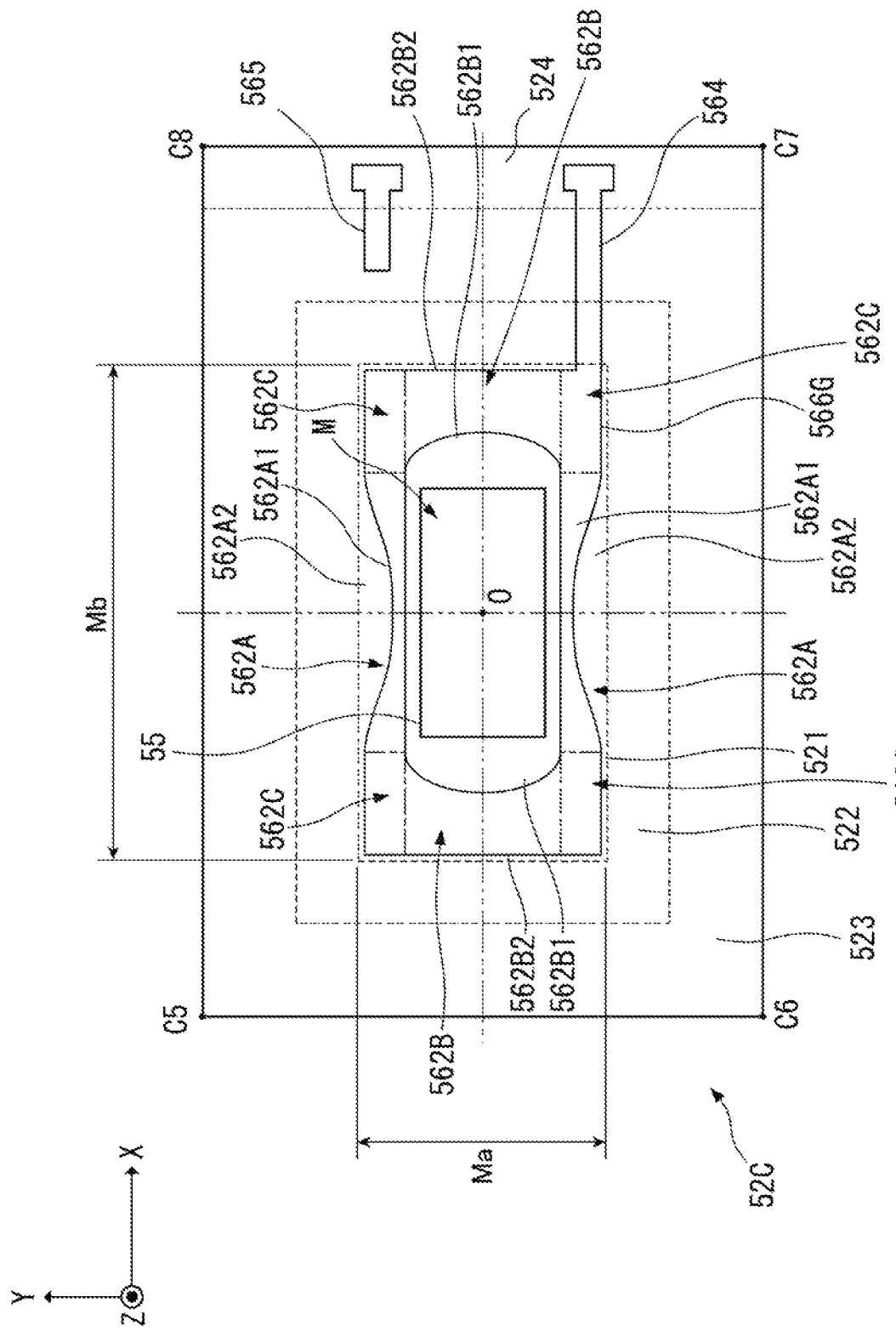
FIG. 25 is a plan view of a second substrate according to Variation 4 viewed from the side facing the first substrate.

Further, the configuration shown in FIG. 25 may be employed. FIG. 25 is a plan view of the second substrate 52G in one example of Variation 4 viewed from the side facing the first substrate 51.

In the aspect shown in FIG. 25, a second electrode 566G is so configured that in the second long-edge electrode sections 562A, the second inner long edges 562A1 are parallel to the direction X and the second outer long edges 562A2 incline (curve) in such a way that they approach the mirror region M with distance from the second corner electrode sections 562C toward the center of the movable section 521 in the direction X.

On the other hand, in the second short-edge electrode sections 562B, the second outer short edges 562B2 are parallel to the direction Y, and the second inner short edges 562B1 incline (curve) in such a way that they separate away from the mirror region M with distance from the second corner electrode sections 562C toward the center of the movable section 521 in the direction Y.

Although not shown, in any of the aspects described above, the first electrode 561 may be formed in the same shape as that of the second electrode and in the position where the first electrode coincides with the second electrode in the plan view, as in the embodiments described above.

Also in each of the aspects described above, the same advantages as those provided by the fourth embodiment can be provided. That is, the amount of bending of the movable section 521 can be more effectively suppressed by applying electrostatic attraction according to the bendability of the movable section 521.

Variation 5

The second embodiment has been described with reference to the outer protruding sections 562D1, which are so configured that the electrode outer circumferential edge line protrudes outward beyond both the second outer long edges 562A2 and the second outer short edges 562B2, but not necessarily.

The outer protruding sections 562D1 may instead be so configured that the electrode outer circumferential edge protrudes outward beyond one of the second outer long edges 562A2 and the second outer short edges 562B2.

Variation 6

The fifth embodiment has been described with reference to the configuration in which the first partial electrode 566D1 includes the first long-edge protruding sections 566D4 and the second partial electrode 566D2 includes the second long-edge protruding sections 566D6, but not necessarily.

Figure 26:
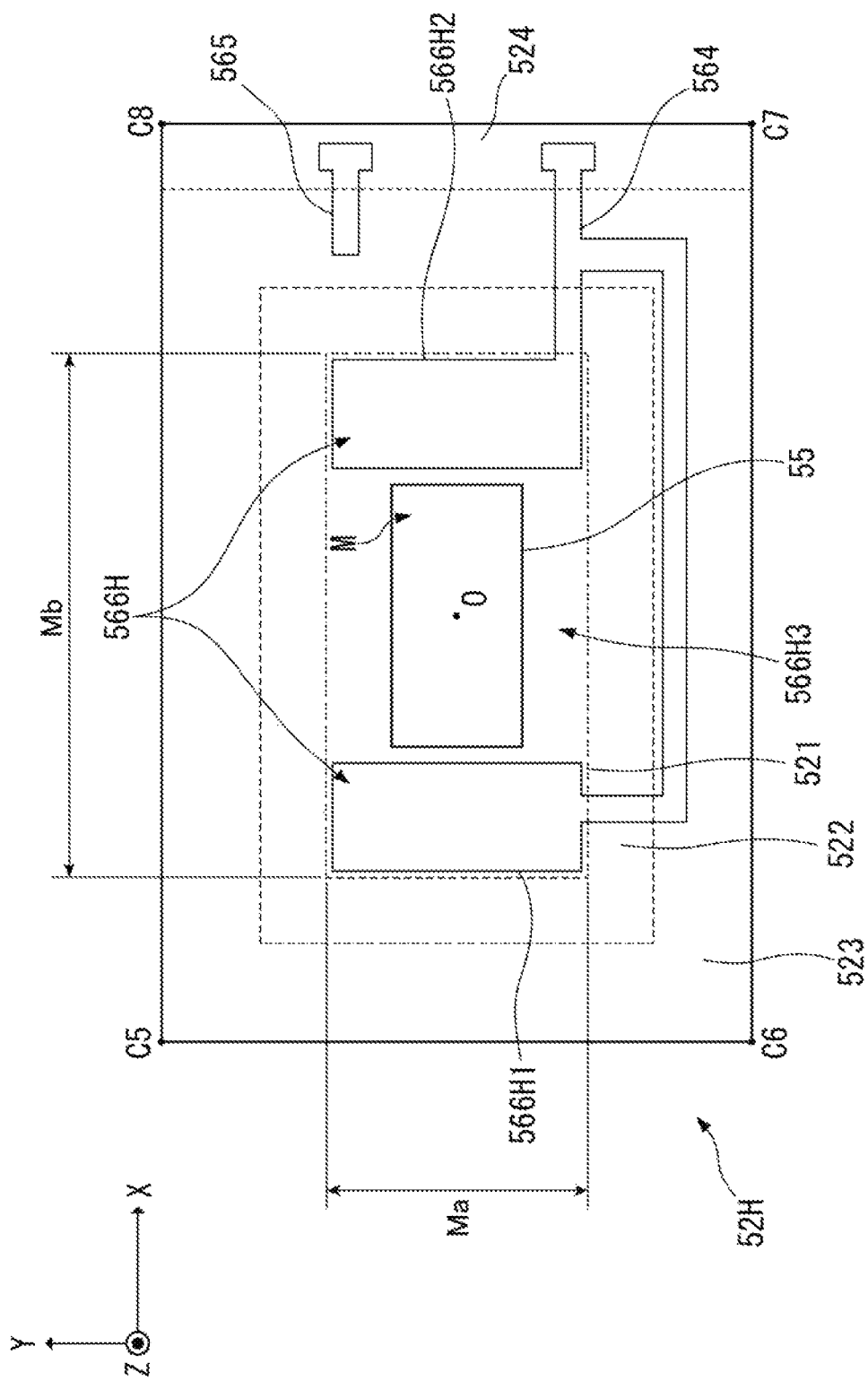
FIG. 26 is a plan view of a second substrate according to Variation 6 viewed from the side facing the first substrate.

FIG. 26 is a plan view of a second substrate 52H according to Variation 6 viewed from the side facing the first substrate 51.

The second substrate 52H is so configured that a second electrode 566H includes a first partial electrode 566H1, which is provided on the −X side of the mirror region M (second mirror 55), and a second partial electrode 566H2, which is provided on the +X side of the mirror region M (second mirror 55). The first partial electrode 566H1 and the second partial electrode 566H2 are so disposed as to be separate from each other in ±Y-side end portions via an electrode gap 566H3.

That is, the second substrate 52H shown in Variation 6 has a configuration in which in the region that circumferentially surrounds the mirror region M (second mirror 55) of the movable section 521, the electrodes are disposed on opposite sides in the long-edge direction (major axis direction in the case of an oval shape or any other similar shape), along which the movable section 521 is likely to bend, and no electrode is disposed on opposite sides in the short-edge direction (minor axis direction in the case of an oval shape or any other similar shape), along which the movable section 521 is unlikely to bend.

In other words, the second electrode 566H is so configured that the width of the portion corresponding to the direction Y is Lb and the width of the portion corresponding to the direction X is zero so that the width of the portion corresponding to the direction Y is greater than the width of the portion corresponding to the direction X. The amount of bending of the movable section 521 can therefore be suppressed, as in the fifth embodiment described above.

Although not shown, the first electrode 561 may be formed in the same shape as that of the second electrode 566H and in the position where the first electrode 561 coincides with the second electrode 566H in the plan view, as in the embodiments described above.

Variation 7

In the fifth embodiment and Variation 6 described above, a mirror electrode may further be provided on each of the second mirror 55, which coincides with the mirror region M in the plan view, and the first mirror 54, which faces the second mirror 55.

For example, in the case where a mirror electrode is provided on the second mirror 55, a wiring electrode connected to the mirror electrode can be so provided as to extend from the electrode gap 566D7 or 566H3 to the connection terminal section 524.

Variation 8

Figure 27:
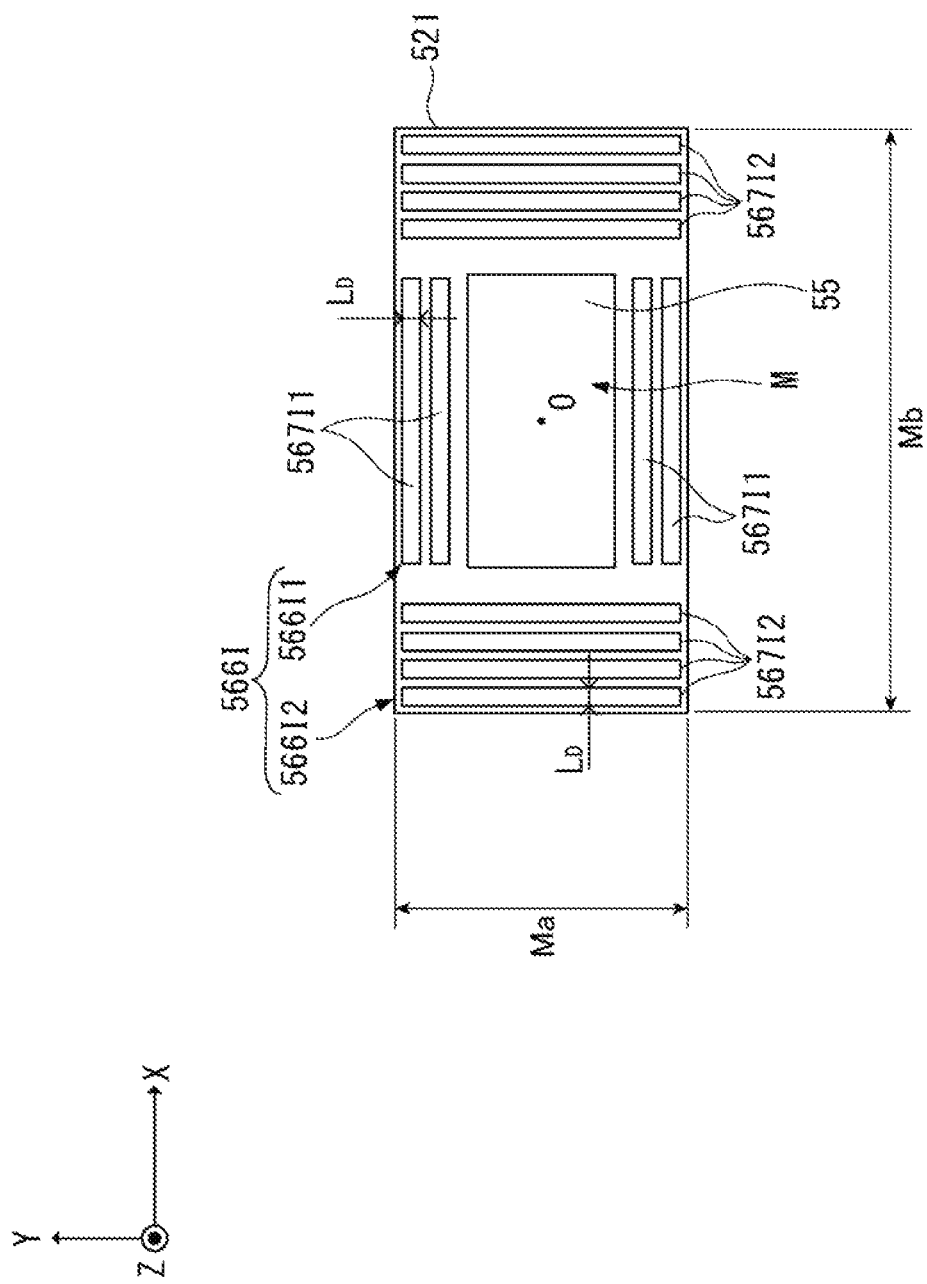
FIG. 27 shows a schematic configuration of a movable section and a second electrode provided on the movable section according to Variation 8.

FIG. 27 shows a schematic configuration of a movable section 521 and a second electrode 566I provided on the movable section 521 according to Variation 8.

The above-mentioned first embodiment has been described with reference to the case where the second long-edge electrode sections 562A and the second short-edge electrode sections 562B of the second electrode 562 are each formed of a single electrode. In contrast, second long-edge electrode sections 566I1 and second short-edge electrode sections 566I2 may each be formed of a plurality of line-shaped electrodes, as shown in FIG. 27.

Specifically, the second electrode 566I includes the second long-edge electrode sections 566I1 disposed along the direction X in ±Y-side end portions of the movable section 521. The second long-edge electrode sections 566I1 are each so formed that two long-edge line-shaped electrodes 567I1 having a longitudinal direction that coincides with the direction X and having a width Lp in the direction Y are arranged in parallel to each other in the direction Y.

The second electrode 566I further includes the second short-edge electrode sections 566I2 disposed along the direction Y in ±X-side end portions of the movable section 521. The second short-edge electrode sections 566I2 are each so formed that four short-edge line-shaped electrodes 567I2 having a longitudinal direction that coincides with the direction Y and having the width Lp in the direction X are arranged in parallel to each other in the direction X.

In FIG. 27, the second drawn electrode connected to the second electrode 566I is omitted for ease of description, but a drawn electrode is connected to each of the long-edge line-shaped electrode 567I1 and the second short-edge line-shaped electrode 567I2, and the drawn electrodes are connected, for example, to the holding section 522, the substrate outer circumferential section 523, or the connection terminal section 524, so that the second electrode 566I is maintained at the same potential.

In the configuration described above, the width of each of the second long-edge electrode sections 566I1 is the sum of the widths of the long-edge line-shaped electrodes 567I1 or $2L_p$. Similarly, the width of each of the second short-edge electrode sections 566I2 is the sum of the widths of the short-edge line-shaped electrodes 567I2 or $4L_p$. The width of each of the second short-edge electrode sections 566I2, which are disposed in correspondence with the short-edge direction, is therefore greater than the width of each of the second long-edge electrode sections 566I1, which are disposed in correspondence with the long-edge direction, as in the first embodiment, whereby the amount of bending of the movable section 521 can be suppressed when the movable section 521 is displaced in the direction Z.

It is noted that the long-edge line-shaped electrodes 567I1 and the short-edge line-shaped electrodes 567I2 have the same line width $L_p$ but may have different widths.

A plurality of partial electrodes may be disposed with an electrode gap interposed therebetween, as in the fifth embodiment and Variations 6 and 7, or the electrode width may increase in accordance with the distance from the center of the movable section 521, as in the fourth embodiment.

Figure 28:
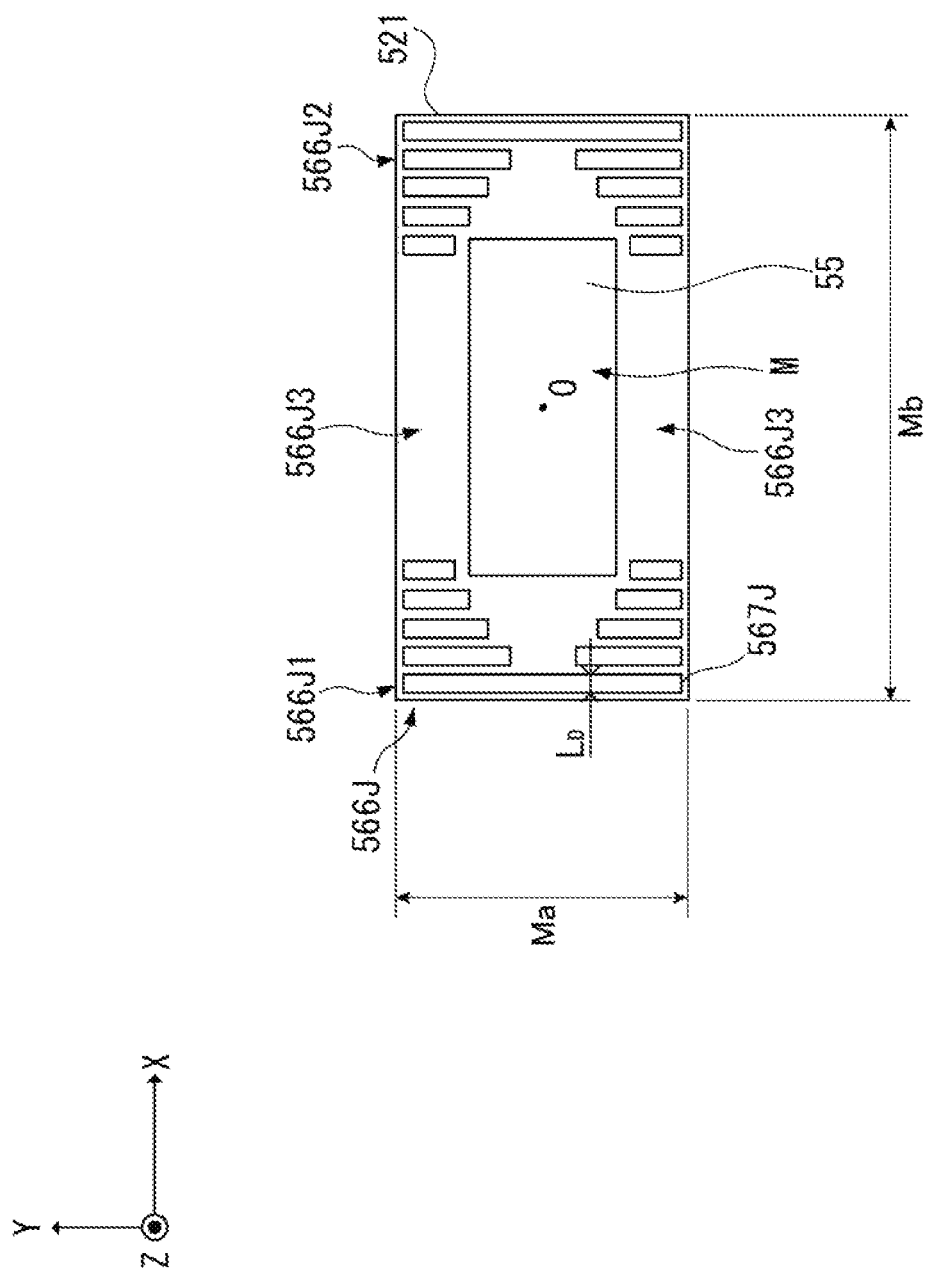
FIG. 28 shows another example of the schematic configuration of the movable section and the second electrode provided on the movable section according to Variation 8.

FIG. 28 shows another example of the schematic configuration of the movable section and the second electrode provided on the movable section according to Variation 8.

In the example shown in FIG. 28, a second electrode 566J includes a first partial electrode 566J1, which is provided on the −X side of the mirror region M (second mirror 55), and a second partial electrode 566J2, which is provided on the +X side of the mirror region M (second mirror 55), as in Variation 6. The first partial electrode 566J1 and the second partial electrode 566J2 are so disposed as to be separate from each other in ±Y-side end portions via an electrode gap 566J3.

The first partial electrode 566J1 and the second partial electrode 566J2 are each formed of a plurality of line-shaped electrodes 567J each having a width $L_D$.

Further, in the present example, the lengths of the line-shaped electrodes 567J (lengths in direction Y) perpendicular to the width thereof differ from one another.

Specifically, the line-shaped electrode 567J disposed at the −X-side end of the first partial electrode 566J1 and the line-shaped electrode 567J disposed at the +X-side end of the second partial electrode 566J2 are so formed as to extend from the −Y-side end to the +Y-side end of the movable section 521. On the other hand, the Y-direction length of each of the line-shaped electrodes 567J other than the line-shaped electrodes 567J disposed at the ±X-side ends is so set as to be half the length of the movable section 521 in the direction Y or smaller, and the line-shaped electrode 567J disposed in a position closer to the center of the movable section 521 in the direction X has a shorter length in the direction Y. Further, the line-shaped electrodes 567J having shorter lengths are disposed in ±Y-side opposite end portions of the movable section 521. In addition to the above, the line-shaped electrodes 567J disposed on the +Y side are each disposed in a position separate from the +Y-side edge line of the movable section 521 by a predetermined distance, and the line-shaped electrodes 567J disposed on the −Y side are each disposed in a position separate from the −Y-side edge line of the movable section 521 by a predetermined distance.

In this case, the electrode width of the first partial electrode 566J1 and the second partial electrode 566J2 (sum of widths of line-shaped electrodes 567J) increases in accordance with the distance from the center of the movable section 521, as in the fourth embodiment. The amount of bending of the movable section 521 can therefore be effectively suppressed, as in the fourth embodiment.

Variation 9

The above-mentioned embodiments and variations have been described with reference to the configuration in which the second electrode is provided on the movable section. In contrast, the entirety or part of the second electrode may be provided on the holding section 522.

The holding section 522 has been described with reference to the configuration in which the holding section 522 has a uniform width $L_C$ from the movable section 521 to the substrate outer circumferential section 523 by way of example, but not necessarily. For example, the holding section 522 may be so configured that the portion thereof linked to the easily bendable portion of the movable section 521 (for example, ±X-side opposite end portions of movable section having longitudinal direction that coincides with direction X) has a larger width. Still instead, the width of the holding section 522 may increase in accordance with the distance from the center of the movable section 521.

Figure 29:
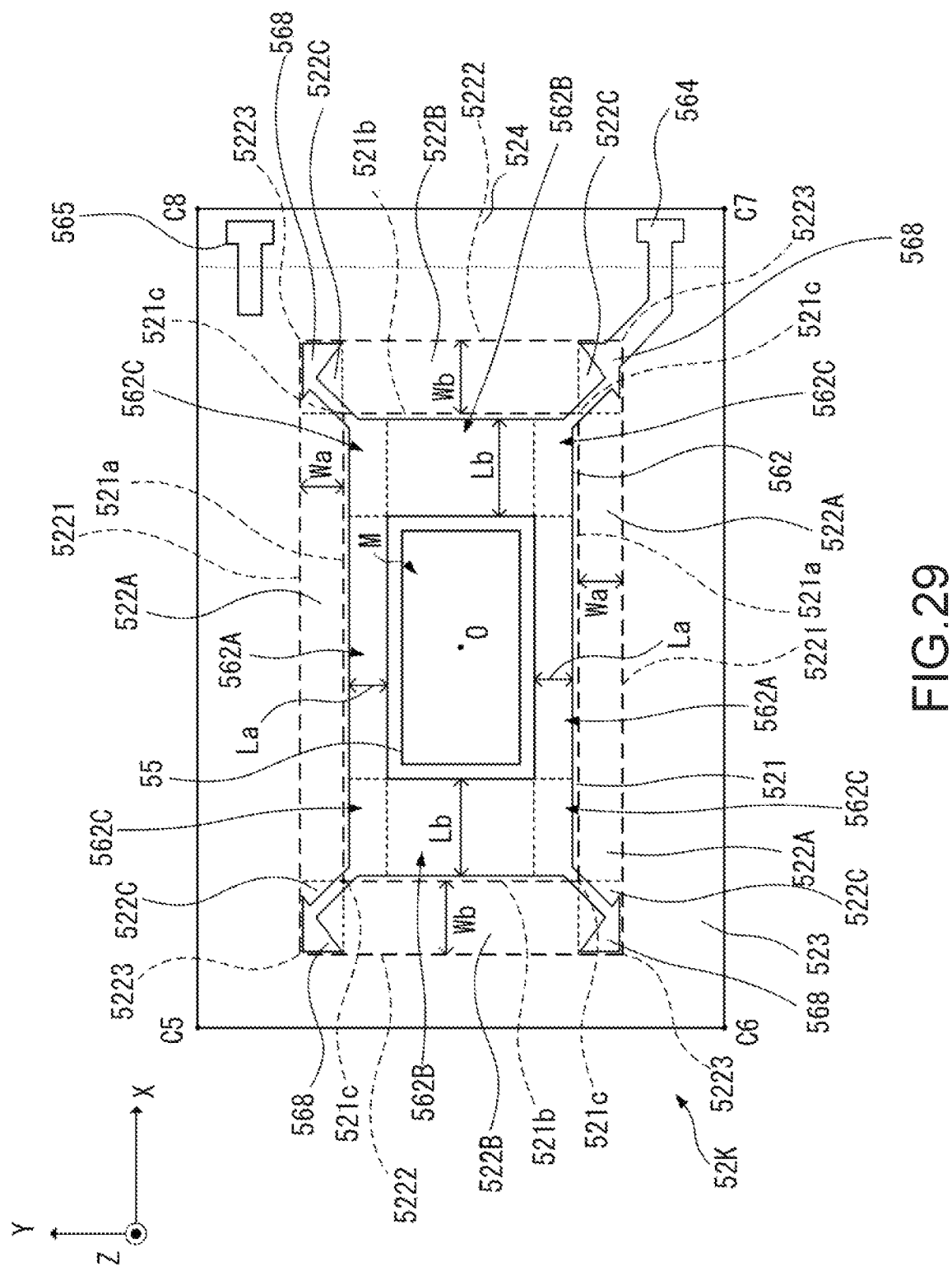
FIG. 29 is a plan view of a second substrate according to Variation 9 viewed from the side facing the first substrate.
Figure 30:
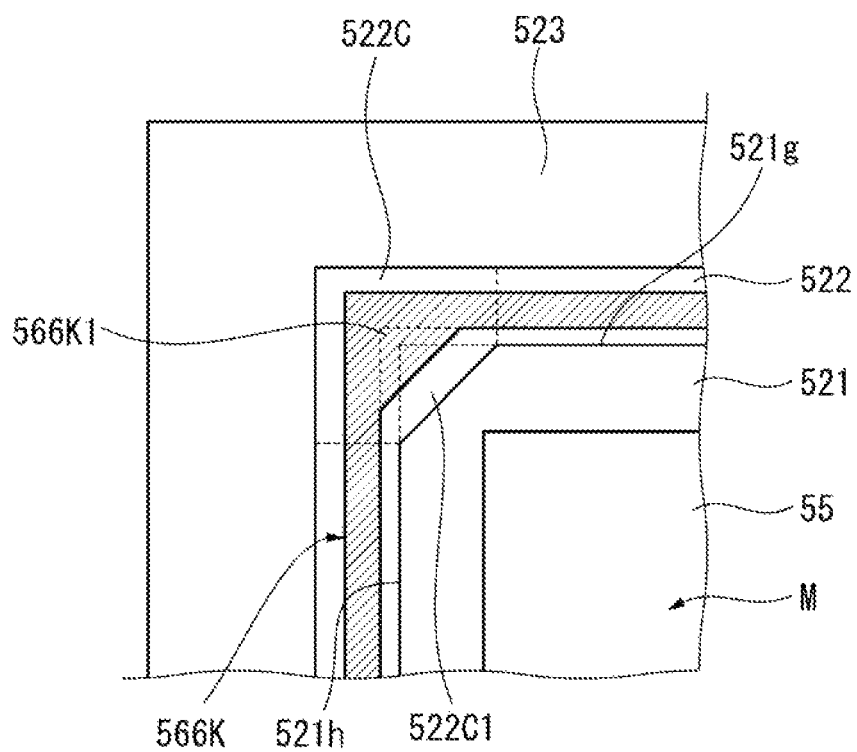
FIG. 30 is a plan view of part of the second substrate according to Variation 9 viewed from the side facing the first substrate.

FIGS. 29 and 30 show a configuration in which the width of the holding section is changed in accordance with the bendability of the movable section and the second electrode is provided on the holding section 522 (or so provided as to extend from movable section to holding section).

In FIG. 29, a second substrate 52K includes the movable section 521 having a long-edge direction that coincides with the direction X and a short-edge direction that coincides with the direction Y, and the holding section 522, which surrounds the outer circumference of the movable section 521, includes long-edge holding sections 522A, which are continuous with the long edges 521a, short-edge holding sections 522B, which are continuous with the short edges 521b, and corner sections 522C, which connect the long-edge holding sections 522A and the short-edge holding sections 522B to each other.

The width Wb of the short-edge holding sections 522B (length in direction X) is greater than the width Wa of the long-edge holding sections 522A (length in direction Y). That is, the short-edge holding sections 522B are likely to bend in the direction Z when the movable section 521 is displaced in the direction Z and produce a small magnitude of restoring force (spring force) that causes the movable section 521 to return to the original position. The amount of bending of the movable section 521 can thus be suppressed.

In addition, the corner sections 522C of the holding section 522, which are linked to the corner points 521c, which are most likely to bend out of the movable section 521 when the movable section 521 is displaced in the direction Z, are each provided with a holding electrode section 568, which extends from the second electrode 562 provided on the movable section 521.

In each of the corner sections 522C of the holding section 522, a portion in the vicinity of the boundary between the corner section 522C and the substrate outer circumferential section 523 is most unlikely to bend. In particular, a portion in the vicinity of each corner point 5223 sandwiched between an outer circumferential edge line 5221 along the direction X and an outer circumferential edge line 5222 along the direction Y is most unlikely to bend. The holding electrode sections 568 are each therefore preferably formed in a triangular shape that has a vertex that coincides with the corner point 5223 of the holding section 522 and spreads along the outer circumferential edge lines 5221 and 5222.

The shape described above of the holding section 522 allows more effective reduction in the amount of bending of the movable section 521 when the movable section 521 is displaced in the direction Z.

The example shown in FIG. 30 shows an example of the configuration in which the second electrode is provided on the holding section.

The corner points 521*c* of the movable section 521 are more likely to bend than the other portion of the movable section 521 when the movable section 521 is displaced in the direction Z, as described, for example, in the second and third embodiments.

Therefore, in FIG. 30, the corner sections 522C of the holding section 522, which are linked to the corner points of the movable section 521, which are likely to bend, are each provided with a corner protruding section 522C1, which protrudes toward the mirror region M beyond extensions of edges 521*g* and 521*h* of the movable section 521.

Further, in the present example, a second electrode 566K is provided on the holding section 522. The second electrode 566K includes inner protruding sections 566K1 in correspondence with the corner points of the movable section 521, as in the third embodiment.

In the example shown in FIG. 30, since the movable section 521 is so shaped as to have no major or minor axis direction (square shape, for example), the electrode portions of the second electrode 566K that correspond to the edges 521*g* and 521*h* have the same width. In the case where the movable section 521 has the major axis (long-edge) direction and the minor axis (short-edge) direction (in the case where the movable section 521 has a rectangular shape, for example), the width of the electrode portions corresponding to the long-edge direction may be set at a small value, and the width of the electrode portions corresponding to the short-edge direction may be set at a large value, as in the third embodiment described above.

The shape described above of the second electrode also allows more effective reduction in the amount of bending of the movable section 521 when the movable section 521 is displaced in the direction Z.

Variation 10

The above-mentioned embodiments and variations have been described with reference to the case where the mirror region M and the second mirror 55 have the same shape and the same planar size and the second mirror 55 is formed in the mirror region M.

In contrast, the second mirror and the mirror region may differ from each other in terms of size and shape.

Figure 31:
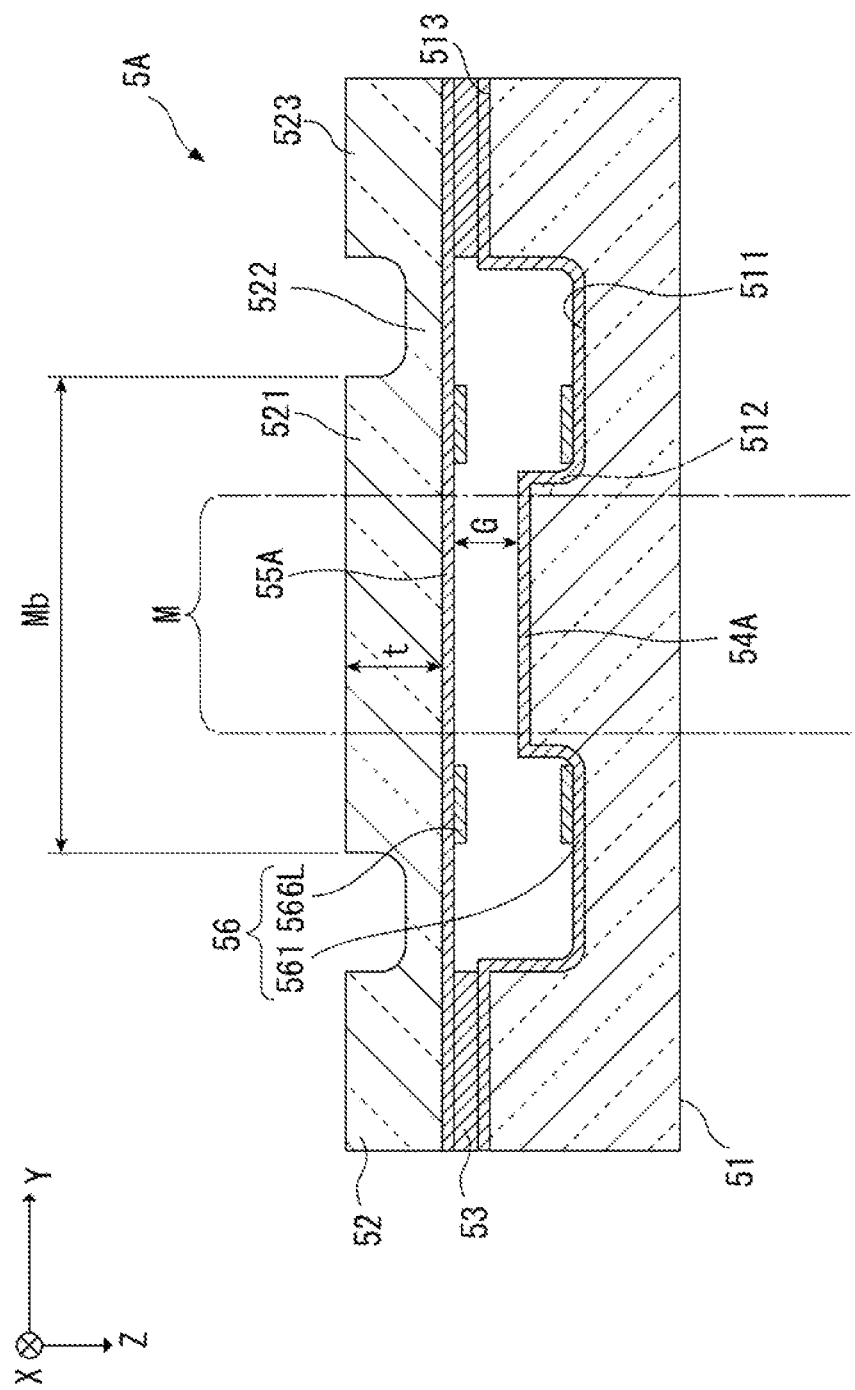
FIG. 31 is a cross-sectional view showing a schematic configuration of a wavelength tunable interference filter according to Variation 10.

FIG. 31 is a cross-sectional view showing a schematic configuration of a wavelength tunable interference filter 5A according to Variation 10.

In the wavelength tunable interference filter 5A shown in FIG. 31, a first mirror 54A is provided over a surface of the first substrate 51 that is the surface facing the second substrate 52. Further, a second mirror 55A is provided over a surface of the second substrate 52 that is the surface facing the first substrate 51. The first mirror 54A and the second mirror 55A can each be formed, for example, of a dielectric multilayer film formed of low refraction layers and high refraction layers alternately layered on each other.

The wavelength tunable interference filter 5A is provided with the mirror region M, which has a rectangular shape in the plan view around the filter center axis O, as is the wavelength tunable interference filter according to the first embodiment described above. That is, the mirror region M is provided in a region inside the movable section 521 in the plan view.

Further, a second electrode 566L is so provided on the second mirror 55A as to surround the mirror region M. The second electrode 566L can be so formed as to have the same shape as that in the first to fifth embodiments (or variations thereof) described above and further so formed as to have a width that varies in the direction along the circumference of the mirror region M. The same advantageous effects as those provided by the embodiments described above can therefore be provided, whereby the amount of bending of the movable section 521 can be suppressed.

Variation 11

In the embodiments and variations described above, the first electrode 561 is formed in the same shape as that of the second electrode 562 (566A to 566L) and provided in the position where the first electrode 561 and the second electrode coincides with each other in the plan view, but not necessarily.

The first electrode 561 only needs to be provided at least in a region that overlaps with the second electrode 566 (566A to 566L) in the plan view and may, for example, be so formed that the first electrode 561 is wider than the second electrode 562 (566A to 566L). Also in this case, the region that actually serves as the electrostatic actuator 56 and applies the electrostatic attraction to the movable section 521 is the second electrode 562 (566A to 566L), and the same effects as those provided by the embodiments described above can be provided.

Variation 12

The above-mentioned embodiments and variations have been described with reference to the case where the width of the second electrode corresponds to the electrode width in an aspect of the invention, but not necessarily. That is, the electrode width in an aspect of the invention means the width of a region that functions as the electrostatic actuator 56, and the width of the region that functions as the electrostatic actuator 56 only needs to vary in the circumferential direction of the mirror region M.

Figure 32:
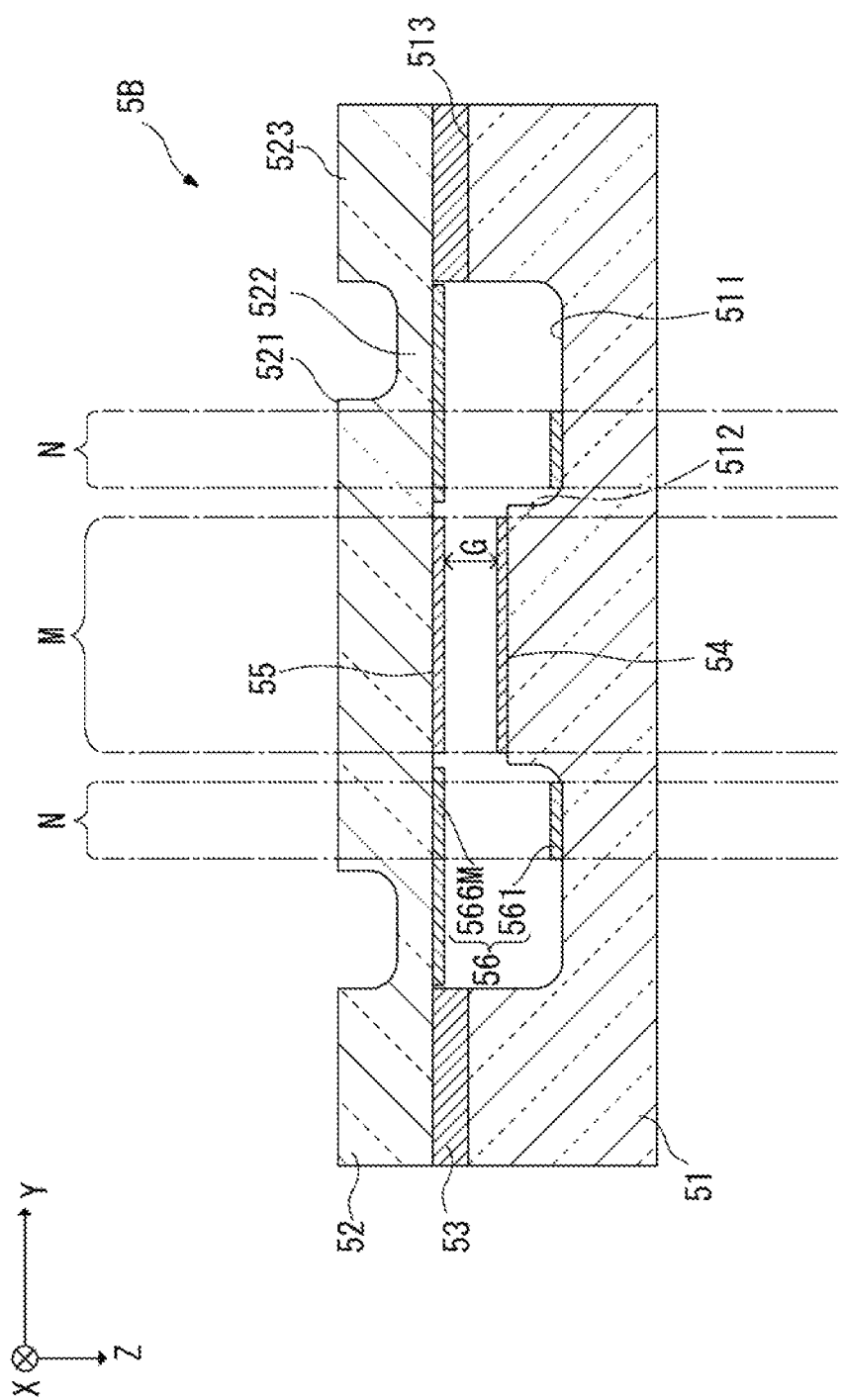
FIG. 32 is a cross-sectional view showing a schematic configuration of a wavelength tunable interference filter according to Variation 12.

FIG. 32 is a cross-sectional view of a wavelength tunable interference filter 5B according to Variation 12.

In the wavelength tunable interference filter 5B shown in FIG. 32, the first substrate 51 has the same configuration as that in the first embodiment shown, for example, in FIG. 3. That is, the first electrode 561 includes the first long-edge electrode sections 561A, which have the long-edge width La, and the first short-edge electrode sections 561B, which have the short-edge width Lb (Lb>La).

On the other hand, in the wavelength tunable interference filter 5B, a second electrode 566M is so formed as to be wider than the first electrode 561. In the wavelength tunable interference filter 5B shown, for example, in FIG. 32, the second electrode 566M is so formed as to extend from the movable section 521 to the holding section 522 in a region outside the mirror region M.

Also in this case, out of the second substrate 52, the region that functions as the electrostatic actuator 56 to pull the movable section 521 toward the first substrate (+Z side) is the region that coincides with the first electrode 561 in the plan view (actuator region N in FIG. 32) or the same region in the first embodiment. The same advantageous effects as those provided by the first embodiment described above can therefore be provided, whereby the amount of bending of the movable section 521 can be suppressed.

That is, the phrase "the electrode width varies in the circumferential direction" in an aspect of the invention means that the width of a portion (region) that provides force that displaces the movable section 521 toward the first substrate 51 when voltage is applied to the portion (region)

varies in the circumferential direction. The phrase therefore includes a situation in which the width of the first electrode 561 that surrounds the mirror region M varies in the circumferential direction.

Variation 13

In the eighth embodiment, the two measurement positions TA and TB corresponding to the ±X sides of the mirror region M are presented by way of example. Instead, a plurality of measurement positions may be provided. For example, three measurement positions corresponding to the ±X sides and a central portion of the mirror region M may be provided.

The case where the long-edge (major-axis) direction of the movable section 521 coincides with the direction X has been presented by way of example. The long-edge direction may instead coincide with the direction Y. In this case, two color patches 801 arranged in the direction Y can be simultaneously measured. The distance over which the carriage 13 moves in this case is the dimension of one color patch 801 (=$X_C$/2). Since two patch groups 802 arranged in the direction Y can be simultaneously measured, the spectral measurement can be quickly performed on the color patches in the test pattern 800, as in the eighth embodiment.

Further, the spectrometer 17 in the eighth embodiment includes the first detector 172A and the second detector 172B, which are so disposed as to be separate from each other by a predetermined distance in the direction X by way of example. The first detector 172A and the second detector 172B may be replaced, for example, with a light receiving section (such as image sensor) capable of receiving light fluxes having passed through the first passage position MA and the second passage position MB and having a light receiving region with the width in the direction X greater than the width in the direction Y.

Other Variations

As the wavelength tunable interference filter, a light transmissive wavelength tunable interference filter that separates light having a predetermined wavelength from incident light and transmits the separated light has been presented by way of example, but not necessarily. For example, a light reflective wavelength tunable interference filter that separates light having a predetermined wavelength from incident light and reflects the separated light may be used as the wavelength tunable interference filter.

As the electrode in an aspect of the invention, the second electrode 562 (566A to 566L) has been presented by way of example, and the configuration in which the second electrode 562 along with the first electrode 561 forms the electrostatic actuator 56 and the movable section is displaced based on electrostatic attraction has been presented by way of example, but not necessarily. For example, the electrode in an aspect of the invention may, for example, be an actuator that applies repulsion to the movable section 521 upon application of voltage to the second electrode.

The holding section 522 is formed of a diaphragm that is thinner than the movable section 521 and holds the movable section 521 in such a way that the movable section 521 is displaceable in the direction Z by way of example, but not necessarily.

For example, the holding section 522 may be so formed as to be as thick as the movable section 521, and the holding section 522 may be made, for example, of a material different from the material of the movable section 521 in such a way that the rigidity of the holding section 522 is lower than that of the movable section 521 in the direction Z.

In the seventh and eighth embodiments, the spectral camera 700 and the printer 10 have been presented as examples of the electronic apparatus, but not necessarily. The electronic apparatus including the wavelength tunable interference filter 5 may, for example, be a light source apparatus that outputs light having a desired wavelength (laser light source apparatus, for example) or a spectral analyzer that analyzes the contents of an object under measurement. Further, the wavelength tunable interference filter 5 may be used as a chromaticity measurement apparatus that measures the chromaticity of an image formed, for example, by a multi-projection system.

Specific structures of an actually implemented aspect of the invention can be changed as appropriate, for example, to other structures to the extent that the advantage of the invention is achieved.

The entire disclosure of Japanese Patent Application No. 2017-224079 filed Nov. 21, 2017 is expressly incorporated herein by reference.

What is claimed is:

1. A wavelength tunable interference filter comprising:
   a first mirror;
   a movable section on which a second mirror that faces the first mirror is provided; and
   an electrode so provided in a region outside the second mirror as to surround the second mirror in a plan view viewed along a first axis that is perpendicular to a surface of the movable section that is a surface on which the second mirror is provided, the electrode being configured to displace the movable section along the first axis when voltage is applied to the electrode,
   wherein the electrode has a first pair of parallel electrode sections and a second pair of parallel electrode sections, and
   wherein a width of the each of the first pair of parallel electrode sections is different from a width of each of the second pair of parallel electrode sections in the plan view.

2. The wavelength tunable interference filter according to claim 1,
   wherein the movable section is so shaped as to have a longitudinal axis in the plan view viewed along the first axis,
   Ma<Mb is satisfied,
   where Ma represents a width of the movable section along a second axis that is perpendicular to the first axis and to the longitudinal axis, and Mb represents a width of the movable section along a third axis that is perpendicular to the first axis and parallel to the longitudinal axis, and
   La<Lb is satisfied,
   where La represents a third electrode width of a portion corresponding to the third axis out of the electrode, and Lb represents a second electrode width of a portion corresponding to the second axis out of the electrode.

3. An optical device comprising:
   the wavelength tunable interference filter according to claim 2; and
   an enclosure that accommodates the wavelength tunable interference filter.

4. An optical module comprising:
   the wavelength tunable interference filter according to claim 2; and
   an image sensor that receives light having passed through the first mirror and the second mirror.

5. An electronic apparatus comprising:
the wavelength tunable interference filter according to claim 2; and
a control section that controls drive operation of the wavelength tunable interference filter.

6. The wavelength tunable interference filter according to claim 1,
wherein the electrode has a polygonal outer circumferential shape when viewed along the first axis, and
Wc>Ws/sin α is satisfied,
where α represents an angle between a radial straight line from a center of the movable section toward a corner point of the polygonal shape and an edge of the polygonal shape, Wc represents a width of a corner electrode section located at the corner point out of the electrode, the width measured along the radial straight line, and Ws represents a width of the side electrode section along the edge out of the electrode, the width measured along an axis perpendicular to the edge.

7. An optical device comprising:
the wavelength tunable interference filter according to claim 6; and
an enclosure that accommodates the wavelength tunable interference filter.

8. An optical module comprising:
the wavelength tunable interference filter according to claim 6; and
an image sensor that receives light having passed through the first mirror and the second mirror.

9. An electronic apparatus comprising:
the wavelength tunable interference filter according to claim 6; and
a control section that controls drive operation of the wavelength tunable interference filter.

10. The wavelength tunable interference filter according to claim 1,
wherein the movable section has a fourth edge line extending along a fourth axis in the plan view, a fifth edge line extending along a fifth axis that intersects the fourth axis, and a corner point where the fourth edge line and the fifth edge line intersect to each other,
the electrode includes
a fourth electrode section having a fourth inner edge extending along the fourth axis and disposed on a side close to a mirror region where the first mirror and the second mirror coincide with each other in the plan view viewed along the first axis and a fourth outer edge disposed on a side opposite the mirror region,
a fifth electrode section having a fifth inner edge extending along the fifth axis and disposed on a side of the mirror region and a fifth outer edge disposed on a side opposite the mirror region, and
a corner electrode section continuous with one end of the fourth electrode section along the fourth axis and one end of the fifth electrode section along the fifth axis, and
the corner electrode section includes at least one of an outer protruding section that protrudes in a direction away from the mirror region beyond the fourth outer edge or the fifth outer edge and an inner protruding section that protrudes toward the mirror region beyond the fourth inner edge or the fifth inner edge.

11. An optical device comprising:
the wavelength tunable interference filter according to claim 10; and
an enclosure that accommodates the wavelength tunable interference filter.

12. An optical module comprising:
the wavelength tunable interference filter according to claim 10; and
an image sensor that receives light having passed through the first mirror and the second mirror.

13. The wavelength tunable interference filter according to claim 1,
wherein the movable section and the second mirror each have a rectangular shape.

14. The wavelength tunable interference filter according to claim 1,
wherein the widths of the electrode sections of one of the first or second pair of parallel electrode sections increases with increase of distance from a center of the movable section.

15. The wavelength tunable interference filter according to claim 1,
wherein the movable section has a dimension along the first axis that is uniform across a plane parallel to the second axis and the third axis, and
the wavelength tunable interference filter further includes a holding section that is so linked to the movable section as to surround an outer circumference of the movable section and holds the movable section in such a way that the movable section is movable along the first axis.

16. The wavelength tunable interference filter according to claim 1,
wherein the electrode has a closed shape.

17. The wavelength tunable interference filter according to claim 1,
wherein the electrode includes a plurality of partial electrodes, and the plurality of partial electrodes are arranged around the second mirror with a gap having a predetermined dimension interposed between the plurality of partial electrodes.

18. An optical device comprising:
the wavelength tunable interference filter according to claim 1; and
an enclosure that accommodates the wavelength tunable interference filter.

19. An optical module comprising:
the wavelength tunable interference filter according to claim 1; and
an image sensor that receives light having passed through the first mirror and the second mirror.

20. An electronic apparatus comprising:
the wavelength tunable interference filter according to claim 1; and
a control section that controls drive operation of the wavelength tunable interference filter.

* * * * *